(12) United States Patent
Golden, Jr.

(10) Patent No.: US 9,950,733 B2
(45) Date of Patent: Apr. 24, 2018

(54) WHEELCHAIR RECONFIGURATION METHODS

(71) Applicant: Stephen C. Golden, Jr., Menasha, WI (US)

(72) Inventor: Stephen C. Golden, Jr., Menasha, WI (US)

( * ) Notice: Subject to any disclaimer, the term of this patent is extended or adjusted under 35 U.S.C. 154(b) by 0 days.

(21) Appl. No.: 14/976,033

(22) Filed: Dec. 21, 2015

(65) Prior Publication Data

US 2016/0101005 A1   Apr. 14, 2016

Related U.S. Application Data

(63) Continuation-in-part of application No. 14/314,030, filed on Jun. 25, 2014.

(51) Int. Cl.
| | | |
|---|---|---|
| *B62B 19/04* | (2006.01) | |
| *A61G 5/02* | (2006.01) | |
| *A61G 5/06* | (2006.01) | |
| *A61G 5/10* | (2006.01) | |

(52) U.S. Cl.
CPC ............... *B62B 19/04* (2013.01); *A61G 5/02* (2013.01); *A61G 5/06* (2013.01); *A61G 5/10* (2013.01); *A61G 5/1054* (2016.11); *A61G 5/1078* (2016.11); *A61G 5/1083* (2016.11)

(58) Field of Classification Search
CPC .... B62B 19/04; A61G 5/1083; A61G 5/1054; A61G 5/02; A61G 5/06; A61G 5/10
USPC ....................................................... 280/304.1
See application file for complete search history.

(56) References Cited

U.S. PATENT DOCUMENTS

| | | |
|---|---|---|
| 3,137,276 A | 6/1964 | Weisser |
| 3,170,362 A | 2/1965 | Mewse |
| 3,192,820 A | 7/1965 | Pitzer |
| 3,318,289 A | 5/1967 | Marynissen |
| 4,132,423 A | 1/1979 | Chant |
| 4,316,616 A | 2/1982 | Boivin |
| 4,511,157 A | 4/1985 | Wilt, Jr. |
| 5,273,304 A | 12/1993 | Berkheimer |
| 5,280,937 A | 1/1994 | Needham |
| 6,311,999 B1 | 11/2001 | Kueschall |
| 7,261,309 B2 | 8/2007 | Watwood |
| 7,520,518 B2 | 4/2009 | Peterson |

(Continued)

FOREIGN PATENT DOCUMENTS

| | | |
|---|---|---|
| DE | 4107410 C2 | 3/1990 |
| FR | 2841462 A1 | 1/2004 |

(Continued)

OTHER PUBLICATIONS

Requirement for Restriction/Election for U.S. Appl. No. 14/314,030, dated Nov. 10, 2015.

(Continued)

*Primary Examiner* — Kevin Hurley
*Assistant Examiner* — Felicia L. Brittman

(57) ABSTRACT

Methods are disclosed, according to the present invention, which enable reversible reconfiguration of a wheelchair by a user between a.) an original load-bearing configuration utilizing the conventional caster wheels of the wheelchair, and b.) a modified load-bearing configuration which confers improved functionality to the wheelchair, especially for traversing difficult or uneven terrain.

2 Claims, 35 Drawing Sheets

(56) References Cited

U.S. PATENT DOCUMENTS

| | | |
|---|---|---|
| 7,735,847 B2 | 6/2010 | Dougherty |
| 7,766,342 B2 | 8/2010 | Fast |
| 8,152,192 B2 * | 4/2012 | Dougherty ............... A61G 5/06 |
| | | 280/304.1 |
| 8,348,293 B1 | 1/2013 | Lasher |
| 8,414,008 B2 | 4/2013 | Hay |
| 8,573,622 B2 | 11/2013 | Papi |
| 8,585,071 B2 | 11/2013 | Golden, Jr. |
| 8,613,350 B2 | 12/2013 | Nease, III |
| 8,651,507 B2 | 2/2014 | Kylstra |
| 8,684,113 B1 | 4/2014 | Laconis |
| 2007/0096427 A1 | 5/2007 | Knaub |
| 2011/0099857 A1 | 5/2011 | Thomas |
| 2013/0009372 A1 | 1/2013 | Willis |
| 2015/0001833 A1 | 1/2015 | Golden, Jr. |
| 2016/0151215 A1 | 6/2016 | Golden, Jr. |

FOREIGN PATENT DOCUMENTS

| | | |
|---|---|---|
| WO | WO/2010/139507 A1 | 9/2010 |
| WO | WO/2011/153585 A1 | 12/2011 |

OTHER PUBLICATIONS

Office Action for U.S. Appl. No. 14/314,030, dated Mar. 9, 2017.
Office Action for U.S. Appl. No. 14/952,810, dated Mar. 13, 2017.

* cited by examiner

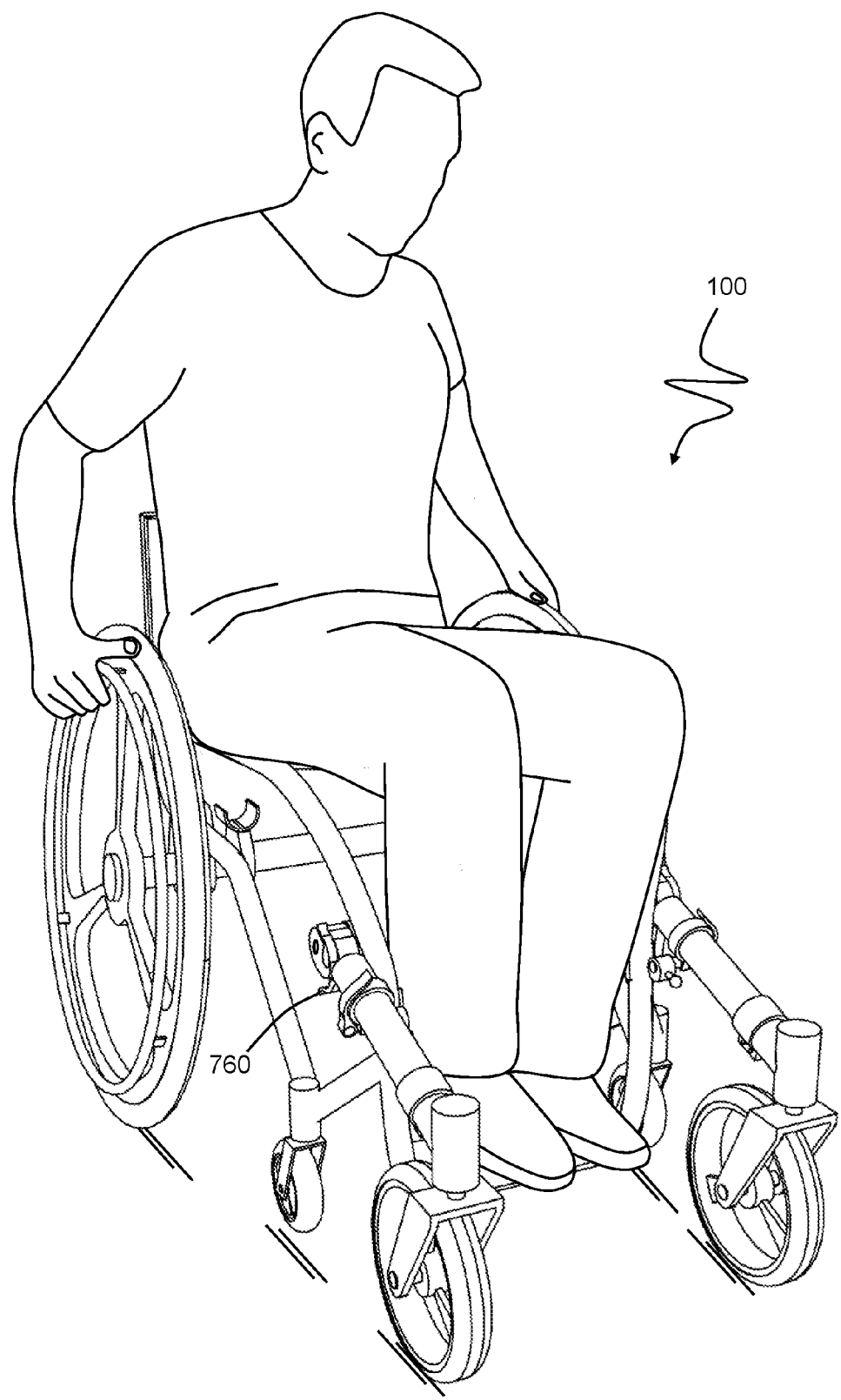
FIG. 7-I

WHEELCHAIR RECONFIGURATION METHODS

CROSS-REFERENCE TO RELATED APPLICATIONS

This application is a continuation-in-part of U.S. patent application Ser. No. 14/314,030, "Unilateral Transition Means for Adapting a Wheelchair," filed Jun. 25, 2014, which is hereby incorporated by reference in its entirety for all purposes.

BACKGROUND OF THE INVENTION

1. Field of the Invention

This invention relates to wheelchairs, related devices, and methods for use, particularly for personal mobility.

2. Description of Related Art

For many, the wheelchair serves as an essential conveyance for performing common activities that would otherwise be difficult, if not impossible, such as moving about in one's home, going shopping at the store, attending public gatherings, tending to a garden, and playing at the park with one's family. For some, such activities may be performed independently, while for others considerable assistance may be necessary; the wheelchair is thus useful in both the context of independent mobility and in that of assistive transportation of a person with a disability. Whereas the wheelchair has traditionally been viewed as an object of confinement, recent advances in wheelchair technology, improved accessibility standards, and increasingly open-minded attitudes regarding the topic of disability have elevated the wheelchair as a tool for health, personal enjoyment and freedom.

Individuals who utilize wheelchairs for their daily mobility typically do so under the direction of physicians, licensed physical therapists, and other clinicians who are well-versed in the application of adaptive mobility devices. Ideally, clinicians also educate and encourage their patients to engage in physical activity, to the greatest extent that their abilities will allow, for the sake of overall physical and psychological well-being. Such activity helps to maintain cardiovascular health, muscle strength and endurance, flexibility, range of motion, and an attitude of health and vitality. Additionally, clinical practices emphasize the independence and safety of the individual, looking at his or her day-to-day activities in the home, in the neighborhood, and in the surrounding community.

The contrast between indoor floor surfaces and outdoor terrain may vary depending on seasonal factors such as rain and snowfall, which significantly impact traction; this may be further influenced by the frequency of efforts in the locale, or lack thereof, to maintain and clear roadways, sidewalks, and driveways. For example, urban residences may benefit from prompt snow removal and de-icing services, whether by public services or by private grounds maintenance crews, whereas rural neighborhoods or farmsteads may not have access to such services. A wheelchair user residing rurally is thus likely to experience a more profound contrast between the indoor environment and that of the outdoors.

Transit in urban environments as well as long-distance travel involving transportation in vehicles such as cars, buses, trains, airplanes, small watercraft, or larger vessels, require the wheelchair user to adapt to the space allowed inside the vehicle upon boarding and to again adapt to the space outside the vehicle upon arriving at his or her destination. Quickly and successfully transitioning from one environment to the next requires knowledge and confidence on the part of the user as well as a suitably versatile wheelchair arrangement.

The aforementioned considerations are central to prior and ongoing efforts to develop adaptive devices which enable a wheelchair user, caretaker, assistant, or medical staff member to rapidly reconfigure a wheelchair according to the demands of the physical environment being encountered, especially in a manner which allows the user to remain comfortably seated throughout the process of reconfiguring the wheelchair.

SUMMARY OF THE INVENTION

In the context of technology in the art of wheelchairs and attachments therefor, the present invention concerns the challenge of wheelchair adaptability and addresses the need for rapid, robust, and versatile means for reconfiguring modern wheelchairs to meet the demands of a variety of environments to enable activities such as those illustrated above. Attempts have been made in the prior art to offer wheelchair users a solution to the need for fast and simple reconfiguration, particularly for all-terrain use, but there has remained a need for more robust, interchangeable, adjustable and customizable reconfiguration means.

Embodiments of the invention disclosed herein include a recline-action load-bearing transitioning mechanism for use with a wheelchair, the wheelchair having a frame, a pair of symmetrically-opposing rear drive wheels, and a pair of symmetrically-opposing forward primary caster wheels. The mechanism serves as a means for an occupant of a wheelchair, or an assistant thereof, to repeatably alternate the wheelchair between:

a) an original load-bearing configuration during which a load carried by the wheelchair is supported by the frame, the pair of rear drive wheels, and the pair of forward primary caster wheels, and b) a modified load-bearing configuration during which the load carried by the wheelchair is supported by the frame, the pair of rear drive wheels, and a load-transitioning mechanism integrated with a ground-contacting adaptive implement.

The mechanism thus alternates the wheelchair between the original load-bearing configuration and the modified load-bearing configuration to transform the load-bearing characteristics of the wheelchair while the wheelchair is supporting the seated occupant.

Embodiments of the present invention afford a wheelchair user improved ease and versatility by enabling the user to connect, willfully engage, willfully disengage, and disconnect the ground-contacting adaptive implement for use with the wheelchair, said adaptive implement operated by the user in conjunction with the transitioning mechanism to alternate the wheelchair between the original load-bearing configuration and the modified load-bearing configuration.

Upon willful alternation of the wheelchair to the modified load-bearing configuration, the ground-contacting adaptive implement is maintained in a deployed angular disposition during travel of the wheelchair in all directions, said adaptive implement moving in concert with movements of the wheelchair as it is motivated by the user towards a desired orientation or in a desired direction of forward or backward travel.

The ground-contacting adaptive implement may comprise a wheel, a pivotable caster, a wheeled suspension assembly, an omnidirectional wheel, a motorized wheel, a ski, a skid, or other such means for improving the user's ability to traverse difficult or unfamiliar terrain for which the unadapted wheelchair is poorly suited.

As a result of suitably reconfiguring the wheelchair to meet the demands of the terrain, the user benefits from improved forward stability of the wheelchair and decreased resistance during propulsion. Consequently, the user is relieved from excessive hand, arm, and shoulder strain and also the intense downward concentration otherwise required to avoid stones, cracks or other surface irregularities which obstruct free transit and which often pose a substantial safety issue due to the risk of tipping forward and falling out of the wheelchair. A subtle though readily noticeable result is that the user's head, neck and shoulders are maintained in a more comfortable posture, as the user is instead able to sit in a more comfortable upright position; he or she may now attend to more distant objects, enjoy taking in the surroundings, and fully relax the hands and arms after each propulsion cycle.

The mechanism is intended to be secured to at least one of the opposing forward frame tubes of the wheelchair, and the invention further comprises a user-accessible control switch to enable the user to prepare the transitioning mechanism for engaging and for disengaging the ground-contacting adaptive implement operatively connected to the transitioning mechanism without needing to exit the wheelchair or assume a difficult position while securing, operating, or releasing the device.

The mechanism defines a single joint and comprises a rotary overrunning clutch which selectably engages and disengages a rotatable portion of the joint connected to a ground-contacting implement relative to a fixed portion of the joint connected to the frame of the wheelchair. While disengaged, the rotatable portion rotates relative to the fixed portion about a substantially horizontal joint axis passing through said joint. While engaged, the rotatable portion is prevented from moving relative to the fixed portion and the rotary overrunning clutch bears torque in a first direction of rotation about the substantially horizontal axis as weight is supported through the entire mechanism and implement apparatus. Also, a rotation-limiting stop or detent prevents the rotatable portion from moving relative to the fixed portion in a second, opposing direction of rotation about the joint axis.

Embodiments of the mechanism further comprise means for locking or binding the movable portion relative to the portion affixed to the wheelchair in order to substantially increase the rigidity of the connection therebetween; locking or binding capabilities are enabled by a releasable binding assembly comprising a screw, bolt, or a quick-release camlever, the latter similar to the type commonly used in bicycles such as for tubular seatpost adjustment or the like. Upon securing the releasable binding assembly in a binding disposition, relative movement or "play" is effectively eliminated between the rotatable portion of the device and the portion affixed to the wheelchair, with the exception of minor relative movement produced by deformative strain or flex induced in the structural members during normal use.

While deployed, the adaptive implement is releasably and solidly unified with the frame of the wheelchair, with the ground-contacting implement maintained in a predetermined angular orientation relative to the frame of the wheelchair, by virtue of said binding means and said rotation-limiting detent.

The mechanism may be incorporated into a convertible wheelchair having permanent or semi-permanent components attached thereto, said components intended for securing and transitioning at least one of an array of specialized ground-contacting adaptive implements through an operation sequence to alternate the wheelchair between an original load-bearing configuration and a modified load-bearing configuration, with the ground-contacting implement maintained in a predetermined angular orientation relative to the frame of the wheelchair while the wheelchair is in the modified load-bearing configuration.

Alternate characterizations of the present invention which include the recline-action load-bearing transitioning mechanism for the purpose of wheelchair reconfiguration are as follows:
  i. a wheelchair-attachable ground-contacting reconfiguration apparatus;
  ii. a wheelchair reconfiguration system for outfitting a wheelchair with at least one ground-contacting adaptive implement; and
  iii. a reconfigurable wheelchair capable of being outfitted with at least one ground-contacting adaptive implement.

In each of the aforementioned inventive settings, the included mechanism enables the user to willfully transition through a cyclic operation sequence as a means of reconfiguring the wheelchair while remaining comfortably seated in the wheelchair.

The present invention may also be characterized by a method in which the aforementioned mechanism is used to carry out the operation sequence necessary for attachment, engagement, disengagement, and detachment of at least one ground-contacting adaptive implement for the purpose of alternating the wheelchair between an original load-bearing configuration and a modified load-bearing configuration to transform the load-bearing characteristics of the wheelchair while the wheelchair is supporting a seated occupant.

The present invention may also be characterized by a method in which a wheelchair is equipped with the aforementioned mechanism to enable a user of the wheelchair, such as a seated occupant of the wheelchair or an assistant thereof, to carry out the operation sequence necessary for attachment, engagement, disengagement, and detachment of a ground-contacting implement to transform the load-bearing characteristics of the wheelchair while the wheelchair is supporting the seated occupant.

The present invention may also be characterized as a method for enabling transformation of a wheelchair between an original load-bearing configuration wherein a wheelchair-adapting implement may be freely attached to or removed from the wheelchair, and a modified load-bearing configuration wherein said wheelchair-adapting implement bears at least a portion of a load carried by the wheelchair, said method including: instructing the user to perform a cyclic operation sequence to enable the user to alternate the wheelchair between the original load-bearing configuration and the modified load-bearing configuration; and equipping the wheelchair for use with a single-jointed load transitioning mechanism adapted to enable the user to perform the cyclic operation sequence,
  the cyclic operation sequence comprising:
  a) connecting a wheelchair-adapting implement in a position relative to the wheelchair to operatively interpose the single-jointed load transitioning mechanism between the wheelchair and the wheelchair-adapting implement;
  b) transitioning the single-jointed load transitioning mechanism from an attach/release stage to a pre-deployment stage, comprising toggling an alternating switch to prepare a movable bearing for moving towards a position of engagement with a bearing surface;

c) transitioning the single-jointed load transitioning mechanism from the pre-deployment stage to a deployment stage, comprising the user reclining the wheelchair rearward between about 3 degrees and 6 degrees, wherein reclining the wheelchair enables the movable bearing to move into the position of engagement with the bearing surface;

d) transitioning the single-jointed load transitioning mechanism from the deployment stage to a pre-release stage, comprising toggling the alternating switch to prepare the movable bearing for moving away from the position of engagement with the bearing surface; and e) transitioning the single-jointed load transitioning mechanism from the pre-release stage to the attach/release stage, comprising the user reclining the wheelchair rearward between about 3 degrees and 6 degrees, wherein reclining the wheelchair enables the movable bearing to move out of the position of engagement with the bearing surface; and f) disconnecting the wheelchair-adapting implement from the position relative to the wheelchair.

The cyclic operation sequence consists of four distinct stages: an original load-bearing or "attach/release" stage, a transitional "pre-deployment" stage, a modified load-bearing or "deployment" stage, and a transitional "pre-release" stage. In order to carry out the full operation sequence, a controlled recline maneuver is performed to engender relative rotation between the portion of the apparatus affixed to the wheelchair and the rotatable portion connected to the ground-contacting adaptive implement. Said controlled recline maneuver serves as an essential means by which the user effectuates alternating movements of the movable bearing(s) contained within the mechanism.

The controlled recline maneuver, also referred to as a "wheel-stand maneuver" or a "wheelie," involves a momentary, controlled recline motion that is a useful and well-known aspect to everyday wheelchair maneuvering and which is taught to many wheelchair users by physical rehabilitation clinicians. The wheel-stand maneuver simultaneously moves the overall user-wheelchair center of gravity rearward, reclines the seat, backrest, and frame, and elevates the front of the wheelchair. To a similar end, preferred embodiments may usefully enable an assistant to controllably recline the occupied wheelchair, such as from behind the seat of the wheelchair, while grasping handles or other rigid features affixed to or integrated with the backrest of the wheelchair.

An apparatus according to the present invention also utilizes the force of gravity for engendering said relative movement of the affixed portion and the rotatable portion about the rotation axis passing through the load-transitioning mechanism. During the wheel-stand maneuver, the apparatus is subject to angular changes of the wheelchair frame as well as the downward force of gravity acting upon the apparatus as the front of the wheelchair is elevated from contact with the ground surface. Assuming the wheelchair is situated on a level ground surface, the downward force of gravity is orthogonal with respect to an overall recline axis about which the whole wheelchair and the user's body rotate during the wheel-stand maneuver. Accordingly, preferred embodiments of the present invention are configured with the joint axis of the mechanism at the union of the affixed portion and the rotatable portion wherein relative rotation is enabled between the affixed portion and the rotatable portion, about the substantially horizontal axis, as the user controllably reclines the wheelchair.

The horizontal axis, though preferably parallel to the overall recline axis of the whole wheelchair during the wheel-stand maneuver, may instead be oriented longitudinally or diagonally with respect to the frame of the wheelchair without departing from the spirit of the invention. Furthermore, the frames of many modern wheelchairs have front angles which substantially deviate from vertical, such as those having an inward taper and a forward projection of the front tubes leading down towards the footrest; such frame geometries may impose a deviation of the joint axis of the mechanism away from being perfectly horizontal. Additionally, many wheelchairs have seat angles which substantially deviate from horizontal, such as those having a difference between front and rear height of the longitudinal seat support tubes. Thus, depending on the geometry of the frame portion to which the apparatus is attached, which may include tubing, plates, or other structural components, useful adjustment means including bolts, screws, plates, collars, clamps, or the like, may be necessary to fix the axis of the primary joint of the transitioning mechanism in a substantially horizontal orientation to properly utilize the force of gravity while performing the wheel-stand maneuver to ensure correct functioning of the transitioning mechanism.

While in the modified load-bearing configuration, the forward primary caster wheels of the wheelchair are, preferably, elevated so that they are free from contact with the ground surface, such that a clearance gap measuring at least about 5 mm is maintained below the bottom of the forward primary caster wheels as the wheelchair is rolled over a flat surface. The clearance gap may, instead, measure about 10 mm, 15 mm, 20 mm, 25 mm, 30 mm, 35 mm, 40 mm, 45 mm, or 50 mm, depending on the user's preferences. A larger clearance gap will help to ensure that the forward primary caster wheels do not contact loose or rough terrain below, but will recline the wheelchair seat rearward and will markedly alter the user's posture. On the other hand, a smaller clearance gap will increase the likelihood that the forward primary caster wheels will contact loose or rough terrain below, at times imposing increased rolling resistance, but will also maintain the user in a less reclined, more upright seated posture.

In order to reliably support downward loading due to the weight of the wheelchair and the occupant, the movable bearing of the mechanism must transmit torque through the joint of the mechanism in a manner which does not allow slipping to occur between the opposing first and second bearing surfaces, and this may be achieved through one of a variety of different types of movable bearing arrangements. Examples may be found in the prior art which exemplify useful arrangements comprising a movable bearing which is selectably engaged and disengaged for the purpose of releasably transmitting torque about a singular joint.

Some examples utilize a linearly protracting-retracting bearing arrangement. That which is described in U.S. patent application Ser. No. 14/314,030, "Unilateral Transition Means For Adapting A Wheelchair," hereby incorporated by reference in its entirety, includes the provision of a protracting and retracting load-transmission assembly to alternate a movable bearing into and out of a torque-bearing position. In U.S. Pat. No. 6,308,804, "Quick Connect Wheelchair Brake Lock," a rotary lock system is described in which a cone-shaped actuator pin contained within a load-bearing pin housing is alternated by a cam-actuated slide mechanism between a protracted position and a retracted position relative to a chamfered receiving hole, for the purpose of inhibiting rotation of a wheel. In both cases, torque is transmitted through—or alternatively stated, rotation is inhibited relative to—the movable bearing from a first bearing surface to an opposing, second bearing surface.

Other examples, such as those found in the art of roller-based and sprag-based overrunning clutches, employ arcuate movement of a movable bearing about the axis of a primary joint to engender releasable torque transmission. Arcuate or circumferential movement of at least one movable bearing by a cage, or similar means of applying urging force thereagainst, urges the movable bearing into and out of a wedged disposition between opposing first and second bearing surfaces of the primary joint, for the purpose of transmitting torque—or for inhibiting relative rotation—in a desired direction between a first bearing surface and an opposing, second bearing surface. Examples can be found in U.S. Pat. No. 2,427,120 "Two-way Overrunning Clutch," U.S. Pat. No. 3,476,226 "Overrunning Clutch With Controlled Operation," and U.S. Pat. No. 7,261,309 "Wheelchair Drive Mechanism." Furthermore, that which is described in U.S. patent application Ser. No. 14/952,810, "Reconfiguration Means For A Wheelchair," hereby incorporated by reference in its entirety, includes the provision of a rotary switch mechanism to alternate a plurality of movable bearings, contained within a releasable overrunning clutch into and out of a torque-bearing relationship between a first bearing surface and a second bearing surface.

In an embodiment of the present invention, a ratchet-pawl overrunning clutch mechanism comprises a pivotable pawl which functions as a movable bearing; the mechanism further comprises an engagement surface and has a primary pivot joint having a rotatable portion connected to a ground-contacting implement and a fixed portion connected to the frame of the wheelchair. Articulated rotation of the pawl about its own pawl pivot joint permits selectable load-bearing captivation of the pawl between a first bearing surface and a second bearing surface to releasably transmit torque between the opposing first and second bearing surfaces. Said joints exhibit a slight amount of rotational play to allow for free rotation of the pawl upon alternation to the original load-bearing configuration by way of the user manipulating the switch of the transitioning mechanism and subsequently performing the wheel-stand maneuver. The pawl and the second bearing surface may both further comprise a plurality of teeth to promote engagement therebetween and to ensure that slipping does not occur during the modified load-bearing mode.

In preferred embodiments, the first bearing surface and the second bearing surface are configured with sufficient clearance therebetween to allow for translation or rotation of the movable bearing, or a combination of these movements, upon urging of the movable bearing in the selected direction and performing the wheel-stand maneuver. In addition, the first and second bearing surfaces are materially composed to withstand compressive contact with the movable bearing while also permitting release from contact upon arming the mechanism to sustainedly urge the movable bearing away from contact and upon subsequently performing the wheel-stand maneuver to effectuate said release from contact.

The mechanism further includes a reversible force sustainment subassembly to enable the user to selectably place the mechanism in either a state of sustainedly urging the movable bearing towards contact with the bearing surfaces or a state of sustainedly urging the movable bearing away from said contact. In preferred embodiments of the present invention, the reversible force sustainment subassembly comprises a manipulable switch operatively connected to at least one force sustaining spring, wherein the force sustaining spring is capable of sustainedly supplying an urging force to the movable bearing and wherein the force sustaining spring is further capable of removing said urging force. A suitable force sustaining spring may be a compression spring, an extension spring, or a torsion spring, operatively interposed between a user-controlled actuator, such as a knob or handle, and a cage of the overrunning clutch adapted for displacing a movable bearing or a plurality thereof.

In preferred embodiments, force sustainment means combine with a releasable overrunning clutch to form a mechanically-actuated load transitioning mechanism, wherein said manipulable switch comprises a knob or handle, a lever arm, and said force sustaining spring is composed of steel, stainless steel, nickel, titanium, or an alloy thereof, or a suitable elastomer, wherein the spring is capable of assuming a relaxed form and a deflected, extended, compressed or otherwise tensed form.

A variety of switch and spring arrangements may be usefully implemented to serve as force sustainment means and remain within the spirit and scope of the present invention. Embodiments of the mechanism, which require a first sustaining force application means and a second, opposing sustaining force application means, may comprise any combination of extension, compression, or torsion springs or, alternatively, may comprise any other type of solid elastomeric element, in order to enable biasing of an overall "net" urging or sustaining force applied against the movable bearing. In some embodiments, the included reversible force sustainment subassembly comprises a single force sustainer, such as a spring, capable of deflecting in both a forward and a reverse direction to provide sustained force application against the movable bearing for selectable engagement and disengagement.

Force sustainment means may include a force sustainer cam and lever arrangement wherein upon rotating the lever about an axis passing through the force sustainer cam, the force sustainer cam imparts an alternation of the urging force against the movable bearing, thus enabling the user to repeatably toggle the mechanism between an engaging state and a disengaging state by manipulably imparting rotation to the force sustainer cam, via the lever, between two alternate positions. Furthermore, the force sustainer cam may composed of an elastic or otherwise deformable material which becomes compressed while the force sustainer cam is oriented to apply sustaining force against the movable bearing; such compressibility serves to enhance the sustained force against the movable bearing while also permitting a degree of movement of the movable bearing that may, for example, be required to permit a plurality of engagement teeth of a pawl-type movable bearing to advance over a plurality of engagement teeth of a toothed torque wheel.

Force sustainment means may include a linearly protracting-retracting assembly, as disclosed in U.S. patent application Ser. No. 14/314,030, wherein upon initially depressing or sliding a manipulable button or knob in a forward direction, the movable bearing is locked in a protracted position and wherein a second depression or sliding of the button or knob in the forward direction will retract the movable bearing into a retracted position, and wherein the sequence of protraction and retraction can be repeated.

Especially in the case of a roller-based or sprag-based overrunning clutch mechanism, suitable force sustainment means may include a rotatably-actuated arrangement such as a switchable rotary clutch capable of being alternated between a state of forward torque-bearing and a state of zero or reverse torque-bearing, wherein a switch lever is configured to be positioned along an arcuate path and to revolve about a rotary axis passing centrally through the load-transitioning mechanism. Upon the user manipulating said switch lever so that it comes to rest in a first retention groove along the arcuate path (or otherwise maintained in a first position), an internal spring biasing force placed upon the overrunning clutch is alternated to enable forward torque-bearing; upon the user manipulating said switch lever so that it comes to rest in a second, opposing retention groove along the arcuate path (or otherwise maintained in a second position), an internal spring biasing force placed upon the overrunning clutch is alternated to disable forward torque-bearing.

In embodiments comprising biasing or force sustainment means as described above, reversible force application means may include a first force sustainer such as a spring or elastomer capable of sustained force application against the movable bearing in an engaging direction and may further include a second such force sustainer capable of sustained force application against the movable bearing in an opposite, disengaging direction. At times when the force applied in the engaging direction is greater than the force applied in the disengaging direction, the net force applied against the movable bearing will favor engagement of the movable bearing with both bearing surfaces. Conversely, when the force applied in the engaging direction is less than the force applied in the disengaging direction, the net force applied against the movable bearing will favor disengagement of the movable bearing from at least one of the bearing surfaces.

Whether reversible force application means comprise a single reversible force sustainer or dual opposing force sustainers, the mechanism is configured to ensure that while the adaptive implement is non-load-bearing, upon the user placing the manipulable switch in a first position the movable bearing will be urged with sufficient force to establish and maintain contact with both the first and second bearing members. Now, in this non-load-bearing pre-deployment stage, upon the user engendering relative forward rotation of the first and second bearing surfaces by performing the wheel-stand maneuver, the movable bearing will be securely captivated between the first and second bearing surfaces, thereby transitioning the mechanism to the load-bearing deployment stage.

The mechanism is also configured to ensure that, while the forward portion of the load of the wheelchair is being supported by the adaptive implement during the deployment stage, upon the user placing the manipulable switch in a second position sufficient force will be applied against the movable bearing in a disengaging direction. Now, in this load-bearing pre-removable stage, upon the user engendering slight relative reverse rotation of the first and second bearing surfaces by performing the wheel-stand maneuver, the movable bearing will release from frictional binding or captivation between the first and second bearing surfaces, allowing it to instantly move away from its position of load-bearing engagement, thereby transitioning the device to the non-load-bearing releasable stage in which the user is enabled to remove the adaptive implement from the wheelchair.

Force sustainment means may comprise a user-manipulable switch housed separately from, though operatively connected to or in communication with, the movable bearing. Remote actuation, for the purpose of controlling the urging forces applied against the movable bearing, may instead be accomplished by transmitting linear force through an ensheathed cable or by a flexible rotary shaft, for example.

Force sustainment means, such as those described above, effectively translate a momentary manipulation of the switch by the user into a sustained application of force against the movable bearing to enable performance of the wheel-stand maneuver at a later, separate instant, to facilitate transitioning the mechanism through the cyclic operation sequence. In preferred embodiments, the duration of a switch manipulation event is substantially less than the duration of force application against the movable bearing, such as at least about one or two seconds less or at least about several seconds less. The duration of force application against the movable bearing may, in preferred embodiments, lasts as long as the user waits before performing the wheel-stand maneuver, wherein the resulting delay affords the user, upon toggling the switch, a sufficient amount of time to ready him- or herself in an upright seated position to comfortably and safely perform the wheel-stand maneuver.

It will be appreciated by those skilled in the art that the transition from the attach/release stage to the deployment stage involves the same intuitive, intentional actions that are required to carry out the transition from the deployment stage back to the attach/release stage. Advantageously, the user is afforded the ability to ready the device for transitioning, and then attend to performing the wheel-stand maneuver at a later instant, thereby making the operation simple for the user to carry out. Furthermore, the user is prevented from accidentally transitioning the device from the deployment stage to the attach/release stage as it is unlikely that he or she will unknowingly toggle the manipulable switch and unintentionally perform the wheel-stand maneuver. As a result, the user enjoys a safe and predictable experience both while the wheelchair is in its modified load-bearing configuration and during all moments of transitioning through the cyclic operation sequence.

Embodiments of the invention include forward rotation limiting means, such as a forward limit stop, to define a rotational endpoint in a forward direction of rotation, beyond which the ground-contacting adaptive implement is prevented from further rotation about the axis of the joint as the user performs the wheel-stand maneuver. In some embodiments, said rotation limiting means are disposed locally—that is, within or directly connected to the housing of the mechanism. The forward limit stop may be externally connected to a portion of the joint or, alternatively, contained inside the protective housing, wherein a rotary projection contacts the forward limit stop during relative rotation of the first joint member and the second joint member. In other embodiments, a rotation-limiting projection is disposed remotely, such as a bar or stand-off attached to the support arm which connects the adaptive implement to the housing of the mechanism, said rotary projection configured to contact a portion of the frame of the wheelchair as the user performs the wheel-stand maneuver, similarly defining the rotational endpoint in the forward direction of rotation. Whether disposed locally or remotely relative to the housing of the mechanism, it may be useful to include a compressible elastomeric element on at least one of the two opposing contact surfaces to enable a very slight degree relative rotation to transition the mechanism from the pre-release stage to the attach/release stage, upon compression of said elastomeric element between the movable joint member and the fixed joint member when performing the wheel-stand maneuver.

In some embodiments, it may be advantageous to incorporate a cam and lever assembly with the rotation limiting bar, stand-off or rotation-limiting projection to enable the user to impose relative tension among the movable bearing and the first and second bearing surfaces during the deployment stage to help increase the overall rigidity of the joint; such an arrangement thus serves as a releasable means for indirectly imposing pressure against the movable bearing to inhibit relative movement between the first bearing surface and the second bearing surface. As in the preceding paragraph, it may be of use to include a compressible elastomer in the contact portion of the cam.

Alternatively, it may be preferred in some embodiments to incorporate a clamp or a cam-actuated bar adapted to enable the user to tightly draw or affix the rotary portion of the apparatus against the frame of the wheelchair or against a portion of the apparatus fixed thereto, for the purpose of inhibiting movement of the rotary portion and thus increasing the rigidity of the connection of the adaptive implement to the wheelchair.

In some embodiments, it may be preferable to incorporate, within the protective housing, a cam and lever assembly comprising a tensioning skewer, said cam and lever assembly configured to releasably apply pressure or tension directly against the movable bearing, especially after the user has transitioned the mechanism to the deployment stage of operation, at which time it is most desirable to rigidize the joint.

Embodiments may thus include releasable means for both indirect and direct binding of the movable bearing in a fixed position to inhibit relative movement between the first bearing surface and the second bearing surface. Whether utilized separately or in combination, such means for inhibiting relative movement between opposing bearing surfaces (and thus, opposing joint members) serves to add rigidity to the union between the wheelchair and the attached ground-contacting adaptive implement, which is especially useful in situations where flutter of the adaptive implement is more likely to occur due to vibration. In addition, direct or indirect inhibition of bearing movement helps to further prevent accidental transition of the load-transitioning mechanism during use. Therefore, such provisions for rigidizing the joint during the deployment stage of operation confer enhanced stability and reliability, in turn improving the performance and safety of the vehicle during use.

The mechanism is enclosed within a protective housing to keep out dirt, debris, and moisture to prevent unwanted wear and corrosion of the bearing components, force sustainers, and related structures.

The option of adapting the same wheelchair in a variety of configurations would be appreciated by a person experienced in the art of adaptive wheelchair mobility as being advantageous as a consequence of the versatility afforded to the user. Active wheelchair users, for example may wish to utilize such a means for recreation, exercise, or for enjoyment of scenic or otherwise enjoyable locations outdoors which might include nature trails, playgrounds, grassy fields, snow-covered areas, and muddy or swampy areas. Other activities may be performed out of necessity, such as negotiating a rough gravel driveway or other path to access a garage, mailbox or wood shed. Occupational, avocational, and "everyday" activities which may be addressed at least in part by embodiments of the present invention include outdoor chores such as maintaining trees, shrubs, gardens, and other landscaping work, which at the very least require the individual to be able to negotiate terrain that is unlikely as flat and smooth as indoor floor surfaces.

Asymmetric configurations may be desirable in cases where a single laterally-attached implement is sufficient for performing the task at hand. As an example, it may be suitable to use a single large all-terrain caster implement to place the wheelchair in a three-wheel configuration wherein the primary casters of the wheelchair are elevated and unloaded and the all-terrain caster implement is positioned in front of the wheelchair and in alignment with a vertical longitudinal centerline passing through the wheelchair. Examples are illustrated in U.S. patent application Ser. No. 13/249,278 "Asymmetric Open-access Wheel Chair" and in U.S. Pat. No. 8,585,071 "Releasable Forward Wheel Apparatus For A Wheelchair," both of which are herein incorporated by reference in their entireties. In such examples, a single caster imparts additional forward stability and reduced rolling resistance to the wheelchair while also permitting the user to transfer to and from the seat of the wheelchair with minimal obstruction to the user's legs and feet at a forward lateral region of the wheelchair.

Whether utilizing symmetric or asymmetric attachment configurations, it is necessary to ensure releasable, secure alignment and retention of attached adaptive implements connected to the frame of the wheelchair. For the sake of versatility and convenience, embodiments include provisions for switching out or swapping different ground-contacting adaptive implements for the purpose of quickly reconfiguring the wheelchair, preferably to enable interchangeable attachment of an array of adaptive implements to the wheelchair. Provisions to ensure releasable, secure alignment and retention may include:

a) insertable alignment pins, such as those having a ball and a spring configured to resist pullout, or a positively locking ball detent mechanism to ensure pullout does not occur unless a button is depressed;

b) an expanding insertion pin, wherein compressive force holds the pin in tight engagement within a receptacle to establish a unified, "play-free" and "wiggle-free" connection between the separable adapting member and the mounting member;

c) a coupling comprising a solid or tubular insert having a round profile, used in conjunction with an anti-rotation collar for preventing rotation of coupled members;

d) couplings comprising solid or tubular inserts having polygonal, spline, or keyed profiles for preventing rotation of coupled members;

e) quick-release collars for releasably securing coupled members.

In preferred embodiments, the adaptive implement is secured relative to a forward portion of the wheelchair in a releasable fashion, including simple, fast and easy means of attaching and releasing the entire apparatus to and from the forward portion of the wheelchair. In variations thereof, a system according to the present disclosure may be configured for leaving a mounting member attached to the wheelchair, whether clamped, bolted, welded or otherwise permanently or removably secured to the wheelchair, to facilitate attaching and releasing of the apparatus by way of a separable adapting member comprising quick-release features.

In preferred embodiments of the invention, the joint of the mechanism and all attachment components are sufficiently rigid so that the performance, safety, and longevity of all fixed and movable components of the transitioning mechanism, as well as those secured to the wheelchair, are substantially unaffected by torsional strain and asymmetric loading placed upon the apparatus as a result of a load borne completely or in part by the apparatus.

Sufficient movement of the movable bearing is necessary to enable rapid and reliable attachment, operation, and detachment to successfully transition the device through the cyclic operation sequence. In particular, the joint of the mechanism must exhibit a minimum degree of rotation during the pre-release stage to enable transition to the attach/release stage, such as at least about 0.5 degrees, or at least about 1.0 degrees, or at least about 2.0 degrees, or at least about 5.0 degrees of relative rotation between the first and second bearing surfaces. A sufficiently robust joint helps to isolate this requisite rotation without introducing unwanted play or wiggle of the joint and ensures strong, secure and play-free load-bearing engagement of the movable bearing between the first and second bearing surfaces during the modified load-bearing mode.

Advantages set forth by embodiments of the present invention may be achieved by exploiting at least one lateral portion of the wheelchair which, especially in the case of rigid-type "everyday" wheelchairs, is predominantly devoid of structural components and accessories. Patents such as U.S. Pat. No. 7,520,518, "Wheelchair" issued to Peterson, et al. and U.S. Pat. No. 6,311,999 "Wheelchair With A Closed Three-dimensional Frame" issued to Kueschall, and U.S. Pat. No. 8,573,622 "Wheelchair" issued to Papi, which exemplify modern wheelchairs and architectures thereof, may be useful for visualizing the relevant lateral regions of such wheelchairs and for appropriately applying transition means for purposes described herein. In many cases, the aforementioned lateral region is suitable, spatially and structurally, for accommodating elements necessary for reliable attachment of adaptive devices to robust portions of the wheelchair and for convenient operation of the load-transitioning mechanism, including manipulation of the switch by the user.

In a first embodiment configuration of the present invention a single load-transitioning mechanism connects an adaptive implement, in an asymmetric fashion, to a lateral portion on a first side of the wheelchair. In a second embodiment configuration, a first load-transitioning mechanism connects a first adaptive implement to a lateral portion on a first side of the wheelchair and a second load-transitioning mechanism connects a second adaptive implement to a lateral portion on a second, opposing side of the wheelchair. In a third embodiment configuration, a single load-transitioning mechanism connects one or more adaptive implements to opposing lateral portions on both sides of the wheelchair in a symmetric, bilateral fashion. In each of the aforementioned cases, significant torsion is likely to be experienced due to imbalanced loading which occurs either due to lateral placement of the apparatus or simply by virtue of asymmetric contact of the adaptive implement with the ground surface. Therefore, proper functioning of all embodiments the present invention must withstand imbalanced or asymmetric forces placed upon clamping members, support members, and bearing members.

An additional aim of the present invention is to ensure that, while detached, the adaptive implement remains correctly adjusted so that it may be reliably re-attached to the wheelchair and engaged in a position which confers optimal performance. In meeting these challenges together, embodiments of the present invention enable precise, repeatable alternating of the wheelchair between the original load-bearing mode during which the forward portion of the load carried by the wheelchair is fully supported by the primary caster wheels, and the modified load-bearing mode during which the forward portion of the load is at least partially supported by the ground-contacting adaptive implement.

It will be appreciated by persons skilled in the art that embodiments of the present invention further comprise features which facilitate securing and removal of the device and for carrying out the cyclic operation sequence by a diverse population of users exhibiting a broad range of abilities, especially regarding manual dexterity and upper body strength. Features included in embodiments of the invention, such as oversized quick-release lever handles, contoured knobs, push-buttons, and the like, for example, make it easier for individuals having reduced manual grip strength and sensation to be able to tighten a quick-release collar or to actuate a manipulable control switch associated with a load-transitioning mechanism.

Some embodiment configurations may be suitable for use by individuals capable of leaning down, from a seated position, and accessing lower portions of the wheelchair frame for attachment and detachment purposes, whereas alternate embodiment configurations may be needed by individuals who are more comfortable remaining in a substantially upright seated position. A user, for example, who is strong and flexible enough to reach down and secure a transitioning apparatus to a portion of the frame about 12 inches above the ground will likely enjoy the benefit of having a clamping-type transitioning apparatus wherein the entire device may be removed to minimize the weight of the wheelchair when the device is not needed. A user who prefers to remain seated upright, on the other hand, may find it more practical to configure her wheelchair with a non-removable mounting member capable of accepting an attaching member of the apparatus which is separable from the mounting member, the mounting member being semi-permanently secured to the frame of the wheelchair and disposed at a higher and more rearward location such as about three inches below the seat and about midway between the front of the frame and the front of the rear drive wheel.

For added convenience to the user, embodiments may include provisions for stowing adaptive implements behind or beneath the seat of the wheelchair while the wheelchair is in its original load-bearing configuration. Clamps, clips, perches, or other connectors may be utilized for the purpose of releasably securing adaptive implements at locations on the wheelchair which are unobtrusive and which are easy for the user to access.

Preferred embodiments are lightweight, compact, durable, and aesthetically appealing, which are exemplified by designs, components, construction methods and materials utilized in the bicycle industry and which have gained widespread use in adaptive wheelchair sports and recreation equipment. Modular design principles, such as standardization and partitioning, may be utilized to reduce manufacturing costs, increase the number of configuration options, and allow for proper, customized fitting to a wider range of makes and models of existing wheelchairs available in the marketplace.

Instructing a user may be accomplished by way of a paper or electronic manual containing a written description and/or illustration of the aforementioned sequence of operation to the user, whether packaged with the product, delivered in-person by a technician or sales representative, or delivered or transmitted separately through the mail or over the Internet. Further, use of video for the purpose of instructing the user may be especially helpful for conveying the steps involved, whether packaged with the product, delivered in-person by a technician or sales representative or delivered or transmitted separately such as with a video download through a company website or a third-party Internet video service. Instructing a user may further involve providing training, such as through in-service meetings or workshops, to physical therapists, medical staff members, or similar clinicians who are qualified to assist the user in the education process.

BRIEF DESCRIPTION OF THE DRAWINGS

The above-mentioned features of the invention will become more clearly understood from the following detailed description of the invention read together with the drawings in which:

FIGS. 7A-J show a wheelchair occupant reconfiguring a wheelchair equipped with left and right ratcheting pawl-type transitioning mechanisms having forward-inserting couplings adapted to receive left and right caster wheel implements.

DETAILED DESCRIPTION OF THE DRAWINGS

The drawings described hereinafter are intended for the purpose of illustration rather than limitation.

To facilitate understanding of the figures, structural elements located on the right side of the wheelchair as well as any attachments thereto, from the perspective of an occupant of the wheelchair, have been labeled with the suffix "R" following the numeral corresponding to the structural element. Similarly, structural elements located on the left side of the wheelchair and any attachments thereto have been labeled with the suffix "L" following the numeral corresponding to the structural element. In cases where the aforementioned labeling convention does not aid in understanding a particular figure, the suffix has been omitted and only the numeral has been used. For example, the left-side rear drive wheel is referred to by label "120L," and the right-side rear drive wheel is referred to by label "120R"; however, in a side-view illustration wherein 120L cannot be visibly distinguished from 120R, the rear drive wheels are collectively referred to by using label "120."

Figure 1A:
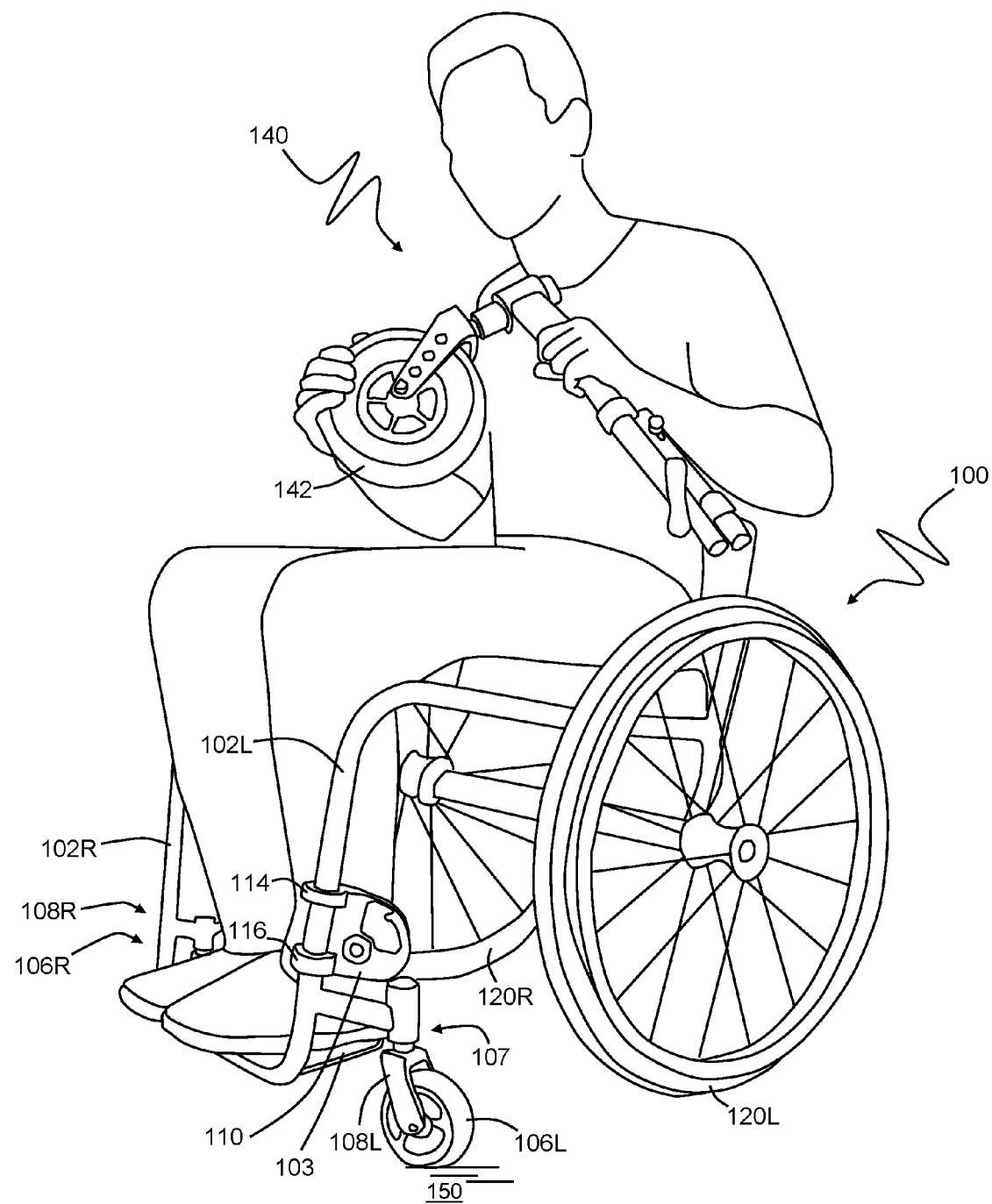
FIG. 1A shows a wheelchair occupant holding an adapting member equipped with a protract/retract-type transitioning mechanism and a large caster wheel implement while seated in a wheelchair outfitted with a mounting member. The wheelchair in FIG. 1A is in its original load-bearing configuration.

FIG. 1A depicts an occupant seated in a wheelchair 100, holding an adapting member 140 equipped with a large caster wheel 142 having a diameter of 8 inches. The wheelchair 100 has footrest 103 which, in this illustration, is in its lowest possible position relative to the ground surface 150. The wheelchair 100 also comprises rear drive wheels 120L and 120R of a diameter between about 20 and 26 inches, pivotable front caster wheel assemblies 108L and 108R (not visible) comprising primary caster wheels 106L and 106R (not visible) each having a diameter between about 3 and 5 inches, and left and right forward structural frame portions 102L and 102R. Rear drive wheels 120L and 120R support a rearward portion of the load carried by the wheelchair, including both a portion of the weight of a seated occupant (not shown) and a portion of the weight of the wheelchair itself. The wheelchair 100 is propelled, steered and slowed by the occupant gripping the rear drive wheels 120L and 120R or pushrims 122L and 122R (not visible) attached to said rear drive wheels 120L and 120R and applying muscle-derived force thereagainst to control the movement of the wheelchair 100. In an original, unadapted configuration, primary caster wheels 106L and 106R contact and roll over the ground surface 150 and support a forward portion of the load carried by the wheelchair, including both a portion of the weight of the occupant and a portion of the weight of the wheelchair itself. Load-bearing, in the original, unadapted configuration, is thus shared among primary caster wheels 106L and 106R and rear drive wheels 120L and 120R. As the wheelchair moves in a desired direction, the primary caster wheels 106L and 106R passively align in an orientation such that the horizontal rotational axis of each of the primary caster wheels 106L and 106R trails behind the vertical pivot axis of its respective pivotable caster assembly. As a result, the pivotable portion of each caster wheel assembly pivots about its respective vertical pivot axis in response to changes in the direction of the wheelchair enacted by the user.

The wheelchair 100 is configured with mounting member 110 secured to the left forward structural frame portion 102L of the wheelchair 100. Securing of the mounting member 110 to the left forward structural frame portion 102L may be accomplished by welding, bolting, or clamping, to establish a stable, permanent or semi-permanent attachment capable of withstanding vibration and which is intended to be subjected to substantial leverage and torsion. An ideal attachment of any adaptive implements to the wheelchair, by way of the mounting member, does not risk bending, denting, or otherwise deforming the structural frame portion of the wheelchair; in the depiction, the mounting member 110 comprises an upper attachment clamp 114 and a lower attachment clamp 116 for the purpose of distributing forces over as long of a length of the forward region of the wheelchair as reasonable without adding significant weight to the wheelchair and while maintaining the aesthetic appeal of the ultralight wheelchair frame. Right forward structural frame portion 102R does not have an attached mounting member, although it would suitably accommodate a mounting member of mirror-image construction in comparison to that of mounting member 110. The mounting member 110 is attached to left forward structural frame portion 102L such that it occupies a space immediately above caster cylinder 107 which houses bearings and fastening elements to enable primary caster wheel assembly 108L to pivot freely in all directions.

Figure 1B:
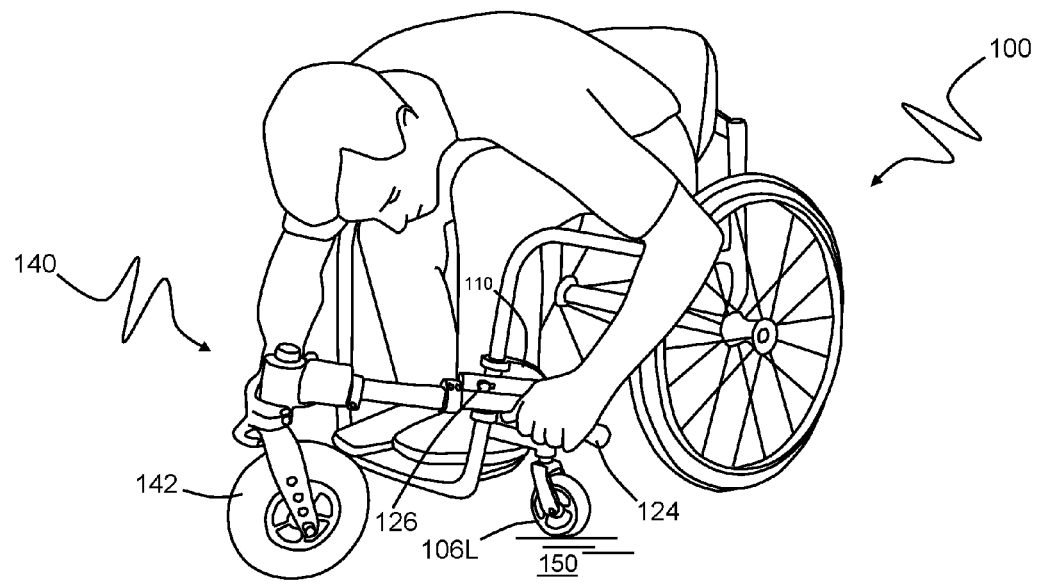
FIG. 1B shows the wheelchair occupant leaning forward and connecting the adapting member to the mounting member with the protract/retract-type transitioning mechanism in the attach/release stage of operation.

FIG. 1B depicts the seated wheelchair occupant leaning forward and placing the adapting member 140 in a coupled position relative to the mounting member 110. With his left hand, the user is also pulling inwardly on expansion pin assembly lever handle 124 to secure the inserted position of an expanding insertion pin (not shown) relative to the mounting member 110; the coupling or union established therein prevents relative lateral movement between the adapting member 140 and the mounting member 110, yet permits relative rotational movement therebetween. Input knob 126 is seen in its forwardmost position.

Figure 1C:
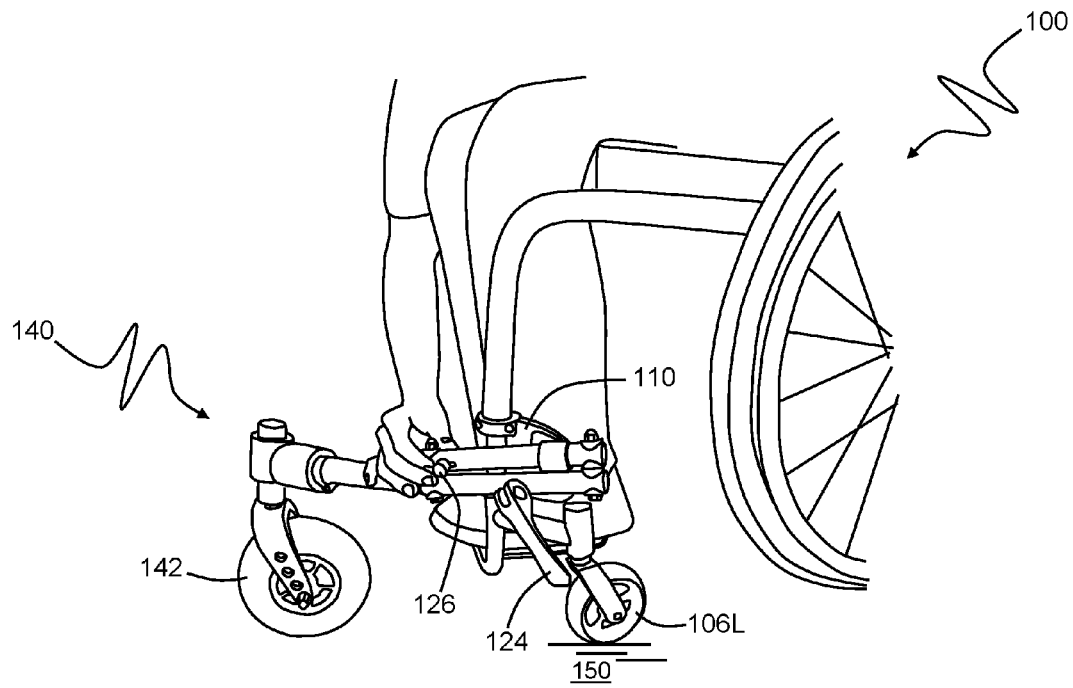
FIG. 1C shows the wheelchair occupant manipulating a sliding knob on the adapting member to put the protract/retract-type transitioning mechanism in the pre-deployment stage of operation.

In FIG. 1C, the user is pushing with his right hand, in the rearward direction, against the input knob 126 to switch the mechanism of the adapting member to an internal pre-deployment stage, after which action the input knob 126 will return to its forwardmost position.

Figure 1D:
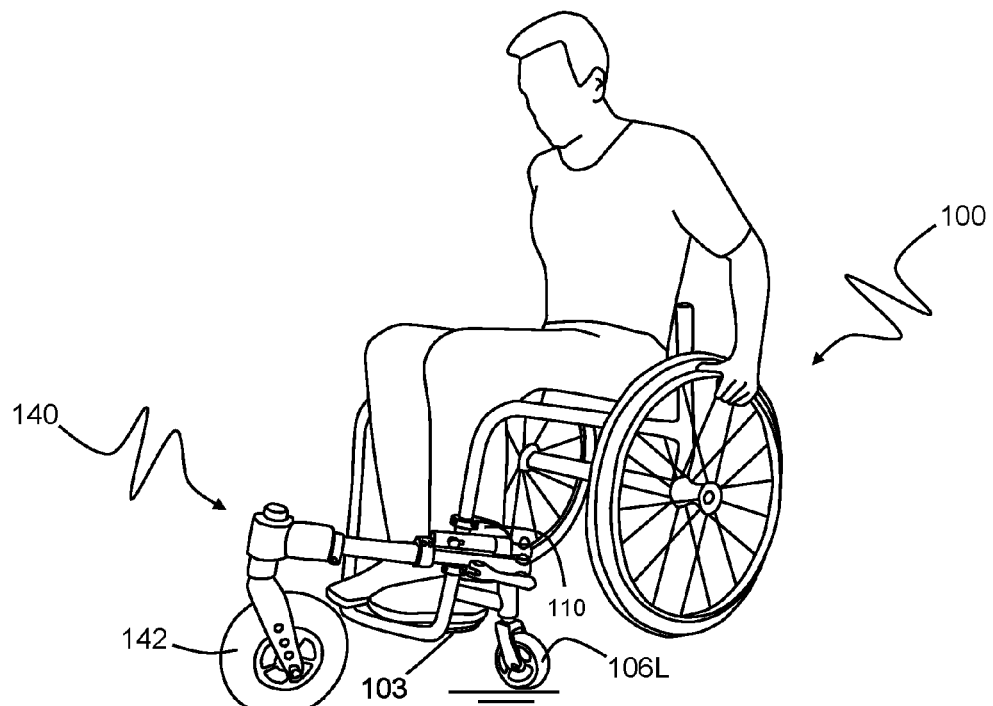
FIG. 1D shows the wheelchair occupant sitting upright and beginning to perform a wheel-stand maneuver to effectuate the transition of the protract/retract-type transitioning mechanism to the deployment stage of operation.

FIG. 1D shows the user sitting upright, preparing to perform a wheel-stand maneuver. At this moment, the large caster wheel 142, primary caster wheels 106L (visible) and 106R (not shown), and rear drive wheels 120L and 120R are all in contact with the ground surface 150. Also, at this time, the primary caster wheels 106L and 106R are bearing a portion of the load carried by the wheelchair, which includes both the weight of the occupant and the wheelchair itself. The adapting member 140 and the large caster wheel 142 are non-load-bearing and are upwardly and downwardly rotatable about the axis of the expanding insertion pin (not shown).

Figure 1E:
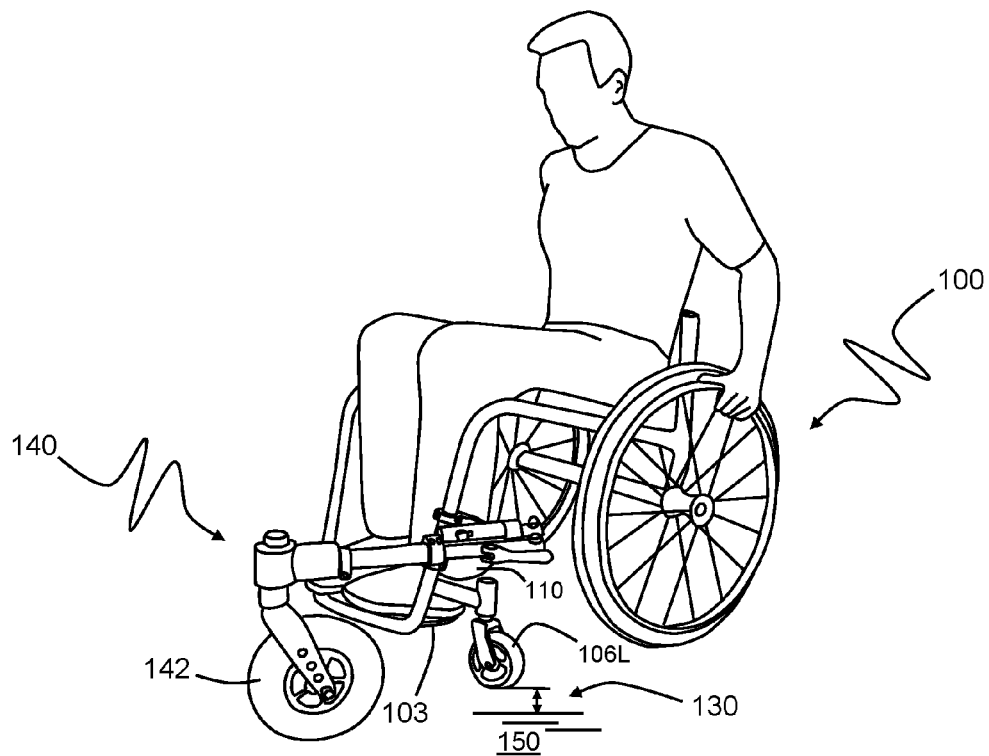
FIG. 1E shows the wheelchair occupant sitting upright with the wheelchair in the modified load-bearing configuration and with the protract/retract-type transitioning mechanism in the deployment stage of operation after the user has performed the wheel-stand maneuver.

Illustrated in FIG. 1E, as the user controllably leans his torso backwards while pushing forwardly against the upper regions of rear drive wheels 120L and 120R, the large caster wheel 142 remains in contact with the ground surface 150 and the primary caster wheels 106L and 106R become elevated from the ground surface 150 so that they no longer bear any portion of the load that is carried by the wheelchair. The primary caster wheels 106L (visible) and 106R (not shown) as well as the footrest 103 are all transitioned to an increased vertical position relative to the ground surface 150, thereafter leaving substantially more clearance beneath these forward structures of the wheelchair 100. As a result of this increased clearance, obstacles laying on or contained within the ground surface 150 may be more readily traversed over by the user, who also experiences decreased rolling resistance and increased forward stability with now having the mechanism in the deployment stage and the wheelchair in a modified load-bearing configuration.

Removing the adapting member 140 and caster wheel 142 from the wheelchair 100 is accomplished by carrying out the sequence depicted in FIGS. 1A through 1E in reverse order, which ultimately results in transitioning the mechanism from the deployment stage to the attach/release stage and subsequently decoupling the adapting member 140 from the mounting member 110 to return the wheelchair back to its original, unadapted load-bearing configuration wherein the primary caster wheel assemblies 106L and 106R contact and roll over the ground surface 150 and support the forward portion of the load carried by the wheelchair.

Figure 2:
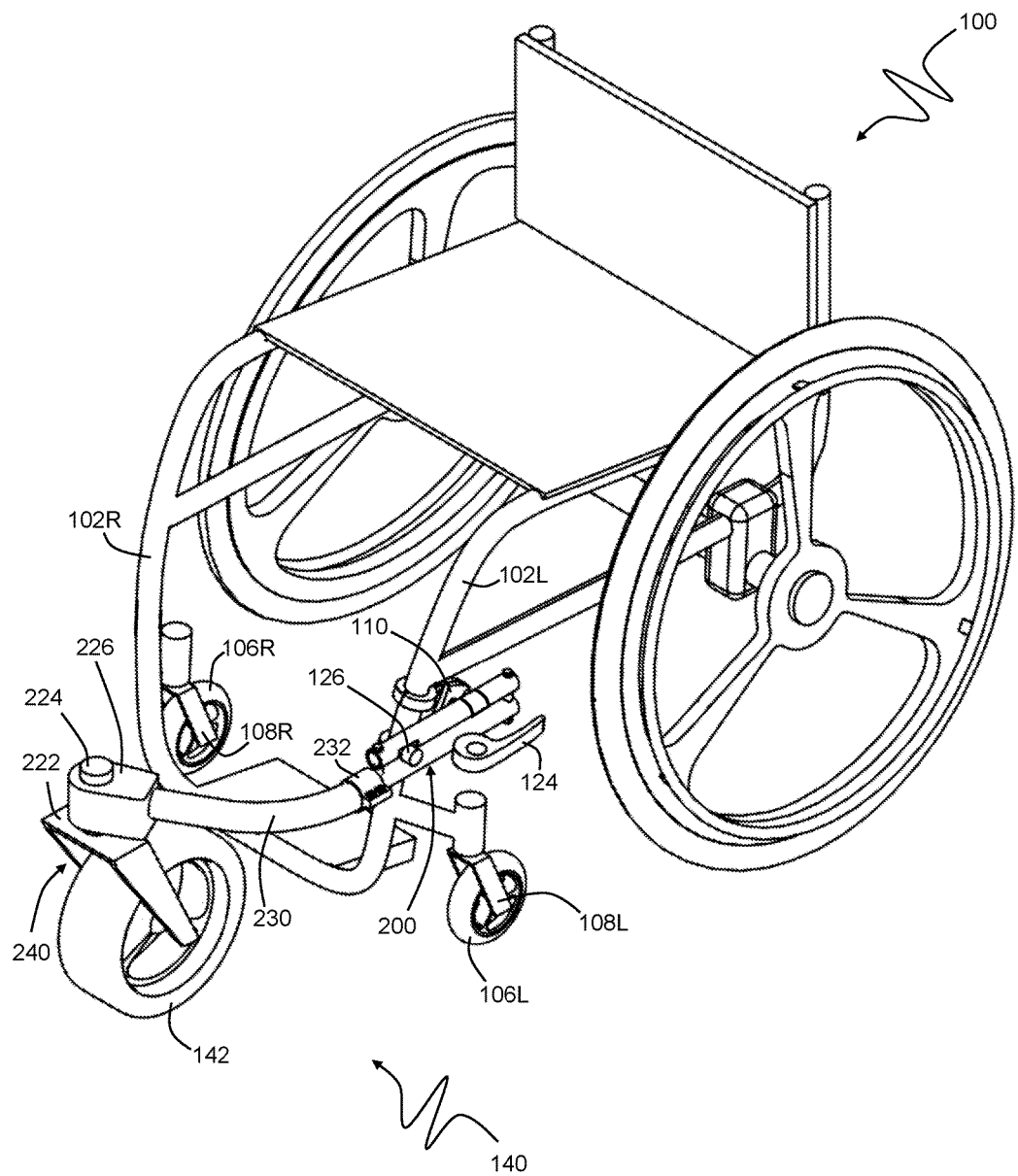
FIG. 2 is a perspective view of an unoccupied wheelchair outfitted with a separable-type adapter having a mounting member and an adapting member, the adapting member equipped with a caster wheel implement.

FIG. 2 displays a similarly-configured wheelchair 100 left unoccupied and with an attached adapting member 140 equipped with a large caster wheel 142. The wheelchair 100, in this depiction, is presently maintained in the modified load-bearing configuration, with the mechanism of the adapter in the deployment stage of operation. A curved tubular support member 230 interconnects the pivotable caster assembly 240 to the mechanism portion 200 adapting member 140. The curved tubular support member 230, which disposes the pivotable caster assembly 240 at a central forward location relative to the wheelchair 100, may also serve as a caster positioning means. By loosening tube clamp 232 and caster mounting block 226 in relation to the curved tubular support member 230, rotation of the curved tubular support member 230 may be performed in either direction and may be used to alter both the pitch orientation and the roll orientation of the pivot axis of the pivotable caster assembly 240. This method, used in conjunction with rotational adjustment of the mounting member 110 about the left forward structural frame portions 102L of the wheelchair 100 and vertical adjustment of the caster cylinder 224 relative to the caster mounting block 226, permits a high degree of adjustability of the adaptive implement (the pivotable caster assembly 240) relative to the wheelchair 100. It is to be understood that alternative provisions for attachment, adjustment, release, and other operations of the adapter may be utilized without departing from the scope of the invention as claimed, and that additional attachment assemblies may be present, as desired, also without departing from the scope of the invention as claimed.

Figure 3:
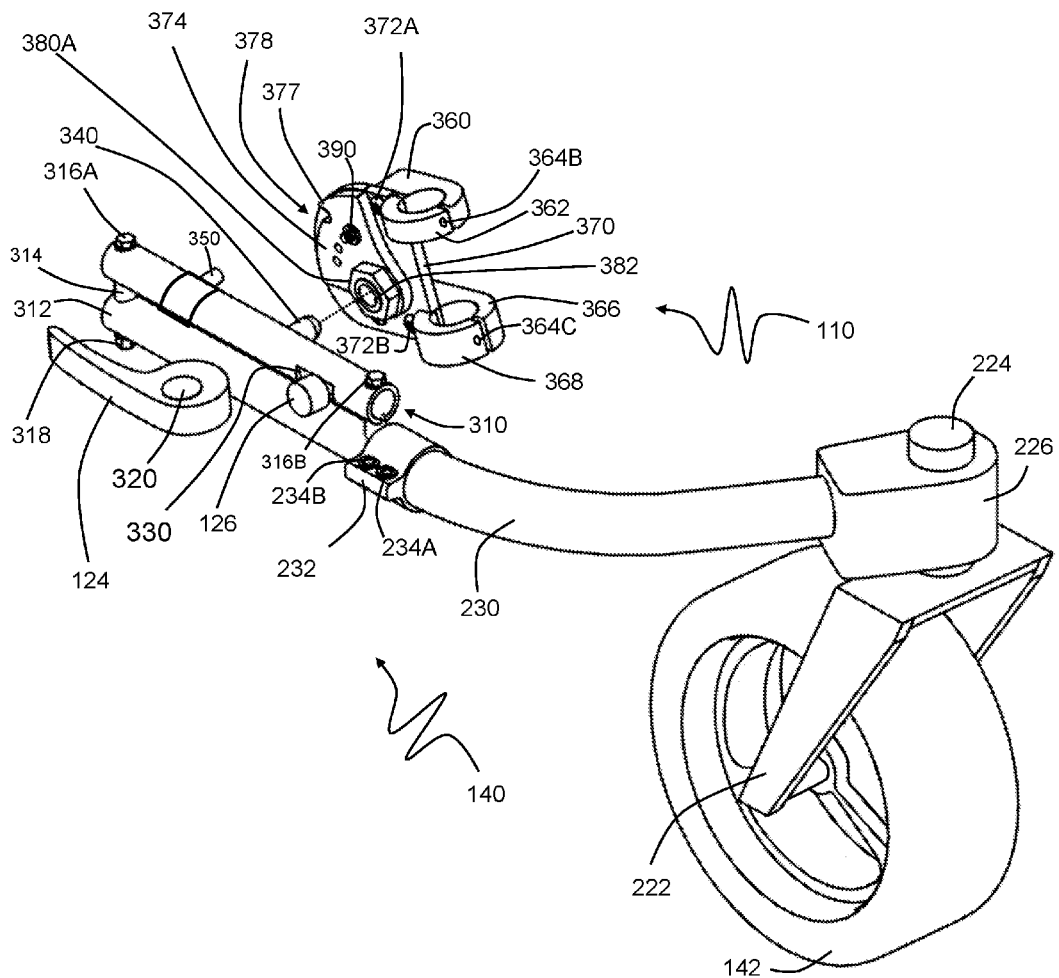
FIG. 3 displays the coupling relationship of the mounting member and the adapting member of the inserting embodiment adapter having a protract/retract-type transitioning mechanism, showing both the mounting member and the adapting member detached from the wheelchair.

FIG. 3 displays a separated view of the adapting member 140 and the mounting member 110, indicating the manner and direction in which the expanding insertion pin 340 inserts into tubular receptacle 382 of the mounting member 110. Other elements of the adapting member 140 and the mounting member 110, which were implied though not described in previous figures, are also clearly visible in FIG. 3. The mounting member 110 comprises an upper fastening body 360, an upper arcuate fastening element 362, a lower fastening body 366, a lower arcuate fastening element 368, fastening bolts 364A and 364B, a rigid structural plate 370, structural plate bolts 372A and 372B, and a bearing plate 374. A tubular receptacle 382 projects through an aperture in bearing plate 374 and also through an aperture in rigid structural plate 370, and is fastened on both sides by receptacle nut 380A.

The adapting member 140 comprises a load-transfer assembly 310, a solid body 312, and connector bolts 316A and 316B to connect the load-transfer assembly 310 to the solid body 312. To aid in rigidizing and ensuring the integrity of the bolted connection between the load-transfer assembly 310 and the solid body 312, a pair of saddle washers 314 are placed therebetween. Projecting through an aperture in the solid body 312 is an expanding insertion pin 340 operatively connected to a cam assembly 320, which is actuated by user manipulation of the lever handle 124. Upon inserting the expanding insertion pin 340 into the tubular receptacle 382 of the mounting member 110 and subsequently pulling back on the lever handle 124, the expanding insertion pin 340 establishes and maintains a secure grip within the tubular receptacle 382 to effectively secure the adapting member 140 to the mounting member 110. By virtue of the strong union created between the adapting member 140 and the mounting member 110, the adapted wheelchair is capable of withstanding the torsional strain and asymmetric loading placed thereupon during normal use, and rotation of the adapting member 140 about the axis of the expanding insertion pin 340 is sufficiently isolated to ensure that the adapting member 140 may be transitioned without being hindered by any torsional strain and asymmetric loading placed upon the adapting member 140 as a result of a load borne completely or in part by the adapting member 140.

Adjustments made at the union between the expanding insertion pin 340 and the cam assembly 320, such as by turning the lever handle 124 around a threaded end (not shown) of the expanding insertion pin 340, serve to amplify the pressure established between the expanding insertion pin 340 and the inner surface of the tubular receptacle 382 to further unify the adapting member 140 with the mounting member 110. As a result, during transition and while in the operative state, most if not all "wiggle," vibration and "play" between the adapting member 140 and the mounting member 110 is eliminated during normal use of the adapted wheelchair. While traversing over ground surfaces, the occupant of the wheelchair 100 experiences a very solid and secure ride due to the tightly unified adapting member 140 and wheelchair 100.

The adapting member 110 additionally comprises a moveable bearing assembly which comprises a cylindrical bearing element 350. Upon the user manipulating the input knob 126 by pushing it in the rearward direction, the cylindrical bearing element 350 moves, linearly, in the forward direction or in the rearward direction, depending on the current operational stage of the load-transfer assembly 310. Repeated manipulation of the input knob 126 alternates the position of the moveable bearing assembly 348 between a forward position and a rearward position.

Projecting through the bearing plate 374 and into the rigid structural plate 370 is an adjustment bolt 390. Upon removal of the adjustment bolt 390, the bearing plate 374 may be rotated about the axis of the tubular receptacle 382 relative to the rigid structural plate 370, after which the adjustment bolt 390 may be reinserted and tightened into one of the three other adjustment holes to alter the effective angle created between an attached adaptive implement (in this case, the caster wheel) and the wheelchair 100 upon deploying the adapting member 140 into the deployed state.

It is important to note that the aforementioned arrangement of the cylindrical bearing element 350, the load transfer assembly 310, the solid body 312, the expanding insertion pin 340, the mounting member 110, and all fastening and clamping means associated therewith, allows for sufficient movement of the cylindrical bearing element 350 so that it may readily engage with and disengage from the nested groove 378, and wherein the adapting member 140 is releasably securable to the mounting member 110 such that the adapting member 140 is maintained in a position and orientation relative to the wheelchair while in the load-sharing state, preferably through many cycles of attaching, operating, and releasing the adapting member 140 relative to the mounting member 110. In the process, all torsional strain and loading experienced by the adaptive implement attached thereto is borne by the foregoing elements, especially due to the asymmetric loading experienced as a result of the independent lateral attachment to the wheelchair 100. The success with which the design, construction, and choice of materials hold up to this anticipated asymmetric strain will impact the performance, safety, and longevity of the apparatus as well as the proper functioning of the mechanism employed to carry out the transitioning thereof through all stages of the operation sequence.

During the attach/release stage, as well as during transition into and out of the attach/release stage, the cylindrical bearing element 350 slides in an arcuate path in contact with or in close proximity to the arcuate bearing surface 396 of the bearing plate 374. The rotational axis at the center of the expanding pin 340 serves as a fulcrum around which the adapting member 140 rotates; the shape of the arcuate bearing surface 396 may thus be defined as an arc having a radius equal to the distance from the axis 384 of the expanding insertion pin 340 to the nearest contact point of the cylindrical bearing element 350 while the load-transfer assembly 310 is in the attach/release stage or during transition into or out of the attach/release stage. Furthermore, to ensure maximum contact of the cylindrical bearing element 350 with the contact surfaces of the nested groove 378, the deepest point of the nested groove may be defined by the distance from the axis 384 of the expanding insertion pin 340 to the nearest contact point of the cylindrical bearing element 350 while the load-transfer assembly 310 is in the deployment stage.

During the deployment stage, as well as during the pre-release stage, the cylindrical bearing element 350 is disposed in the nested groove 378 of the bearing plate 374. Upwardly directed force (due to downward loading on the front end of the wheelchair) is leveraged about the axis 384 of the expanding pin 340 and transferred downwardly against the lower bearing surface 376 of the nested groove 378. Supporting of a load by the adapter apparatus 180 relies on the integrity of the elements of the moveable bearing assembly 348 as they transfer the load from the adapting member 140, through the cylindrical bearing element 350, to the bearing plate 374.

Figure 4A:
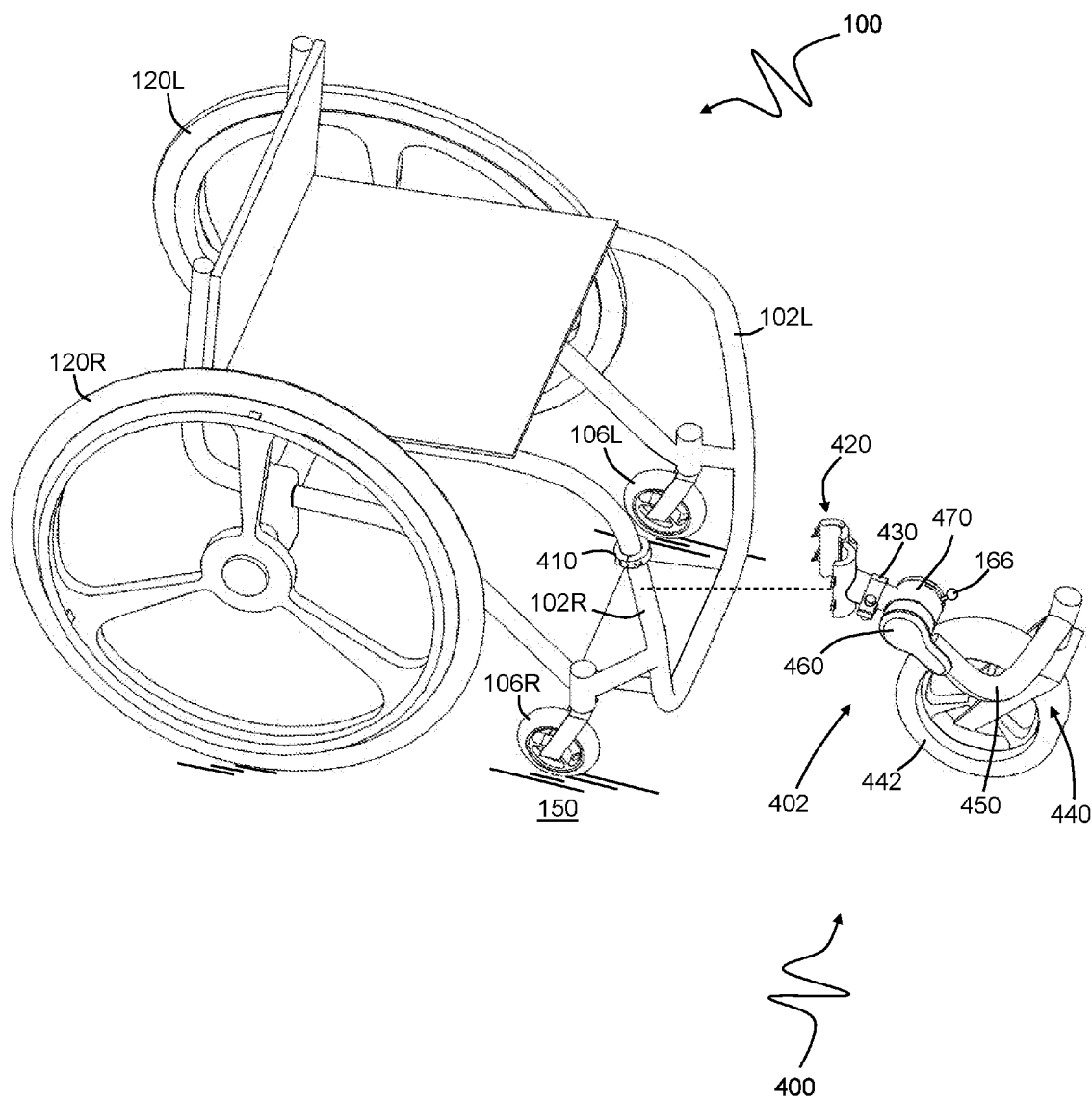
FIGS. 4A and B show a wheelchair being outfitted with an asymmetric apparatus having a single clamp, a rotary clutch-type transitioning mechanism, and a single caster wheel assembly wherein the asymmetric apparatus is releasably affixed to a forward portion of the left side of the frame of the wheelchair.
Figure 4B:
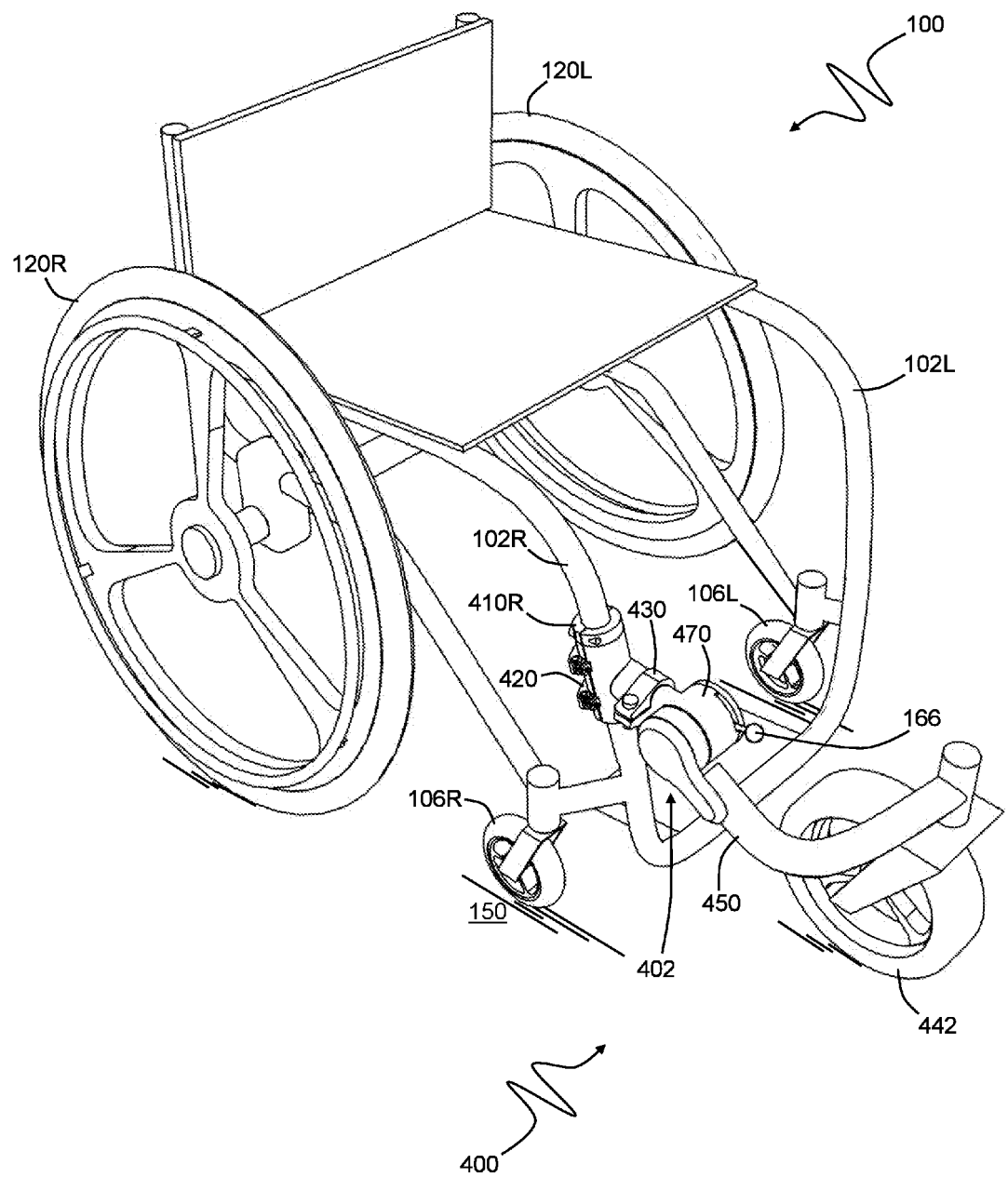

FIGS. 4A and 4B show the wheelchair prior to and after affixing an asymmetric, fully-removable, clamping-type adapter to the right side of the frame of the wheelchair, said adapter comprising a rotary clutch-type transitioning mechanism acting as a singular joint between a clamp assembly and an adaptive caster wheel assembly. FIG. 4A depicts the wheelchair 100 ready for attachment of a clamping-embodiment apparatus 400 having an asymmetric (one-sided) structure. Caster wheel assembly 440 having large caster wheel 442 is connected to the transitioning mechanism assembly 402 by the extension arm 450. It is important to note that the embodiment disclosed in FIG. 4A is absent a laterally-inserting positive locking pin assembly and alternatively comprises a bolt (not shown) which secures solid body 460 to cylindrical housing 470 and which defines an axis of relative rotation therebetween. Clamp collar 430 adjustably secures the cylindrical housing 470 to tube clamp 420. A positioning collar 410R which is affixed to the lateral portion 102R of the wheelchair 100 enables a user to repeatably attach, remove and re-attach the clamping-embodiment apparatus 400 by affixing tube clamp 420 in a predetermined position and orientation relative to the wheelchair 100. Control knob 166 is shown in its most forward position, corresponding to an internal state of disengaging spring pressure; thus the mechanism is in the attach/release stage of operation.

FIG. 4B depicts the wheelchair 100 having the asymmetric (one-sided) caster wheel apparatus of FIG. 4A in the attach/release stage, with the adaptive caster wheel 442 resting on the ground surface yet bearing no load and with the control knob 166 in its most forward position, corresponding to an internal state of disengaging spring pressure with the mechanism in the attach/release stage of operation. The disengaging spring pressure urges the movable roller bearings toward a disposition free from any binding contact between the fixed portion of the transitioning mechanism assembly 402 and the movable portion thereof. The clamping-embodiment apparatus 400, in this stage of operation, is ready for either: a.) detachment from the wheelchair 100, or b.) transitioning to the pre-deployment stage.

Figure 5:
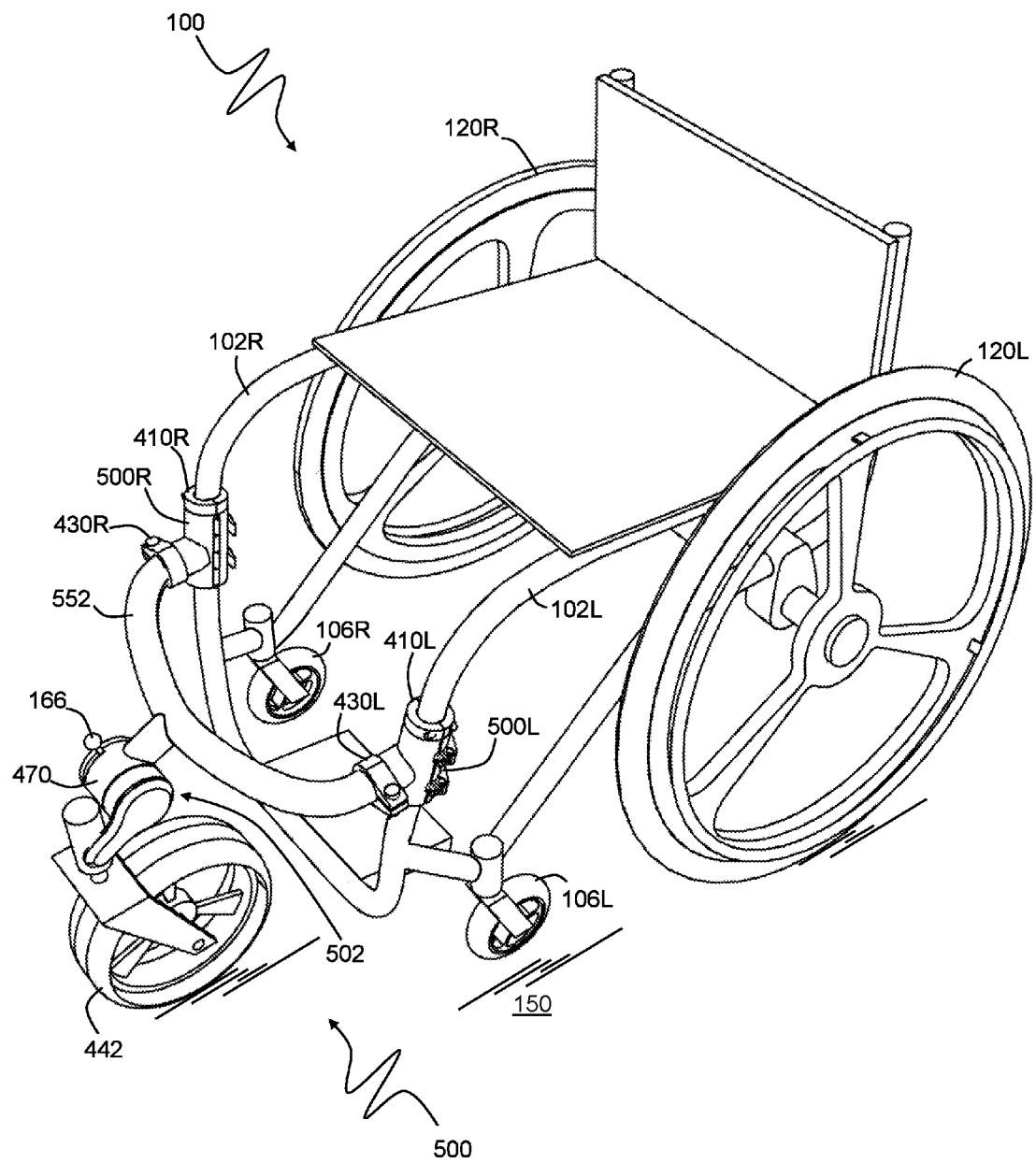
FIG. 5 shows a wheelchair outfitted with a symmetric apparatus having dual left and right clamps, a rotary clutch-type transitioning mechanism, and a single caster wheel assembly wherein the symmetric apparatus is releasably affixed to forward portions of the left and right sides of the frame of the wheelchair.

FIG. 5 depicts the wheelchair 100 having a symmetrically-attaching caster wheel apparatus 500 comprising a single transitioning mechanism assembly 502 in conjunction with a curved extension arm 552 which adjoins two symmetrically opposing clamps 520L and 520R configured for attachment to both the left and the right sides of the wheelchair frame. The adaptive caster wheel 442 is supporting the forward portion of the load carried by the wheelchair 100, whereas the primary caster wheels 106L and 106R of the wheelchair 100 are substantially elevated above the ground surface 150 and thus fully relieved of any loading.

The auxiliary caster wheel assemblies of FIGS. 4A, 4B, and 5 comprise a wheel 442 that is substantially larger than that of the primary caster wheels 106L and 106R, such as at least about 5 inches in diameter, or at least about 6 inches in diameter, or at least about 8 inches in diameter, or at least about 10 inches in diameter, or at least about 12 inches in diameter. Depending on the terrain a user desires to traverse, it may also be useful for the auxiliary caster wheel 442 to be substantially wider, such as at least about 10 percent wider than the primary caster wheels, in order to increase the surface area of the region of contact with the ground surface. Useful widths of the auxiliary caster wheel 442 may be at least about 20, 40, 60, 80, 100, 120, 140, 160, or 180 percent wider than the primary caster wheels. Extremely wide auxiliary caster wheels may have a ground-contacting tread region up to 200 percent, up to 300 percent, or up to 400 percent or more of the width of the primary caster wheels.

Figure 6A:
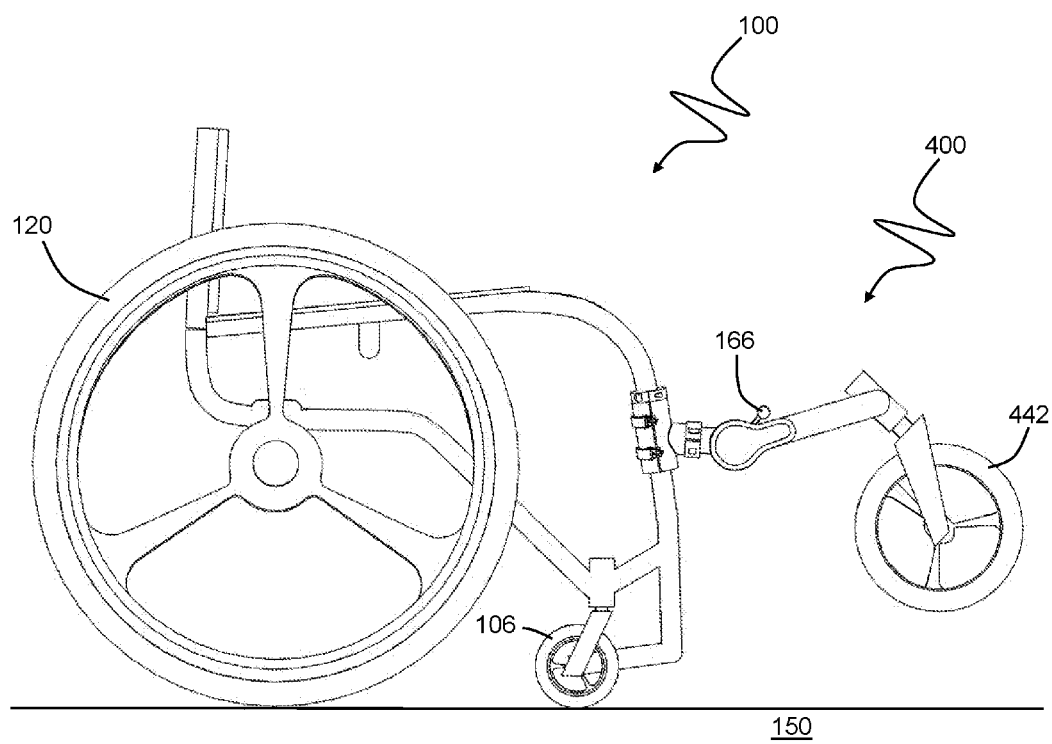
FIGS. 6A-D are side views of a wheelchair and clamping-type adapter having a rotary clutch-type transitioning mechanism during the four stages of the cyclic operation sequence (6A: attach/release stage, 6B: pre-deployment stage, 6C: deployment stage, and 6D: pre-release stage).

FIGS. 6A-D are lateral views of the wheelchair 100 and the clamping-embodiment apparatuses of FIGS. 4A, 4B, and 5, illustrating the positioning thereof, with respect to the ground surface, during transitioning through the four stages of operation. FIG. 6A shows a lateral view of the clamping-embodiment apparatus 400 secured to the wheelchair at the location defined by a positioning collar, with the control knob 166 in its most forward position so that the internal spring state is biased towards maintaining release of the binding elements from contact and thus no load transfer to the apparatus. The control knob 166 is shown in a forward rotational position corresponding to an internal state of disengaging spring pressure (the attach/release stage of operation). Control knob 166 receives manual input force enacted by the user for transferring said manual input force to effectuate a state alternation of the force sustainment subassembly which, as a result, is selectably toggled between a first biasing state and an opposing second biasing state. Alternation between the two opposing internal states of spring pressure enables the user to prepare or "arm" the mechanism so that the overrunning clutch (not visible) of the transitioning mechanism will subsequently be alternated in its capacity for load-bearing torque transmission upon the user performing the wheel-stand maneuver.

Figure 6B:
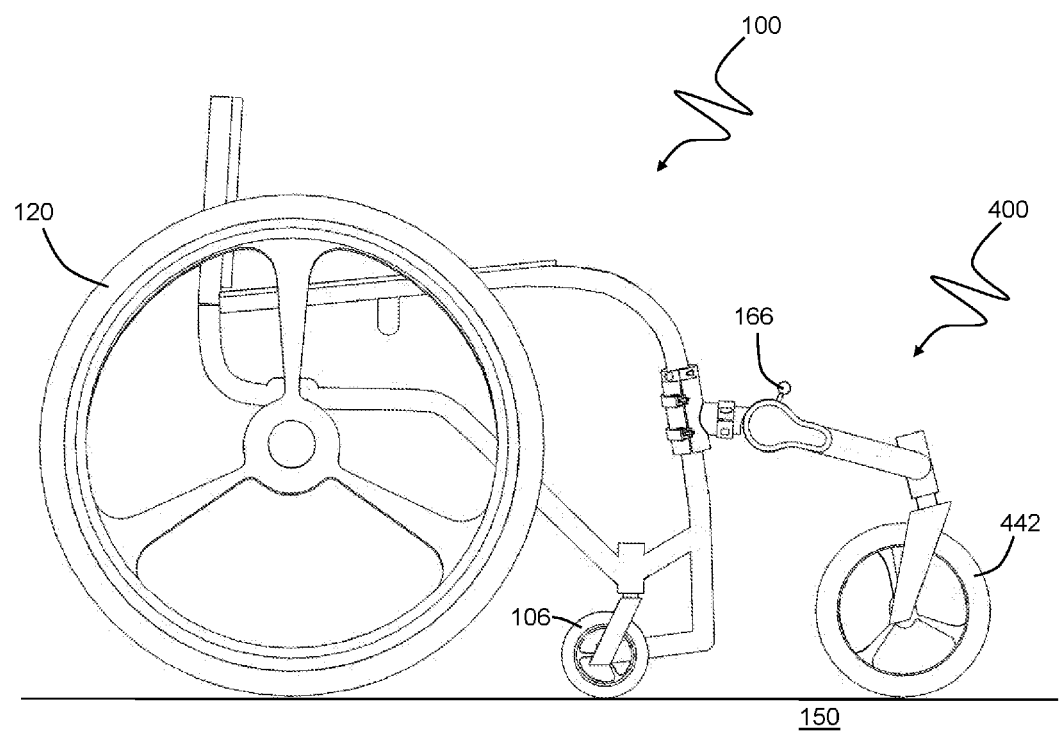

FIG. 6B shows a lateral view of the clamping-embodiment apparatus 400 with its wheel resting on the ground surface yet bearing no load and with its control knob 166 in its most rearward position so that the internal spring state is biased towards establishing contact of the binding elements; in this pre-deployment stage, the mechanism is thus prepared for transition to the deployment stage of operation. Engaging spring pressure, as a result of the user having manipulated the control knob 166, causes the internal overrunning clutch (not shown) to allow downward rotation of the rotatable portion of apparatus 400, while preventing rotation thereof in the opposite direction. A reclining action or "wheel-stand maneuver," whether it be performed by an assistant or, preferably, by the occupant of the wheelchair, is necessary at this point to lift the front end of the wheelchair 100 to create a gap 300 beneath the primary caster wheels 106 and, at the same time, causes downward rotation of the rotatable portion of the apparatus.

Figure 6C:
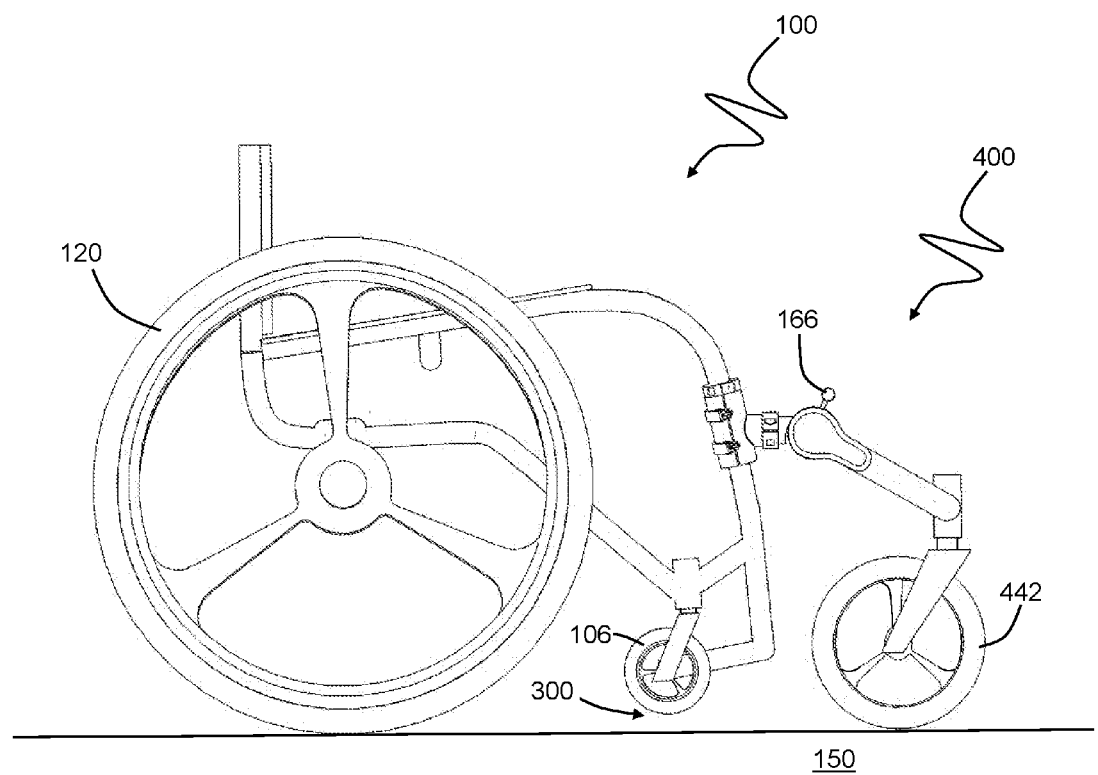

FIG. 6C shows a lateral view of the clamping-embodiment transitioning apparatus 400 in the deployment stage of operation, during which the apparatus is deployed and load-bearing and the primary caster wheels 106 are substantially elevated from contact with the ground surface, after the wheelchair 100 has been reclined substantially to elevate the primary caster wheels 106 off the ground surface 150. While in the pre-deployment stage of operation (previously shown in FIG. 6B), upon reclining the wheelchair sufficiently to cause a travel-limiting element (not shown) to contact a forward limit stop (not shown), the rotatable portion of the clamping-embodiment apparatus 400 is subsequently maintained in the position shown in FIG. 6C and is substantially prevented from attaining any change in position relative to the structural frame of the wheelchair 100. The forward portion of the load that was previously supported by the primary casters while the wheelchair was in its unadapted state is now distributed to the auxiliary caster wheel 442. Auxiliary caster wheel 442 is now in full contact with the ground surface. The control knob 166 remains in its most rearward position until the user manipulates it with a forward push using the hand, thumb or fingers.

Figure 6D:
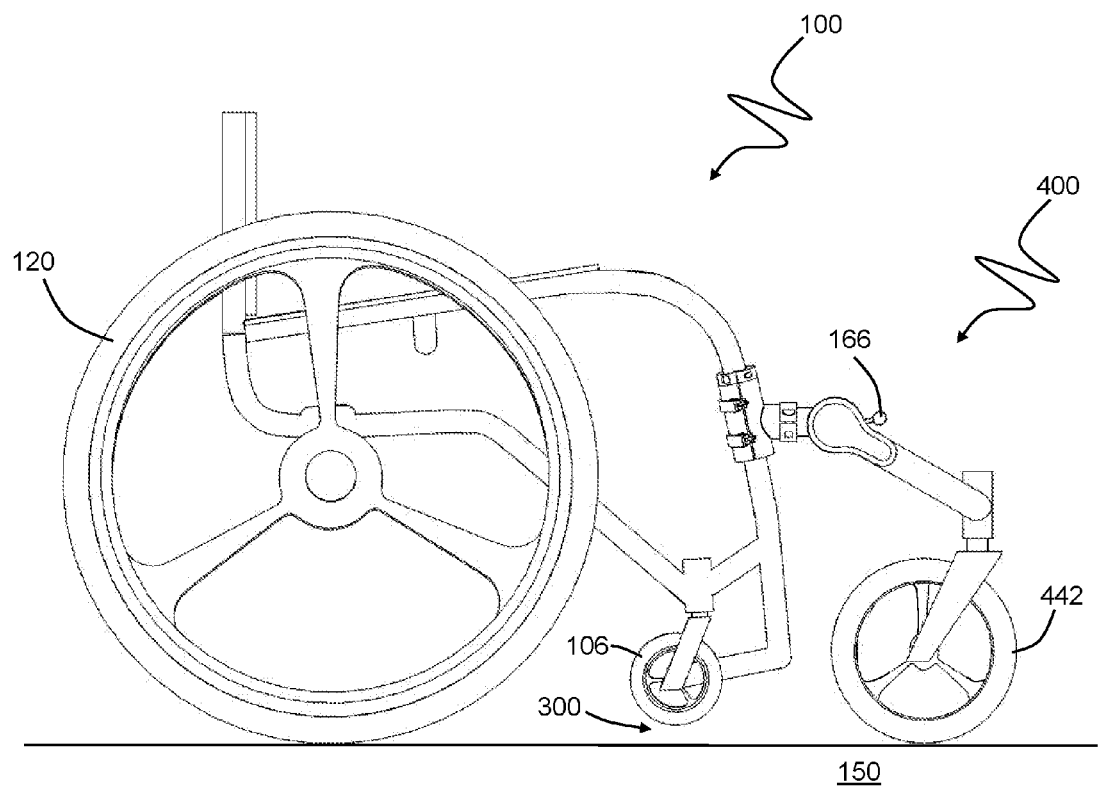

FIG. 6D shows a lateral view of the clamping-embodiment apparatus 400 in the pre-release stage of operation, during which the apparatus is load-bearing and the primary caster wheels 106 are substantially elevated from contact with the ground surface, with the control knob 166 in its most forward position so that the internal spring state is biased towards releasing the binding elements from load-bearing contact. Only upon the user reclining the wheelchair substantially will such release of the binding elements occur, after which event the primary caster wheels 106 will drop back down into contact with the ground surface, thereby completing the cyclic operation sequence and returning the wheelchair to its original load-bearing configuration; the clamping-embodiment apparatus 400 may now be removed from the wheelchair 100.

Figure 7A:
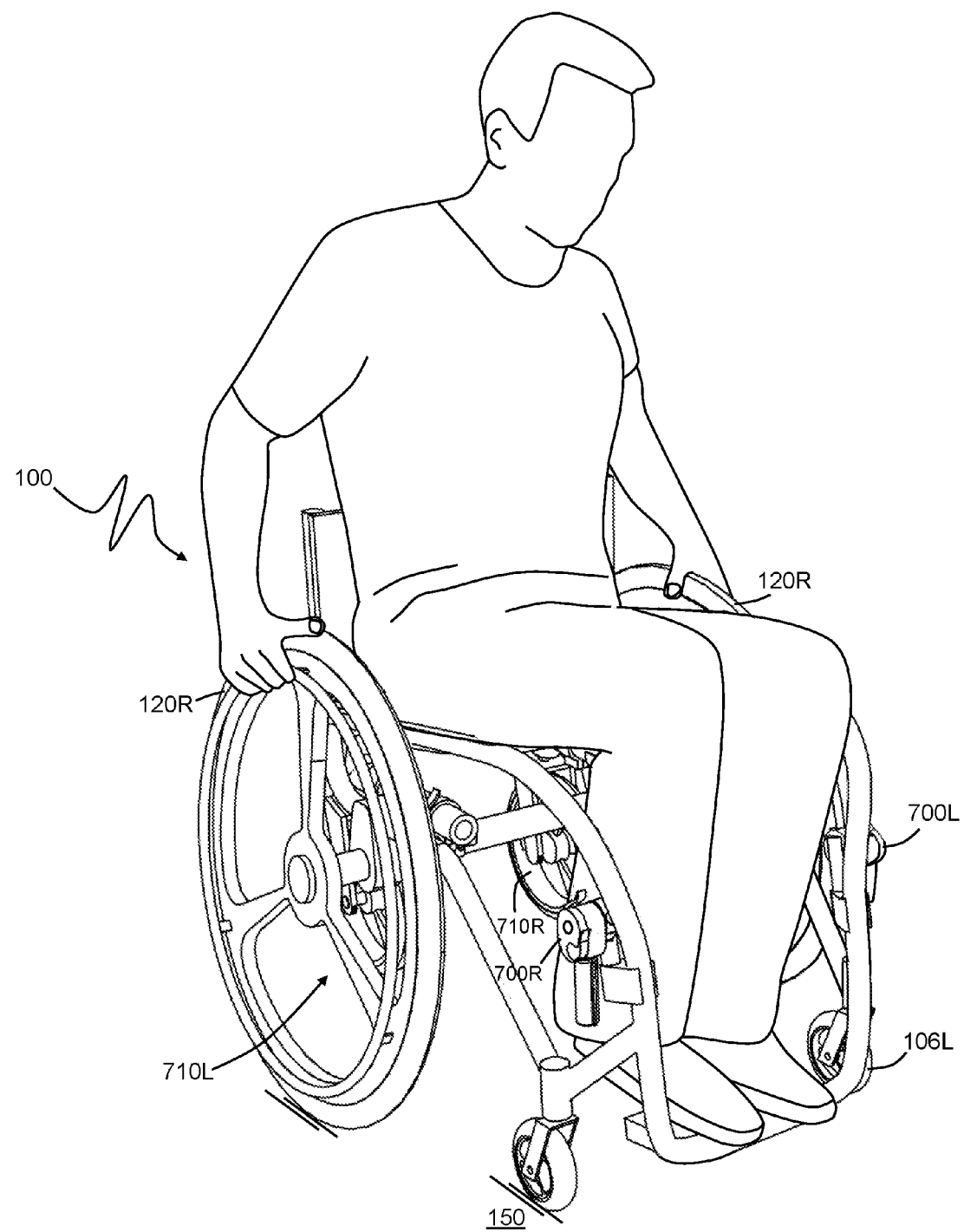
Figure 7B:
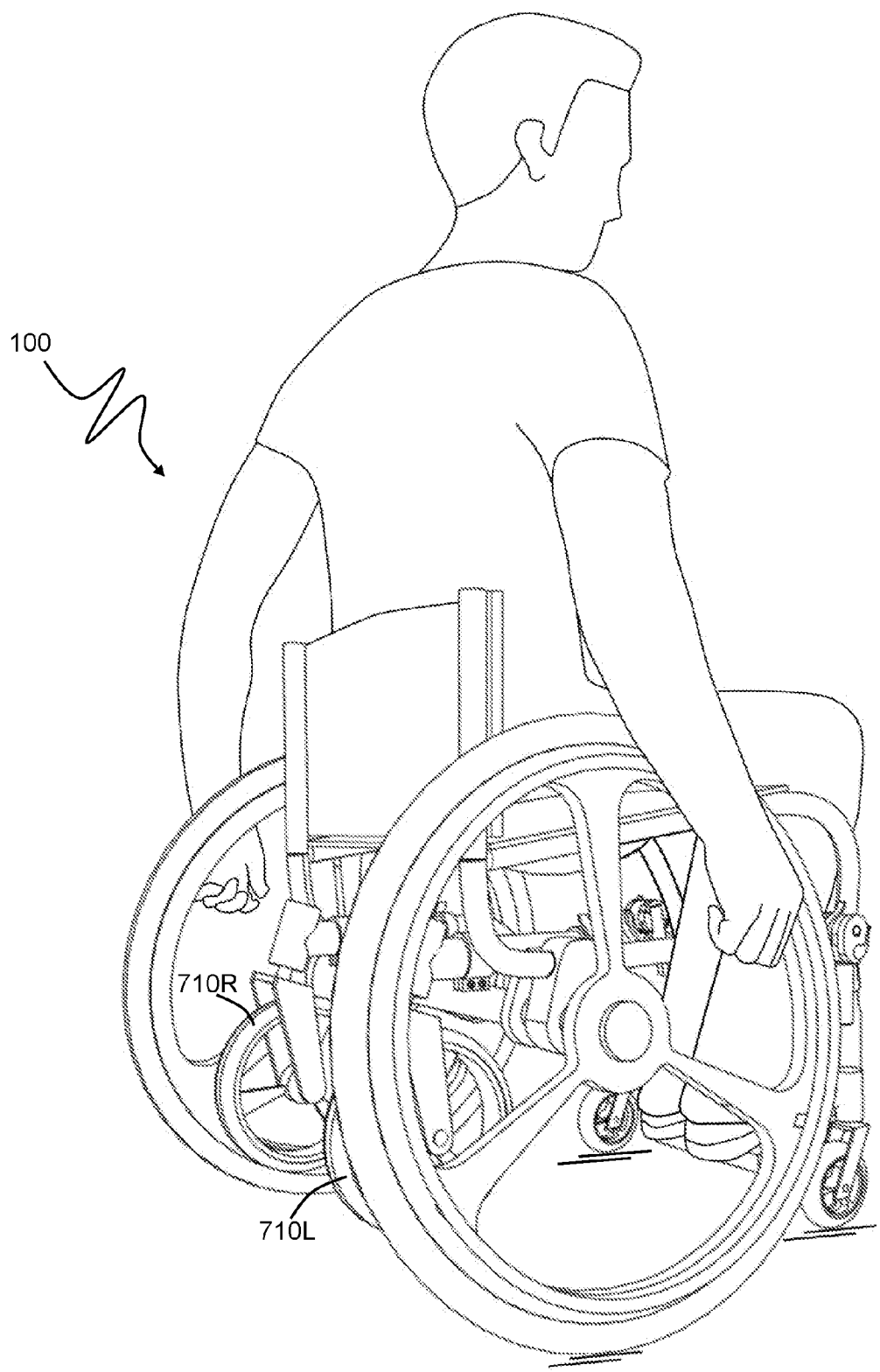

In FIG. 7A, the occupant is shown utilizing the wheelchair 100 while in its original, unadapted load-bearing configuration, having the rear drive wheels 120L and 120R and primary caster wheels 106L and 106R in contact with the ground surface 150. Ratchet pawl-type transitioning mechanism assemblies 700L and 700R are shown semi-permanently affixed to opposing left and right forward regions of the wheelchair 100. Dual adaptive caster wheel implements 710L and 710R, stowed beneath the seat, are visible. FIG. 7B more clearly shows the stowed positioning of the adaptive caster wheel implements 710L and 710R, as visible from behind the wheelchair 100.

Figure 7C:
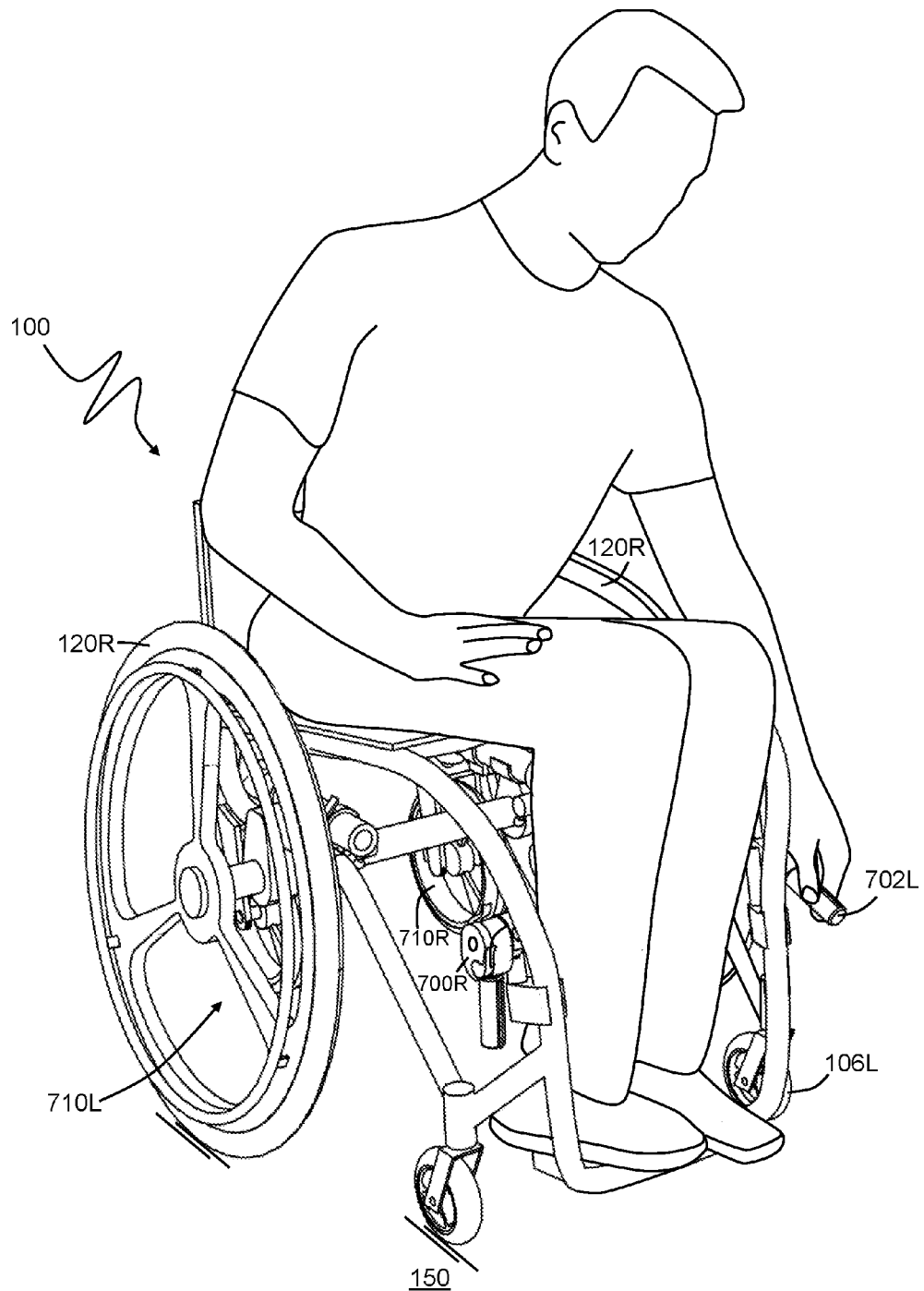

FIG. 7C shows the user positioning male coupling member 702L affixed to a rotatable portion of ratchet pawl-type transitioning mechanism assembly 700L, in preparation for connecting adaptive caster wheel implement 710L thereto.

Figure 7D:
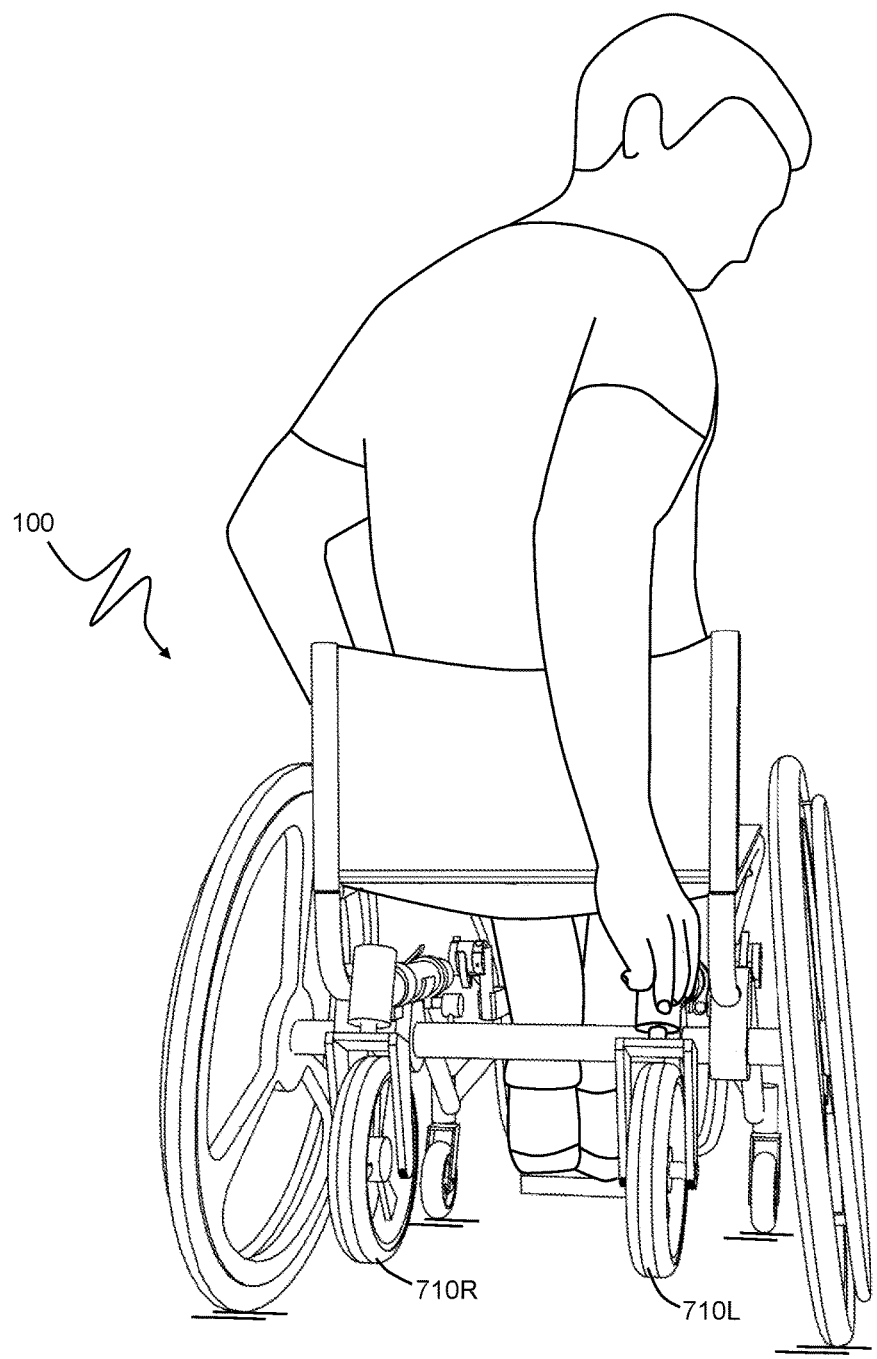

FIG. 7D shows the user reaching behind the wheelchair 100 to remove adaptive caster wheel implement 710L from its stowed position (on the right side, beneath the seat).

Figure 7E:
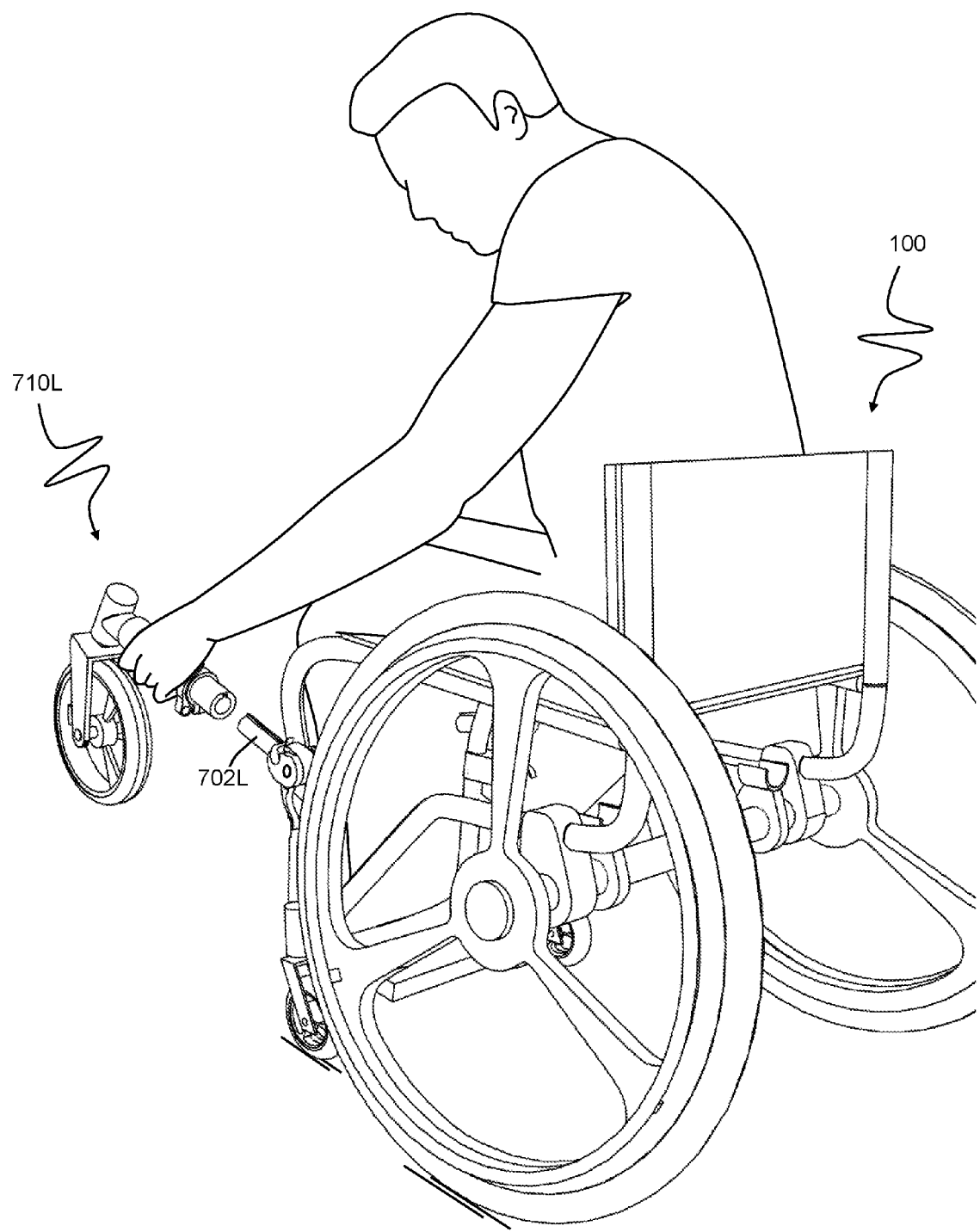
Figure 7F:
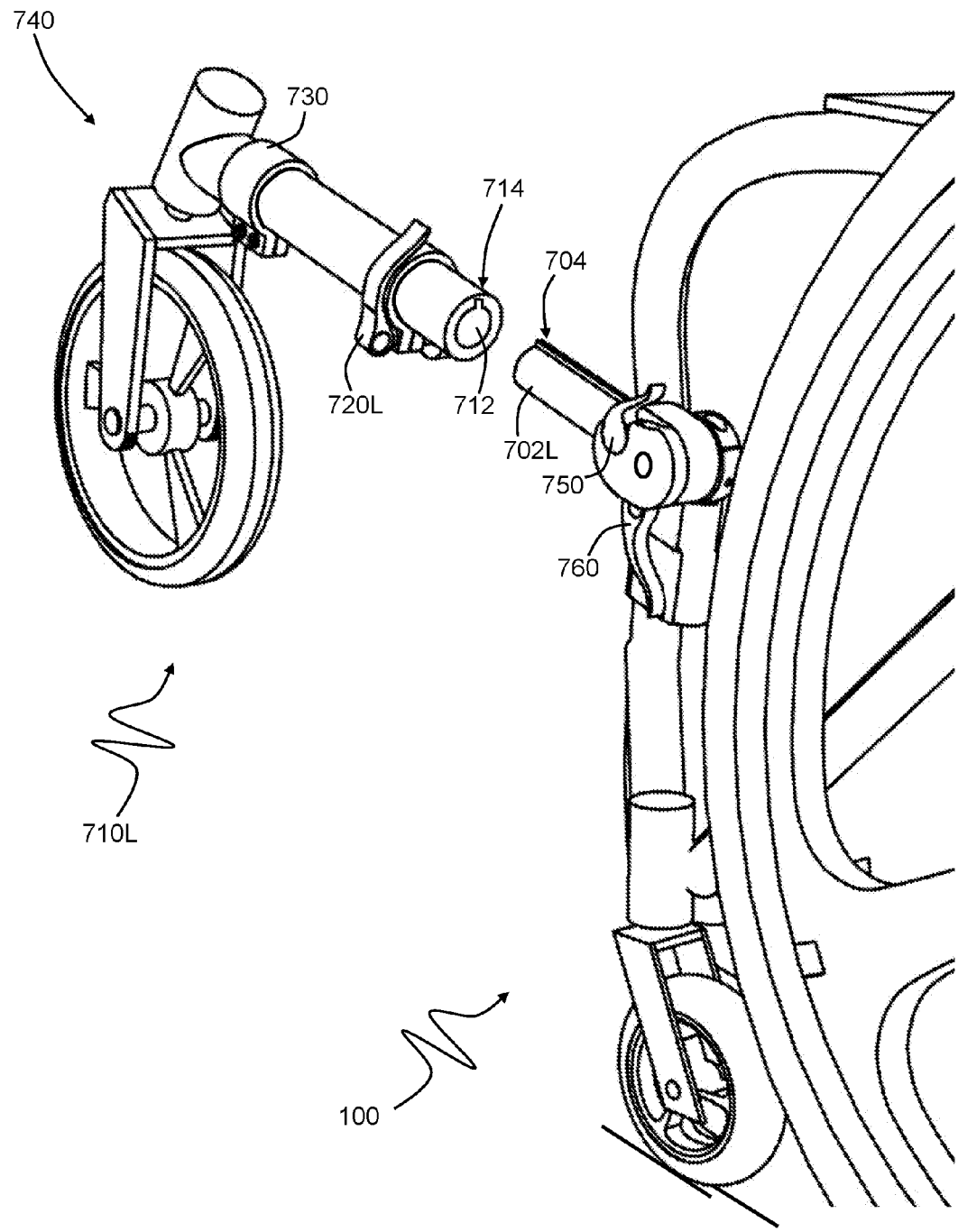

In FIG. 7E, the user is shown attaching adaptive caster wheel implement 710L to male coupling member 702L. FIG. 7F is an enlarged view showing the coupling relationship of the adaptive caster wheel implement 710L with the male coupling member 702L. Male coupling member 702L comprises anti-rotation key 704, which slides into keyway 714 notched into opening 712 at the end of adaptive caster wheel implement 710L.

Also shown in FIG. 7F are quick-release clamping collar 720 and adjustment collar 730. Adjustment collar 730 is used to adjust the "roll" axis of caster wheel assembly 740 so that it trails properly while deployed. Quick-release clamping collar 720 enables the user to releasably secure the adaptive caster wheel implement 710L to the male coupling member 702L after sliding the opening 712 thereover.

Also visible in FIG. 7F is biasing switch lever 750, which is operatively connected to the internal transitioning mechanism for the purpose of biasing a movable pawl bearing toward and away from engagement with a bearing surface. Additionally, FIG. 7F shows binding cam lever 760 which is operatively connected to a tensioning skewer projecting internally to the internal transitioning mechanism for the purpose of enabling the user to releasably draw the movable pawl bearing into a position of maximum binding engagement with the bearing surface.

Not visible in FIG. 7F, but readily visible in FIGS. 7G-7J is external cam binding assembly 770 affixed to quick-release clamping collar 720 for the purpose of enabling the user to establish binding force between the wheelchair frame and the adaptive caster wheel implement 710L to further unify the caster wheel implement 710L with the wheelchair. Alternatively, an additional clamp may be used in place of external cam binding assembly 770 to similarly unify the caster wheel implement 710L with the wheelchair.

Figure 7G:
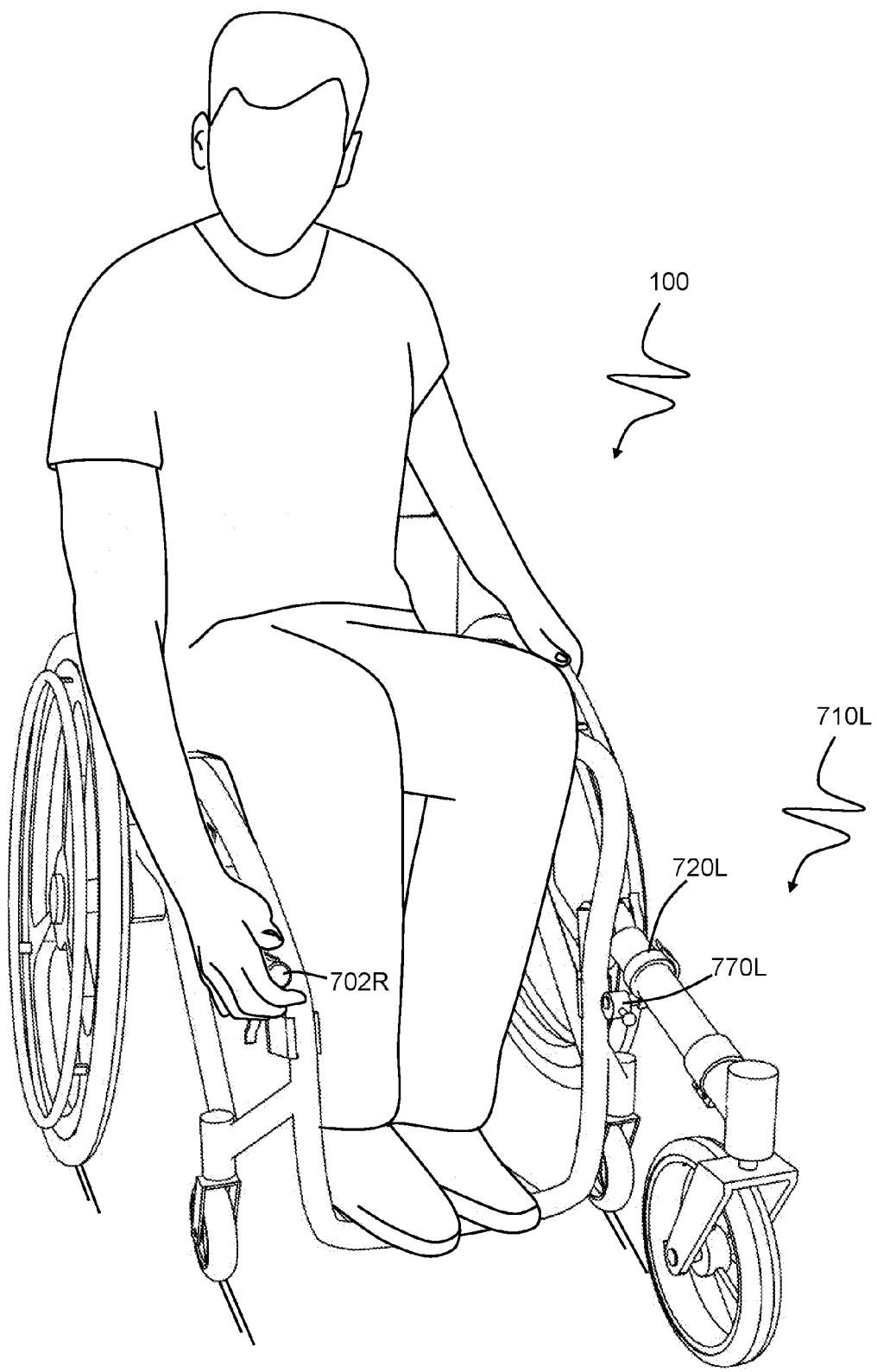

In FIG. 7G the user prepares the right-side male coupling member 702R for receiving the right-side adaptive caster wheel implement 710R (not visible).

Figure 7H:
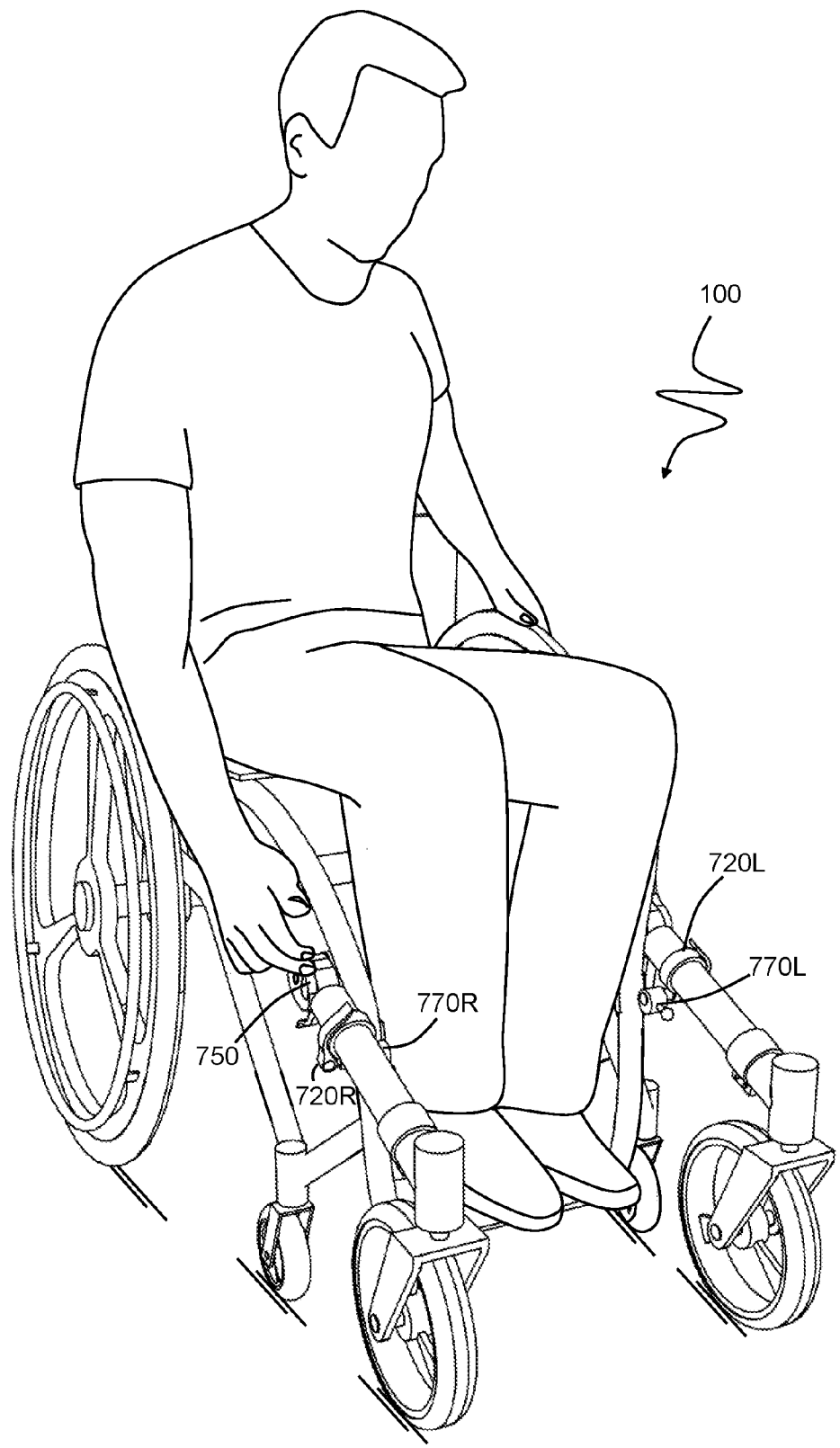
Figure 7J:
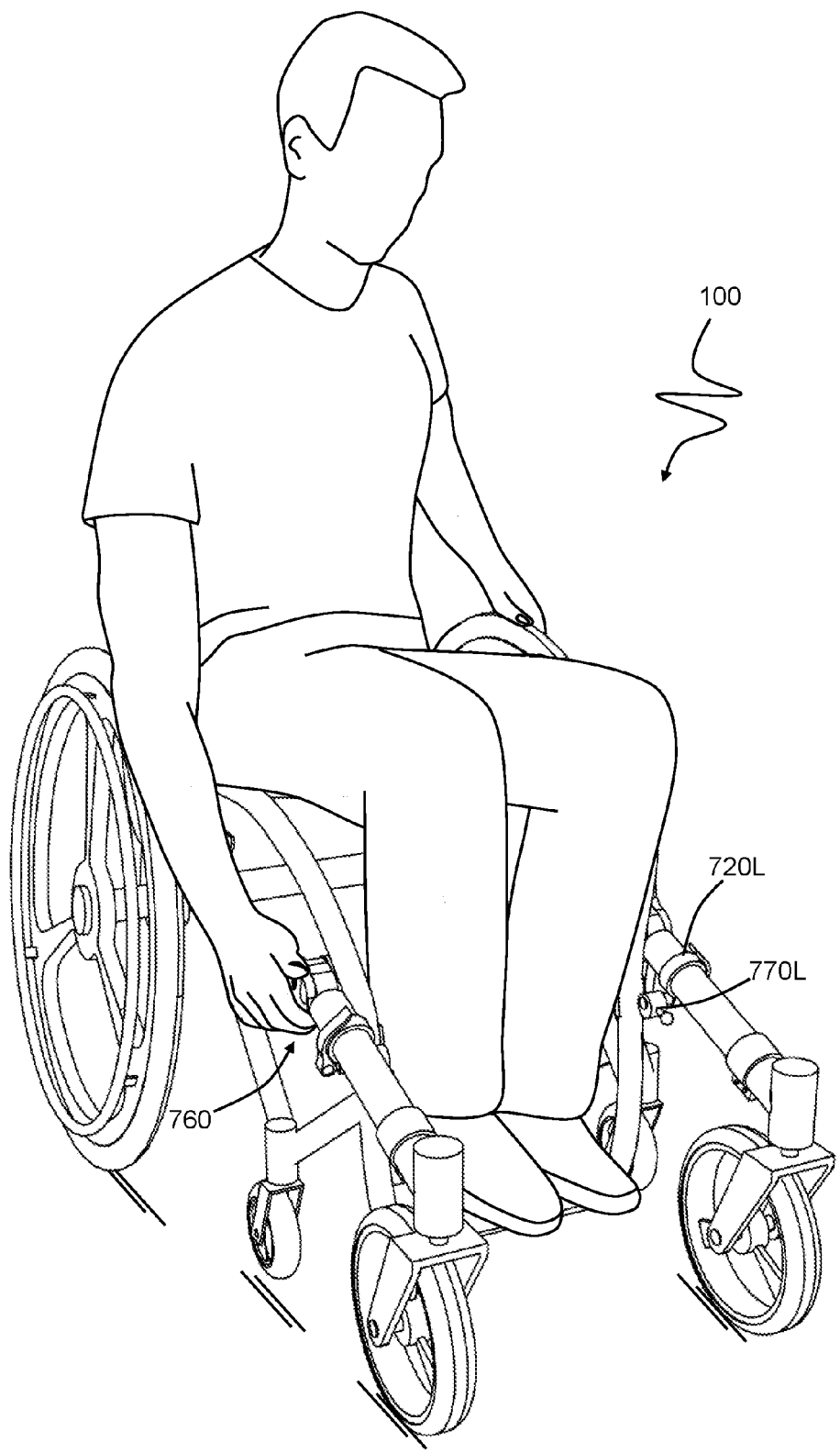

FIG. 7H shows the user manipulating switch lever 750 to place the load transitioning mechanism into the pre-deployment stage of operation, after which time the user performs the wheel-stand maneuver (shown in FIG. 7-I), effectuating the transition to the deployment stage of operation wherein the primary caster wheels 106L and 106R are elevated from contact with the ground surface.

In FIG. 77, the user is shown manipulating the binding cam lever 760 while the load transitioning mechanism is in the deployment stage of operation. Also, at this time, the user may rotate the external cam binding assembly 770 affixed to quick-release clamping collar 720 to establish additional binding force between the wheelchair frame and the adaptive caster wheel implement 710L to further unify the caster wheel implement 710L with the wheelchair.

Figure 8A:
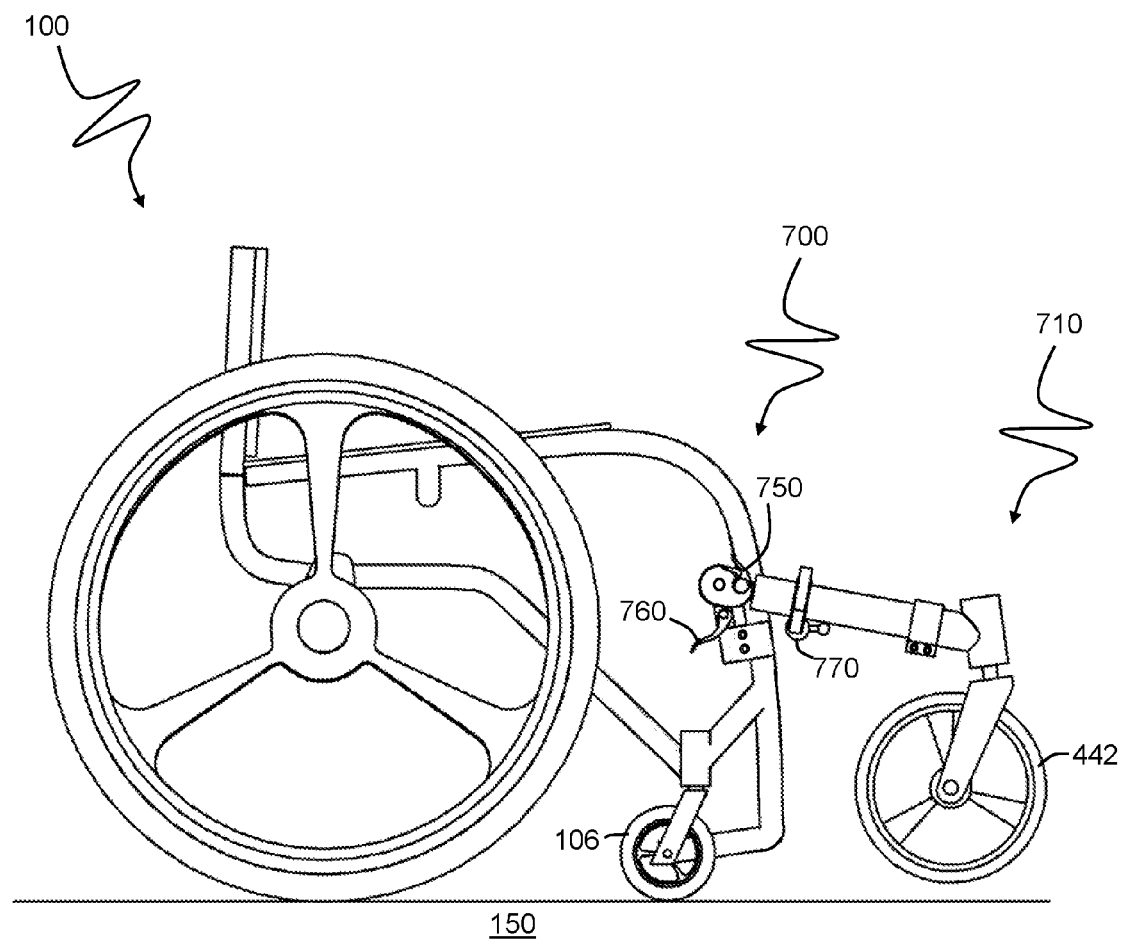
FIGS. 8A-F are side views of the wheelchair equipped with ratcheting pawl-type transitioning mechanisms during the cyclic operation sequence, including steps for actuating additional binding means.

FIG. 8A shows a side view of the wheelchair 100 equipped with ratcheting pawl-type transitioning mechanism 700 during the attach/release stage of the cyclic operation sequence. The pawl-type transitioning mechanism 700 comprises biasing switch lever 750 in its forward (disengaging) position, binding cam lever 760 in its unbound position, and external cam binding assembly 770 in its unbound position. Coupled with the pawl-type transitioning mechanism 700 is adaptive caster wheel implement 710 having caster wheel 442 elevated from contact with the ground surface 150, as it is free to rotate in both the upward and downward directions without any engagement occurring within the mechanism. The mechanism is thus in the attach/release stage of the operation sequence.

Figure 8B:
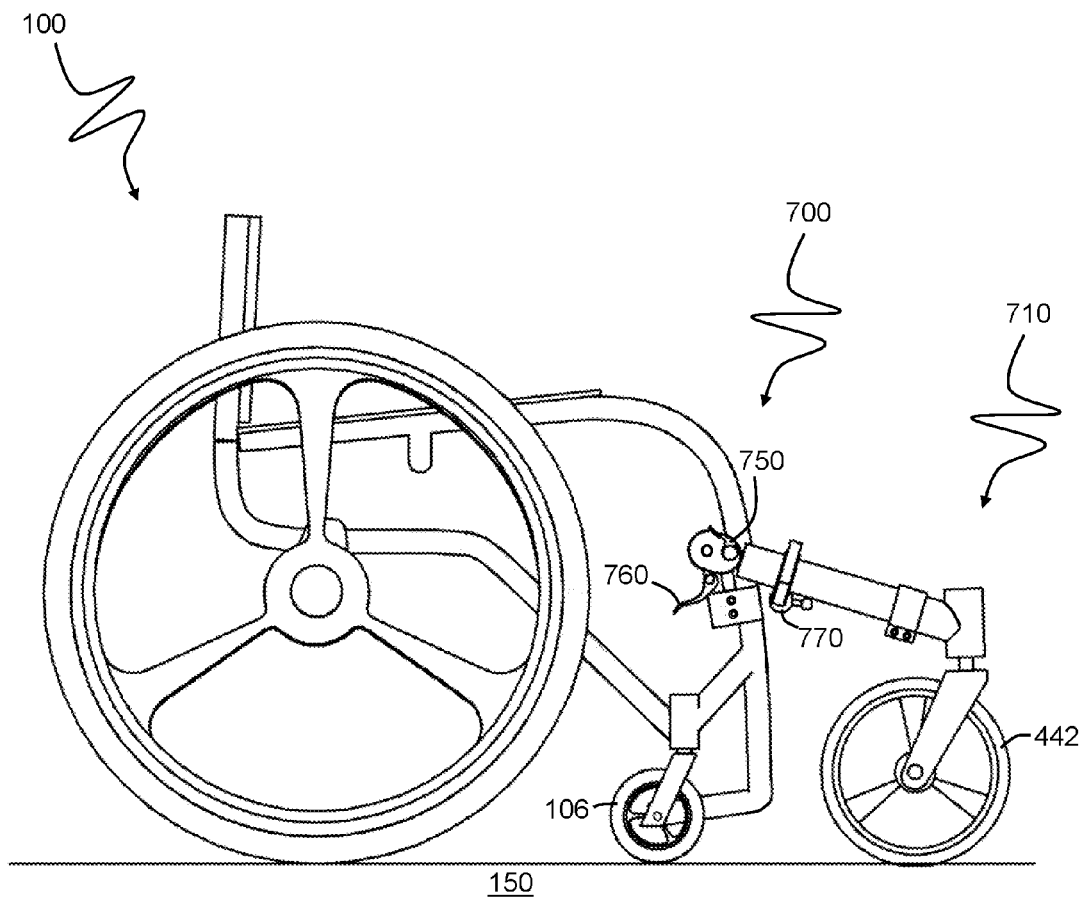

In FIG. 8B, the pawl-type transitioning mechanism 700 is shown in the pre-deployment stage of the operation sequence, now having the biasing switch lever 750 oriented in its rearward (engaging) position. The caster wheel 442 is contacting the ground surface 150 as a result of the user allowing the adaptive caster wheel implement 710 to rotate downward about the joint axis of the pawl-type transitioning mechanism.

Figure 8C:
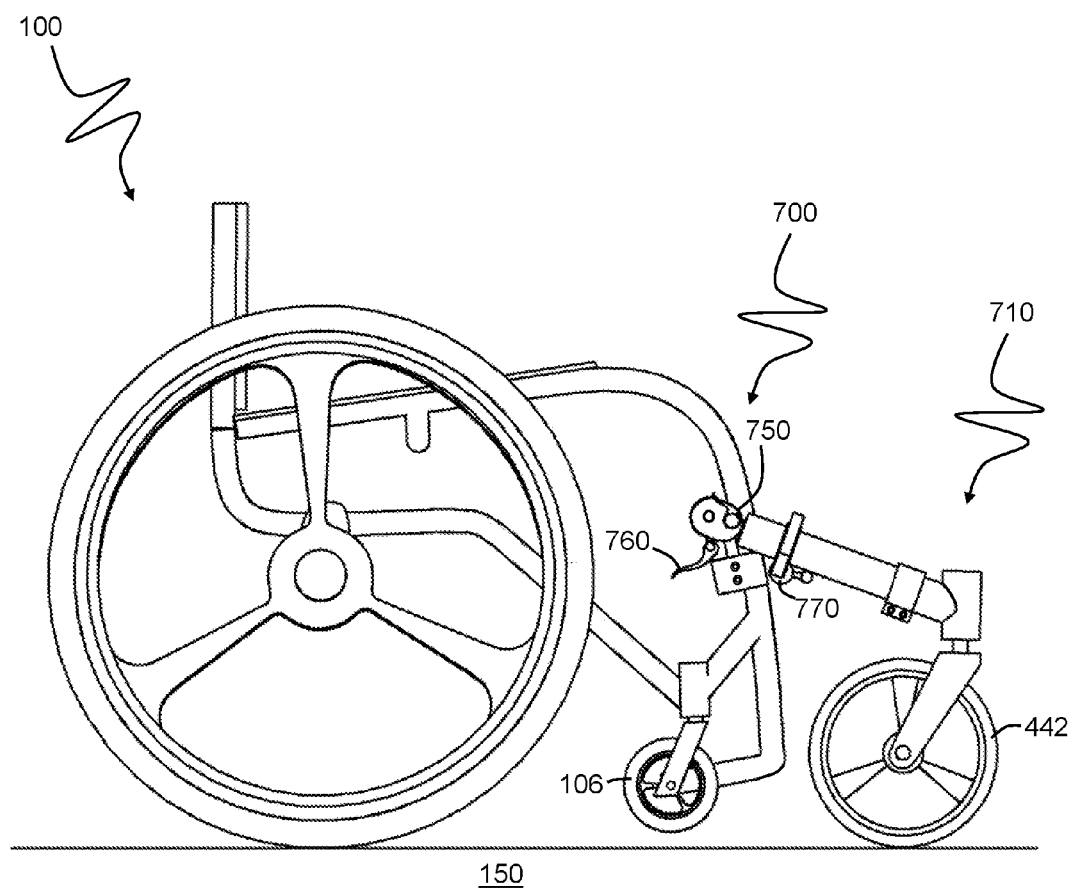

Upon the user performing the wheel-stand maneuver, the pawl-type transitioning mechanism 700 enters the deployment stage of the operation sequence, shown in FIG. 8C, wherein the adaptive caster wheel implement 710 bears the forward portion of the load carried by the wheelchair and wherein the primary caster wheels 106 of the wheelchair 100 remain elevated from contact with the ground surface 150.

Figure 8D:
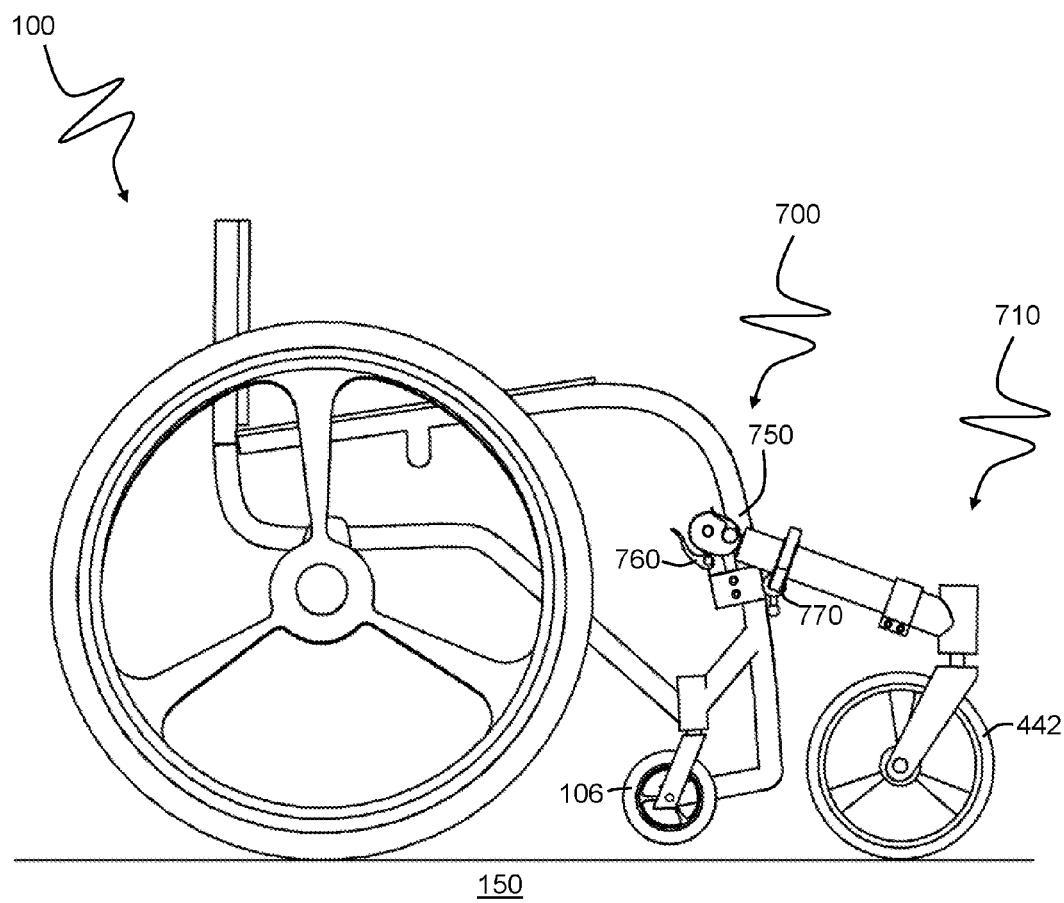

In FIG. 8D, the wheelchair 100 is shown in the modified load-bearing configuration while also having the binding cam lever 760 in its bound position and while also having the external cam binding assembly 770 in its bound position, for rigidly unifying the adaptive caster wheel implement 710 with the frame of the wheelchair 100. In other words, the mechanism is in the deployment stage of the operation sequence in conjunction with enhanced binding capabilities.

Figure 8E:
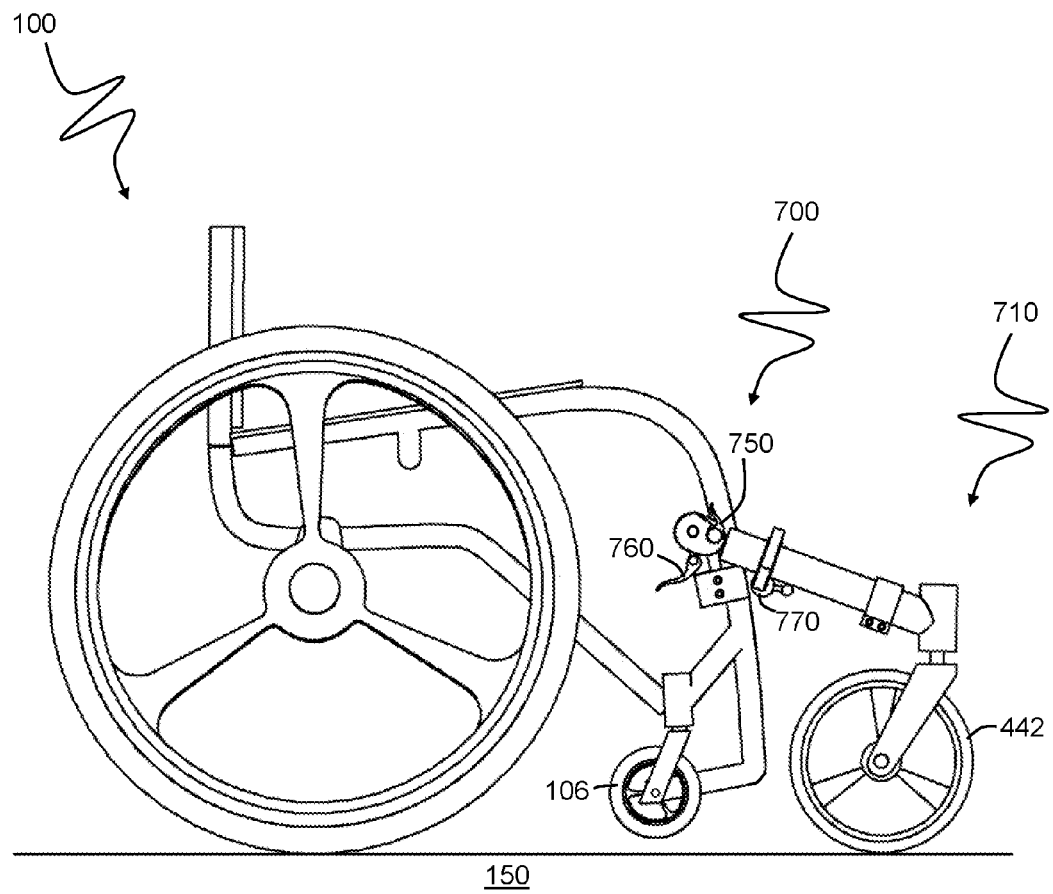

FIG. 8E shows the wheelchair 100, still in the modified load-bearing configuration while now having the binding cam lever 760 in its unbound position and while also having the external cam binding assembly 770 in its unbound position, for releasing the adaptive caster wheel implement 710 from its rigid unification with the frame of the wheelchair 100. Further, the biasing switch lever 750 is oriented in its forward (disengaging) position, in preparation for the user to perform the wheel-stand maneuver to effectuate alternating the wheelchair from the modified load-bearing configuration to the original load-bearing configuration. The mechanism, as depicted in FIG. 8E, is thus in the pre-release stage of the operation sequence.

Figure 8F:
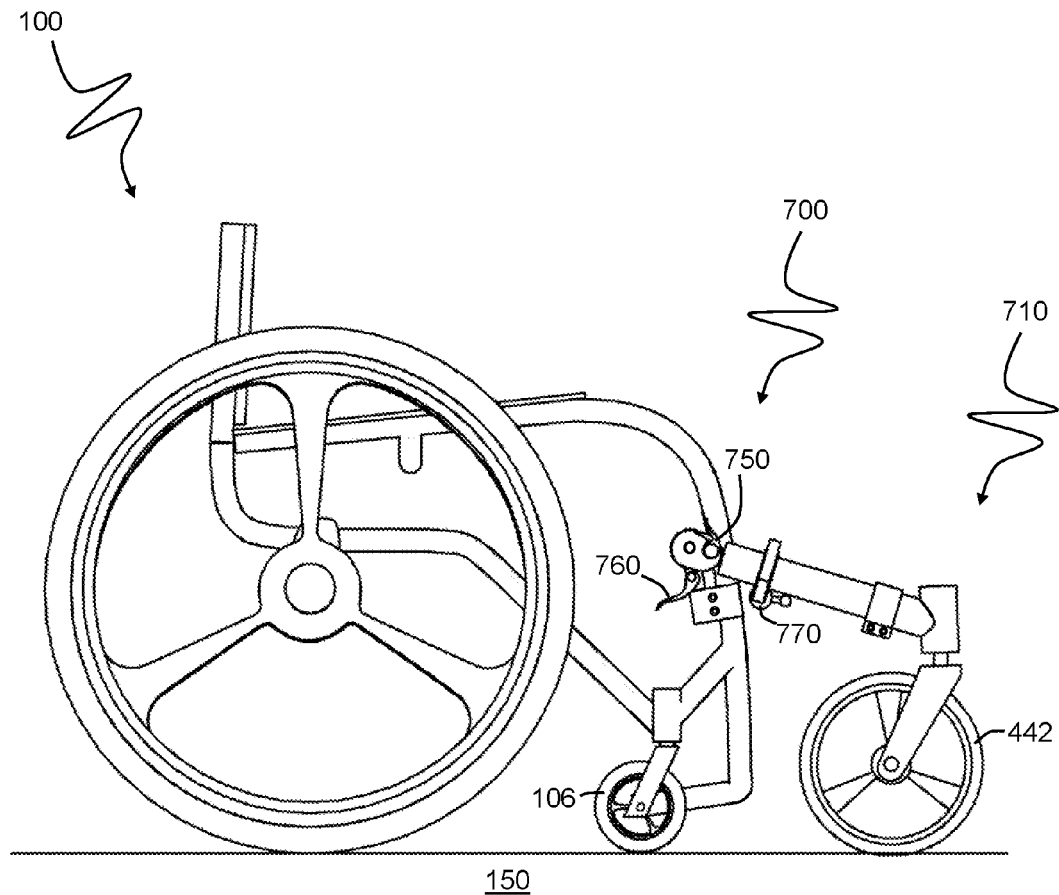

FIG. 8F shows the wheelchair 100 after the user has performed the wheel-stand maneuver to alternate the wheelchair from the modified load-bearing configuration to the original load-bearing configuration; the mechanism is returned to the attach/release stage of the operation sequence. At this stage, the user may now lift the adaptive caster wheel implement 710 so that it rotates upward about the joint axis of the pawl-type transitioning mechanism 700, after which the user may de-couple the adaptive caster wheel implement 710 from the wheelchair 100 and return it to a stowed position, if desired.

Figure 9A:
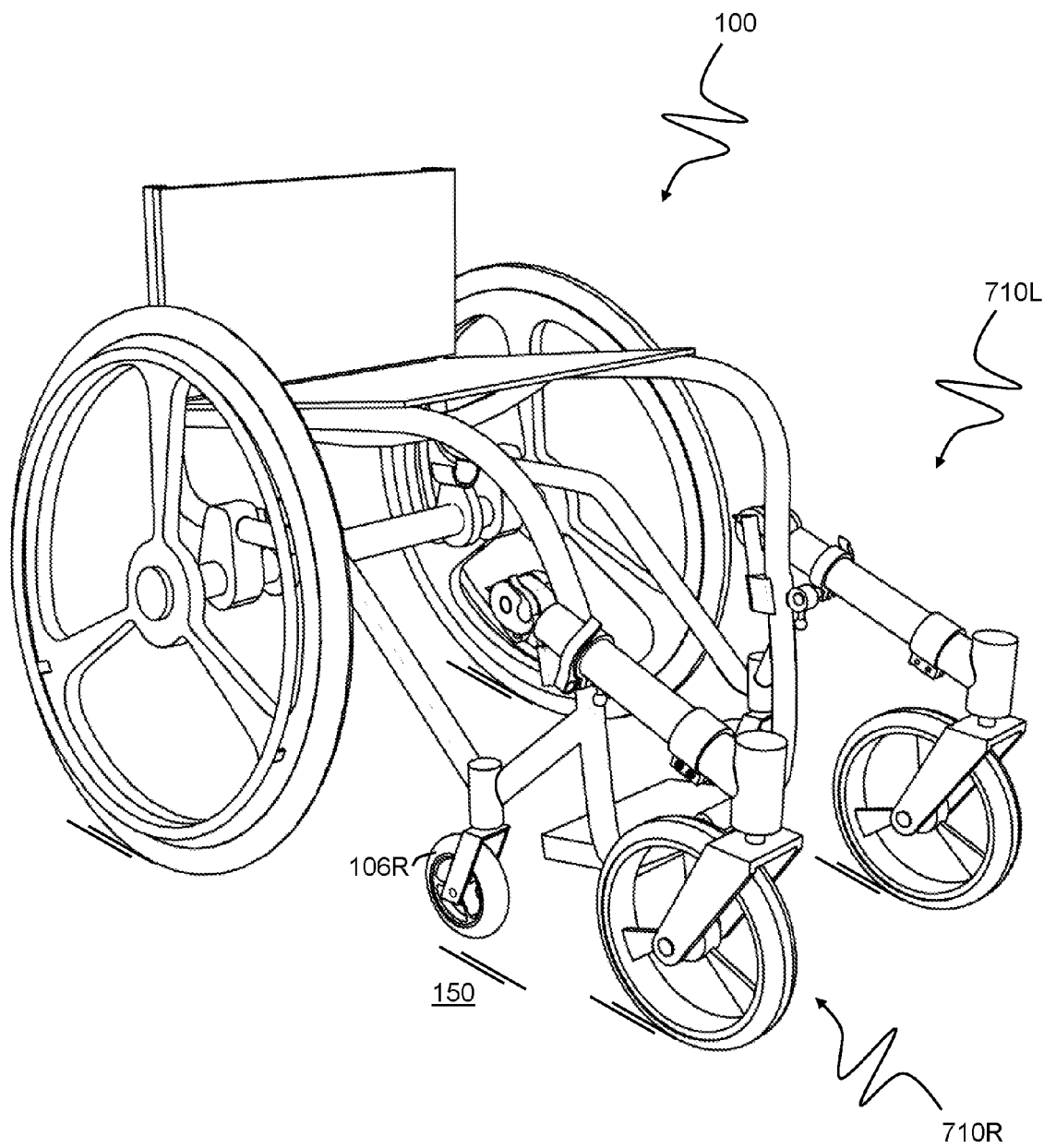
FIGS. 9A-D show several useful applications of load transitioning mechanisms in conjunction with ground-contacting implements.

FIG. 9A shows the wheelchair 100 outfitted with dual, left and right adaptive caster wheel implements 710L and 710R, with the wheelchair 100 in the modified load-bearing configuration wherein the primary caster wheels 106L (not visible) and 106R are elevated from contact with the ground surface 150.

Figure 9B:
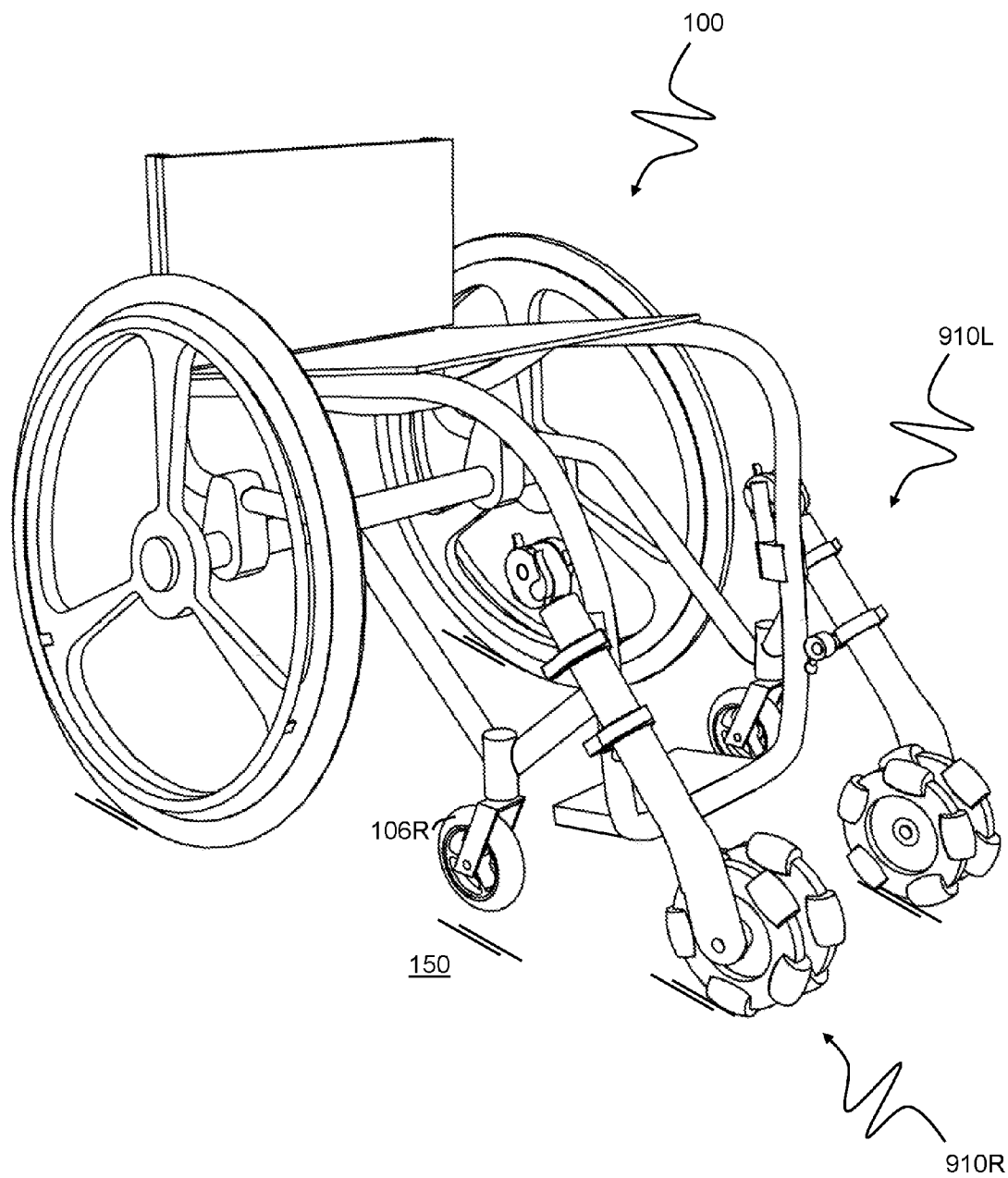

In FIG. 9B, the wheelchair 100 is outfitted with dual, left and right omniwheel implements 910L and 910R which enable movement of the wheelchair in all directions by virtue of a plurality of rollers disposed concentrically around the axis of rotation of the wheels. The primary caster wheels 106L and 106R are elevated from contact with the ground surface 150.

Figure 9C:
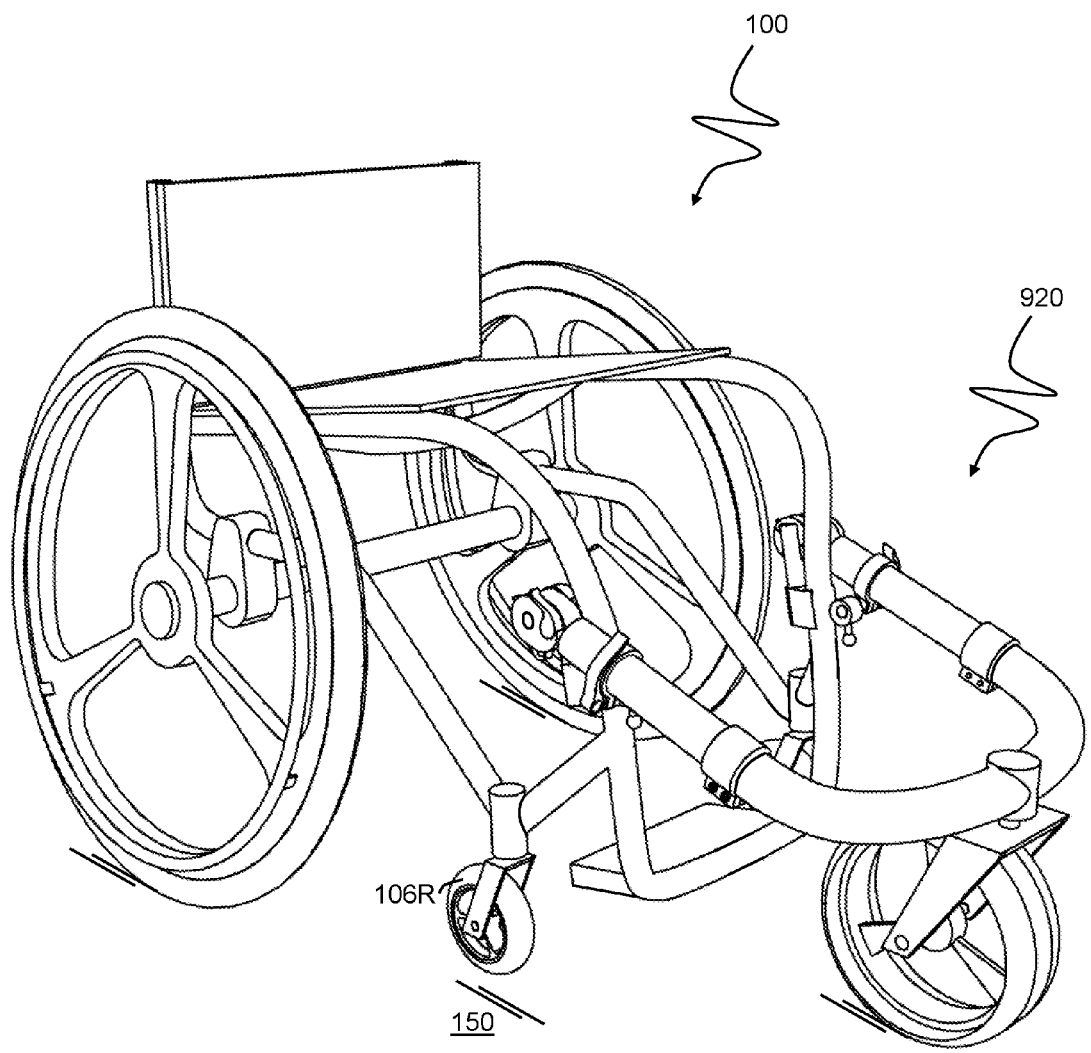

In FIG. 9C, the wheelchair 100 is outfitted with a single, symmetrically-disposed adaptive caster wheel apparatus 920 having dual, left and right support arms 922L and 922R which couple with left and right transitioning mechanism assemblies 700L and 700R. The primary caster wheels 106L and 106R are elevated from contact with the ground surface 150.

Figure 9D:
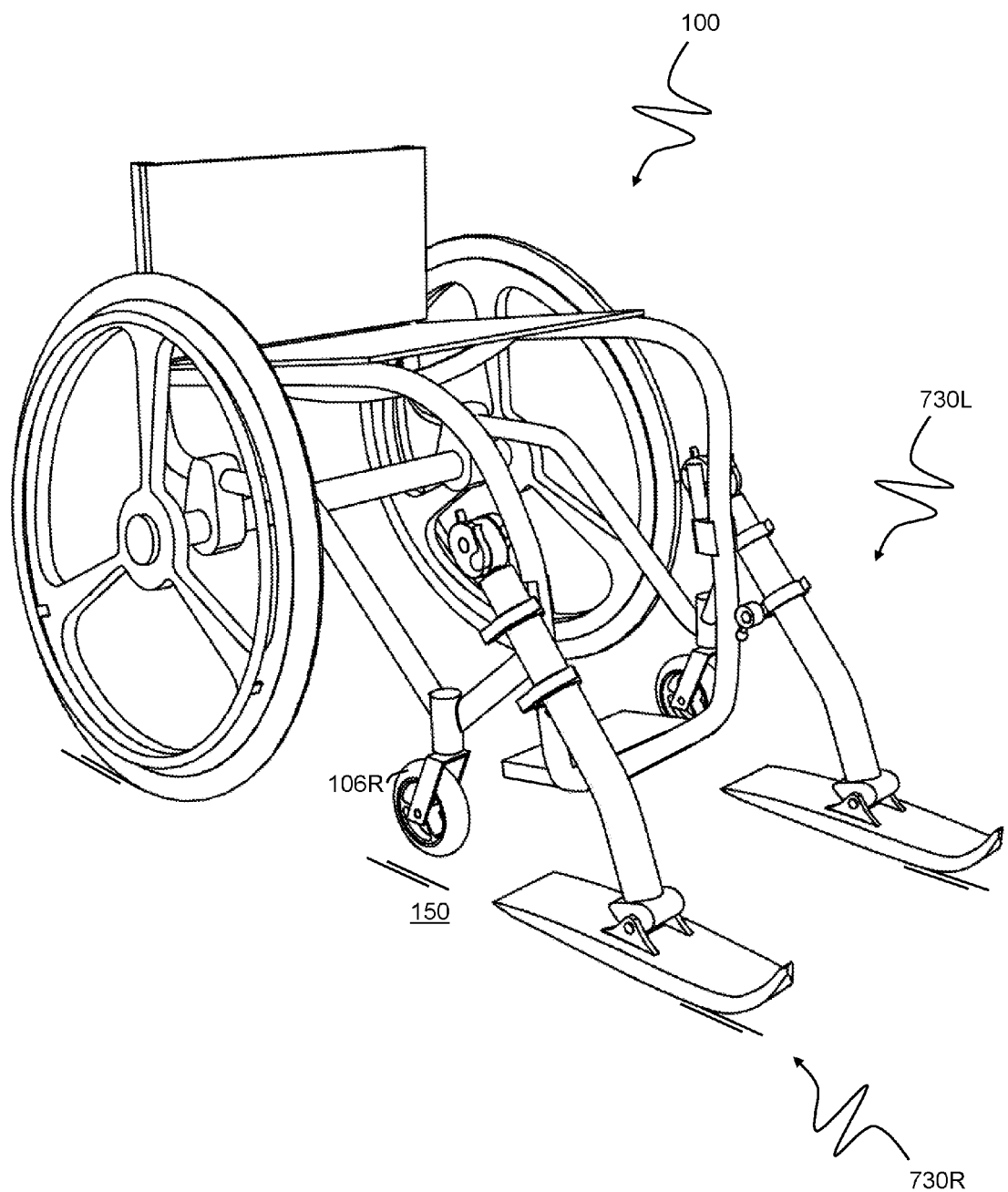

In FIG. 9D, the wheelchair 100 is outfitted with dual, left and right ski implements 930L and 930R which enable movement of the wheelchair over snow, ice or sand. The primary caster wheels 106L and 106R are elevated from contact with the ground surface 150.

Figure 10:
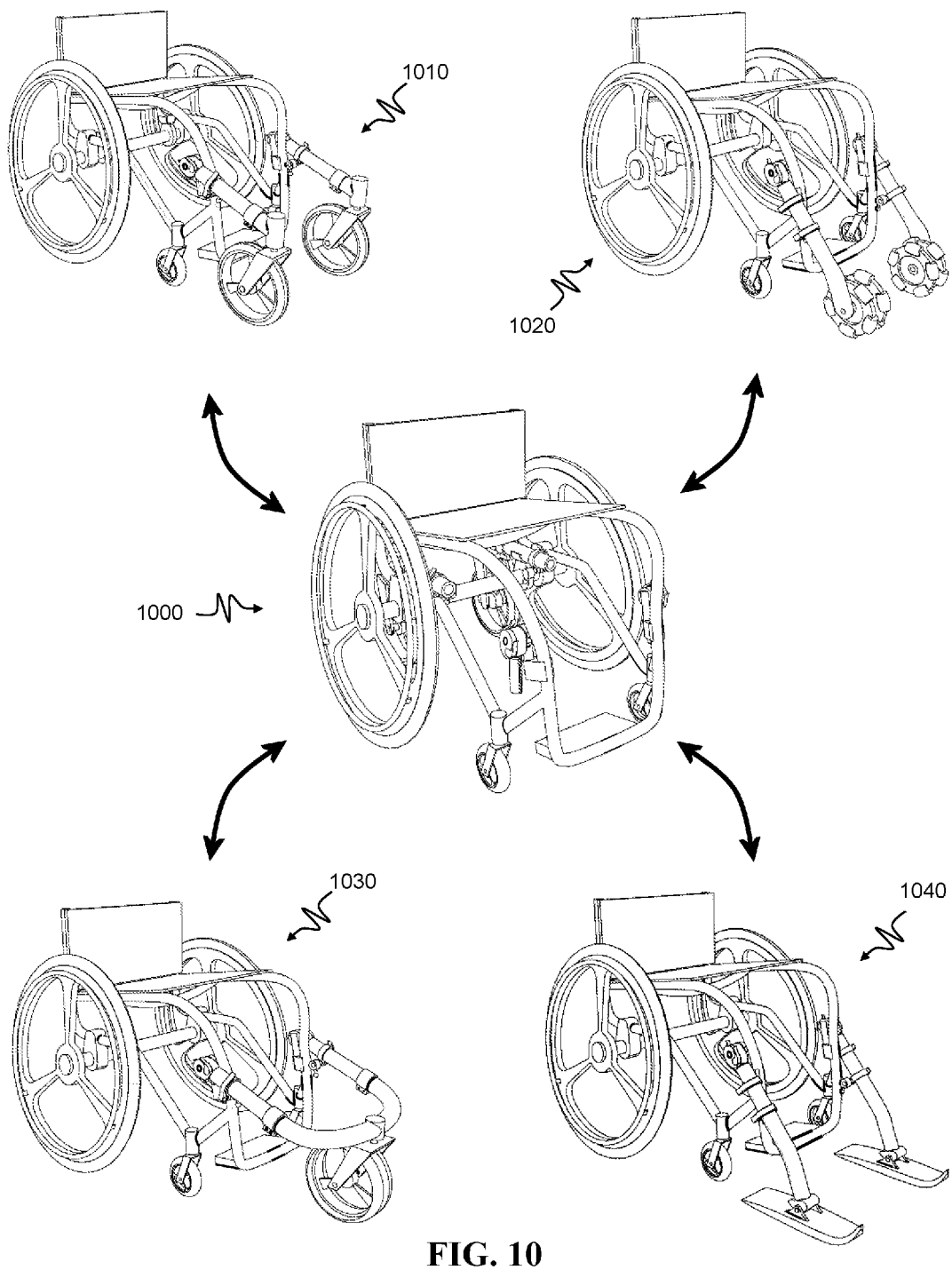
FIG. 10 is a diagram summarizing the reconfiguration capabilities enabled by the load transitioning mechanism.

FIG. 10 summarizes the reconfiguration capabilities enabled by the load transitioning mechanism, wherein a reconfigurable wheelchair 1000 is capable of being outfitted with a variety of ground-contacting adaptive implements which confer special functionalities and an extended wheelbase. A user is thus enabled to reconfigure the wheelchair among a dual caster wheel mode 1010, a dual omniwheel mode 1020, a single caster wheel mode 1030, and a dual ski mode 1040.

FIGS. 11A-D are simplified diagrams comparing a protract/retract-type mechanism, a rotary clutch-type mechanism, and a ratcheting pawl-type mechanism as the three mechanisms are transitioned through the operation sequence. Each mechanism type is shown with a singular, central joint axis 1100A, 1100B, and 1100C, respectively. Each mechanism type is also shown having a fixed joint member 1110A, 11106, and 1110C, respectively, and a rotatable joint member, 1120A, 1120B, and 1120C, respectively. The protract/retract-type mechanism comprises a linearly-displaceable cylindrical bearing 1130. The rotary clutch-type mechanism comprises a plurality of cylindrical roller bearings 1140A, 1140B, and 1140C which are rotationally displaceable. The ratcheting pawl-type mechanism comprises a pawl bearing 1150 which is hingedly-displaceable about its own axis of rotation. Directional arrows in each diagram indicate the direction in which each bearing type is enabled to move as a result of a sustained urging force applied thereto.

Figure 11A:
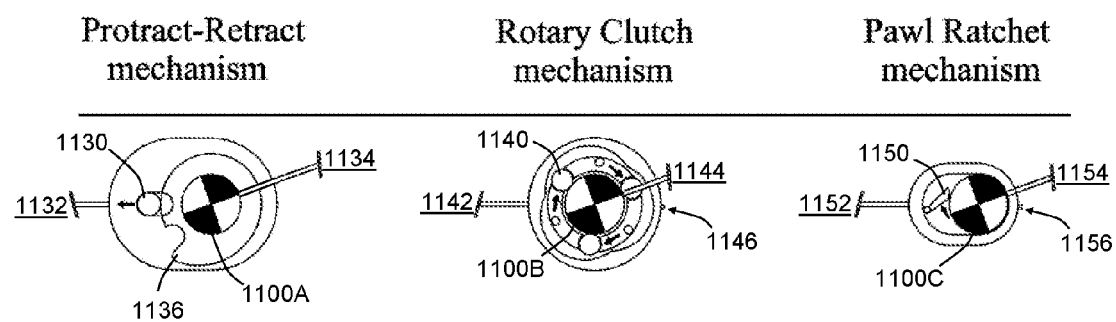
FIGS. 11A-D are simplified diagrams comparing a protract/retract-type mechanism, a rotary clutch-type mechanism, and a ratcheting pawl-type mechanism as the three mechanisms are transitioned through the operation sequence.

In FIG. 11A, all three mechanisms are shown in the attach/release stage of the operation sequence, having the rotatable joint member rotated in an upward angular orientation relative to the fixed joint member. As the directional arrows indicate, each bearing type is enabled to move away from a position of load-bearing engagement.

Figure 11B:
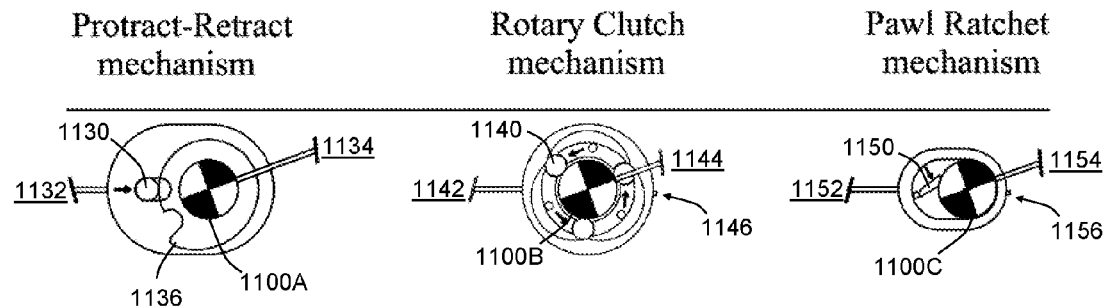

In FIG. 11B, all three mechanisms are shown in the pre-deployment stage of the operation sequence, still having the rotatable joint member rotated in an upward angular orientation relative to the fixed joint member, after the user has manipulated the biasing switch to enable a sustained application of engaging force to the movable bearing. As the directional arrows indicate, each bearing type is enabled to move in the opposite direction toward a position of load-bearing engagement. At this stage, each mechanism is prepared or "armed" for alternating the wheelchair from the original load-bearing configuration to the modified load-bearing configuration.

Figure 11C:
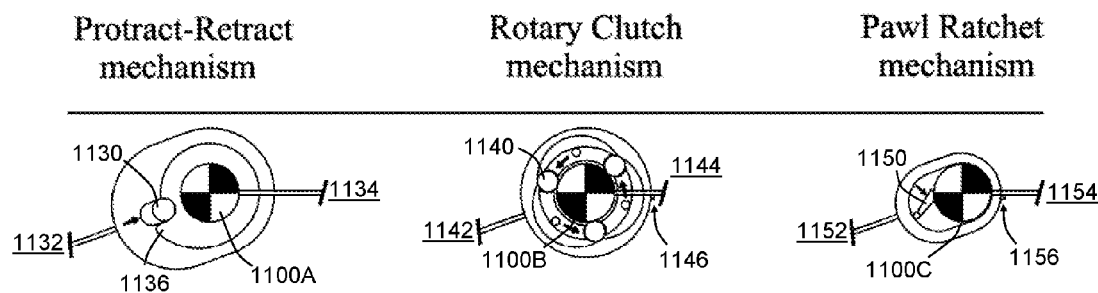

In FIG. 11C, all three mechanisms are shown in the deployment stage of the operation sequence, after the user has performed the wheel-stand maneuver to effectuate a change in the angular orientation of the rotatable joint member relative to the fixed joint member. The sustained urging force applied to each bearing type enables movement thereof into a position of load-bearing engagement, thereby maintaining the relative angular orientation of the rotatable joint member and the fixed joint member and keeping the primary caster wheels of the wheelchair elevated from the ground surface.

Figure 11D:
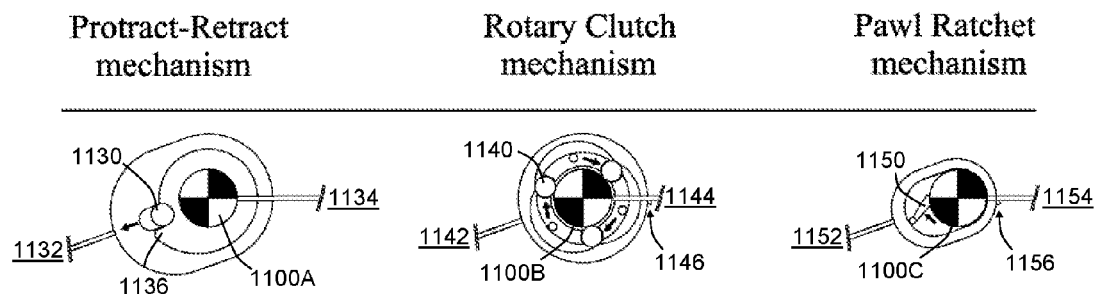

FIG. 11D shows all three mechanisms in the pre-release stage of the operation sequence, after the user has manipulated the biasing switch to enable a sustained application of disengaging force to the movable bearing. As the directional arrows indicate, each bearing type is enabled to move toward the position of load-bearing engagement, as previously shown in FIG. 11A, although each mechanism type continues to support the weight placed thereupon. At this stage, only upon the user performing the wheel-stand maneuver will the relative angular orientation of the rotatable joint member and the fixed joint member be permitted to change, thereby alternating the wheelchair from the modified load-bearing configuration back to the original load-bearing configuration.

Example I

An exemplary apparatus was built and configured for the purpose of lengthening the effective wheelbase of the wheelchair and also for decreasing the rolling resistance experienced by the user, especially while traversing over ground substrates such as sand, gravel, woodchips, grass, and snow. The apparatus comprises a single adaptive caster wheel implement which attaches to the left side of a wheelchair so that it may perform in conjunction with, though operated independently of, any additional adaptive implement that may be usefully attached to the right side of the wheelchair. The apparatus may, alternatively, be attached to the left side of the wheelchair without any adaptive implement attached to the right side of the wheelchair.

While attached to the wheelchair in a unilateral manner, the opposing side of the wheelchair frame remains relatively free from obstruction, thereby enabling a user or occupant of the wheelchair to pass his or her body into or out of a seated position in the wheelchair while the apparatus is attached to the wheelchair, if he or she so desires.

The exemplary apparatus comprises an adapting member comprising a caster assembly that is substantially larger and more robust than the original primary caster assemblies that are permanently integrated with the wheelchair, and includes a 50 mm wide, 8-inch diameter pneumatic tire fitted over an aluminum wheel hub. This tire was chosen because, when inflated, it exhibits excellent rolling resistance on both rugged surfaces and smooth surfaces alike, and provides sufficient grip against paved surfaces to help prevent flutter of the caster assembly when approaching vehicle speeds of around 8 MPH or 12 KmPH, which is average human running speed.

The exemplary apparatus also comprises a mounting member, which is semi-permanently clamped onto a forward lateral support of the frame of the wheelchair such that it occupies the space immediately above the left-side primary caster assembly of the wheelchair. The mounting member remains affixed to the wheelchair at all times and is unobtrusive to the user's arms, legs, and feet, and outerwear at times when an adapting member is decoupled from the mounting member.

The mounting member comprises two tube clamps and a primary structural plate; all fabricated out of 6061 aluminum and secured using stainless steel machine screws. A hollow receiver socket, comprising a threaded outer surface, is secured inside an opening cut through the primary structural plate by tightening threaded nuts on opposing sides of the hollow receiver socket. A bearing element, composed of aluminum bronze and comprising four adjustment holes, is affixed to the primary structural plate and is secured against the primary structural plate by one of the threaded nuts and is rotationally secured by a bearing fastening bolt. Loosening of the bearing fastening bolt permits rotation of the bearing element about the axis of the hollow receiver socket; a defined operation angle of the adapting member is dependent upon which adjustment hole is occupied by the bearing fastening bolt in securing the bearing element to the primary structural plate.

The bearing element of the mounting member further comprises a disengagement region and a nested engagement region, both which have been ground and polished to allow for a moveable bearing element of the adapting member to slide smoothly along the disengagement region and into and out of the nested engagement region.

The adapting member is primarily composed of 6061 aluminum, and comprises several position adjustment means. First, the position of the caster assembly is connected to and may be rotatably and longitudinally adjusted relative to a curved support arm. Second the support arm is connected to and rotatably and longitudinally adjustable relative to a solid connector body. Third, the curved support arm itself serves as a means for changing the effective pitch orientation of the caster assembly.

The adapting member further comprises a protract-retract mechanism which is contained within a tubular housing body, the tubular housing body bolted to the solid connector body. An outer portion of the protract-retract mechanism is affixed to the inner surface of the tubular housing body with a set screw. The protract-retract mechanism is slidingly toggled by the user or occupant by pushing rearwardly against a slider knob. Movement of an input element of the protract-retract mechanism switches an output element between a protracted position and a retracted position which, in turn, alternates an internal slider, composed of low-friction wear-resistant Nylatron® rod, between a first position and a second position. While in the first position, the internal slider applies linear pressure against the moveable bearing element to urge it towards a disengaged position. If the apparatus is currently in an operative state, toggling the internal slider to the first position will pre-dispose the moveable bearing element to move into the disengaged position to occupy the disengagement region at the instant the user or occupant performs a wheel-stand maneuver or otherwise elevates the front end of the wheelchair.

While in the second position, the internal slider removes linear pressure against the moveable bearing element and thus permits it to move towards an engaged position. If the apparatus is currently in an inoperative state, toggling the internal slider to the second position will pre-dispose the moveable bearing element to move into the engaged position to occupy the nested engagement region at the instant the user or occupant performs a wheel-stand maneuver or otherwise elevates the front end of the wheelchair.

The speed and force with which the moveable bearing element moves into and out of the nested engagement region depends largely on the amount of biasing force that is applied against the moveable bearing element in either direction. In the case of the exemplary apparatus, two internal extension springs, disposed on opposite sides of the moveable bearing element, were selected according to characteristics (length, diameter, and extension force) that would produce maximum travel, urging force, and speed in both directions upon the user or occupant toggling the internal slider between the first position and the second position and performing a wheel-stand maneuver or otherwise elevating the front end of the wheelchair. Through experimentation, it was observed that if the spring forces applied to opposing sides of the moveable bearing element were not properly balanced, the moveable bearing element would fail to move into or out of the nested engagement region upon toggling the internal slider and performing a wheel-stand. Once this balance was achieved, however, the apparatus has demonstrated very reliable operation with only occasional cleaning and lubrication necessary.

An insertion pin with a diameter of ½ inch, integrated with the adapting member, is removably insertable into the hollow receiver socket of the mounting member, which comprises a smooth interior surface. Upon full insertion, the adapting member is situated in the correct lateral position relative to the wheelchair, and the moveable bearing element of the adapting member is situated in the correct location against the disengagement region of the bearing element. To further enhance the integrity of the connection of the adapting member to the mounting member, the insertion pin comprises expandable rings which are expanded within the hollow receiver socket upon the user or occupant applying force against a cam-action lever handle operatively connected to an inner rod of the insertion pin. The user or occupant, upon coupling the insertion pin into the hollow receiver socket, actuating the protract-retract mechanism, and performing a wheel-stand, may enhance the grip of the coupling by applying force against the cam-action lever handle in order to use the apparatus in rigid union with the wheelchair so that minimal "wiggle" or "play" is observed between the mounting member and the adapting member.

Actuating the biasing mechanism (to pre-dispose the load-transfer assembly toward the opposite load-bearing state) is quick and easy for the user to perform, as the actuator knob is well within arm's reach.

To convert the wheelchair from its original mode to the adapted mode, the user inserts the expanding pin of the adapting member into the receptacle of the mounting member and, after manually actuating the biasing mechanism, he effectuates the transition to the adapted mode by reclining the wheelchair backward so that the primary caster wheels of the wheelchair are elevated approximately 1½ inches above the ground surface. An audible "click" is heard as the moveable bearing element moves into the nested engagement region of the bearing surface. The user then further secures the adapting member to the mounting member by pulling the cam-action expansion pin lever in towards the body of the adapting member. The caster wheels remain elevated approximately 1½ inches above the ground surface during travel in all directions and do not add rolling resistance or otherwise interfere with the performance of the wheelchair in its adapted mode, as the large forward caster wheel now shares, with the wheelchair, the load distributed towards the front of the wheelchair. As a result, the user has been able to use his adapted everyday wheelchair to venture out with relative ease over terrain such as at parks, playgrounds, trails, and over heavily weathered pavement, all which would otherwise pose significant difficulty and safety risk. The user has furthermore enjoyed the maneuverability, in all directions of travel, afforded by the adapted wheelchair while the user traverses over both indoor and outdoor surfaces.

The exemplary apparatus has been used in conjunction with an Invacare Top End titanium rigid-style wheelchair, and has performed exceptionally well on outdoor surfaces including sand, gravel, wood chips, smooth pavement, rugged weathered pavement, city sidewalks, and snowy neighborhood streets.

Example II

Dual (left and right) adaptive caster wheel apparatuses, each having a load-transitioning mechanism which separably integrates with a ground-contacting adaptive caster wheel implement, were built and configured for the purpose of lengthening the effective wheelbase of the wheelchair and also for decreasing the rolling resistance experienced by the user, especially while traversing over ground substrates such as sand, gravel, woodchips, grass, and snow.

Both apparatuses were configured to be removably and adjustably affixed to the tubular frame of a Ti-Lite TRA rigid-style ultralight titanium wheelchair by way of mounting clamps which were semi-permanently affixed onto the left and right forward lateral supports of the tubular frame of the wheelchair; each device occupies a space immediately above a primary caster wheel assembly on its respective side of the wheelchair. The load transitioning mechanism of the device remains affixed to the wheelchair at all times and is unobtrusive to the user's arms, legs, and feet, and outerwear, including while any adaptive implements are decoupled from the load transitioning device.

Both apparatuses were further configured to receive any one of a variety of adaptive implements, most notably a selection of attachable all-terrain caster wheel implements adapted for use in urban, suburban, and rural environments encountered in the State of Wisconsin.

Early prototypes of the mechanism were constructed to be capable of withstanding torque in excess of 300 ft-lbs. Provisions were made to clamp the fixed portion of the load transitioning mechanism to the tubular frame of the wheelchair, as well as to form a coupling on the rotatable portion of the mechanism in a manner which exhibits minimal wiggle or play. Also, for each device, a cylindrical aluminum outer casing was fabricated and secured, using a series of set screws, to fit tightly over and completely enclose the load transitioning mechanism.

Internally, each roller clutch has a plurality of cylindrical rollers which function as movable bearings that are selectably wedged between a hardened steel outer casing and a hardened steel inner load transfer spindle, depending on the rotary position of a control dial. The control dial was adapted to receive a first arm of a torsion spring, with the opposing second arm of the torsion spring projecting out of the outer casing through an elongated passageway machined out of the outer casing. The passageway was dimensioned so as to limit the rotational travel of the second arm of the torsion spring in both directions while allowing sufficient clearance for the second arm of the torsion spring to freely travel between both ends of the passageway.

Notches at the opposing ends of the passageway receive the second arm of the torsion spring upon the user manipulably forcing the second arm therein. The torsion spring, which is maintained centrally within the cylindrical outer casing by a cylindrical nylon shaft, behaves in conjunction with the notches of the passageway as a simplistic yet effective means for biasing the control dial (and thus the cylindrical roller bearings) in either an engaging direction of rotation or a disengaging direction of rotation. When the torsion spring is disposed in the first notch of the passageway, the spring is deflected to "wind up" and, in effect, applies a sustained urging force in a forward direction to cause the control dial to rotate in the engaging direction. When the torsion spring is disposed in the second notch of the passageway, the spring is deflected to "wind down" and, in effect, applies a sustained urging force in a reverse direction to cause the control dial to rotate in the disengaging direction. When the torsion spring is disposed at a location in the passageway between the first notch and the second notch, the torsion spring is relaxed.

A spherical knob was fitted to the end of the second arm of the torsion spring to achieve a compact yet comfortable means for the user to manipulate the position of the arm. A mechanism was later devised which employs dual, opposing torsion springs which act in a similar fashion to enable the user to control the direction in which urging force is sustained throughout the operation sequence of the load transitioning mechanism.

As a system, the pair of opposing load transitioning assemblies has performed exceptionally well in conjunction with the rigid-frame wheelchair on outdoor surfaces including sand, gravel, wood chips, smooth pavement, rugged weathered pavement, city sidewalks, and snowy neighborhood streets, while enabling the user to alternate his wheelchair between a modified configuration intended for outdoor, rugged terrain and the original, unadapted configuration which is ideally suited to indoor environments.

Each apparatus was built, with load-bearing capacity in mind, for attachment to one side of the wheelchair so that it may perform safely and reliably in conjunction with, though operated independently of, the apparatus attached to the opposing side of the wheelchair.

To convert the wheelchair from its original configuration to the adapted configuration, the user first positions the left and right load transitioning devices such that their rotatable extension members are oriented upward so that a male end of each extension member is ready to couple with the end socket of the respective attachable caster wheel implement. The user secures the coupling by tensioning a quick-release collar to constrict the end socket around the male portion of the rotatable extension member.

Next, the user manually actuates the force-sustaining subassembly of each transitioning device by pushing the knob in a forward direction and securing the arm of the torsion spring into the forward notch of the passageway, and he subsequently lowers both attachable caster wheel implements until they contact the ground surface. The user effectuates the transition to the adapted configuration by reclining the wheelchair backward so that the primary caster wheels of the wheelchair are elevated and maintained approximately 1½ inches above the ground surface. The user then further secures the adapting member to the mounting member by rotating a cam-action tensioning assembly, attached to the extension arm of each caster wheel implement, in a downward direction so that it compresses firmly against the forward frame tube of the wheelchair. The caster wheels remain elevated above the ground surface during travel in all directions and do not add rolling resistance or otherwise interfere with the performance of the wheelchair in its adapted mode, as the large forward caster wheel now bears the load distributed towards the front of the wheelchair.

To remove the attachable caster wheel implements from the wheelchair—that is, to convert the wheelchair from the adapted configuration back to the original configuration—the user rotates the cam-action tensioning assembly on each caster wheel implement in an upward direction so that it decompresses against the forward frame tube of the wheelchair. The user then manually actuates the force-sustaining subassembly of each transitioning device by removing the knob and spring arm from the forward notch of the passageway and disposing the knob and spring arm in the opposing, rearward notch; at this time the load transitioning device will continue to bear the load distributed toward the front of the wheelchair. Upon the user reclining the wheelchair backward so that the primary caster wheels of the wheelchair are elevated slightly, the user effectuates the transition to the original configuration, with the primary caster wheels of the wheelchair instantly lowered down into contact with the ground surface as the user brings the wheelchair into its upright, unreclined position. The user is then able to lift both caster wheel implements upward, release constricting tension on the quick-release collars, and subsequently detach both caster wheel implements from the rotatable extension members of their respective load transitioning devices.

Having the load transitioning device affixed to the wheelchair and ready to receive the attachable caster wheel implement, the user has benefited from improved versatility. As needed, the user quickly outfits the wheelchair with dual caster assemblies that are substantially larger and more robust than the original primary caster assemblies that are permanently integrated with the wheelchair, and includes a 50 mm wide, 8-inch diameter pneumatic tire fitted over an aluminum wheel hub. This tire was chosen because, when inflated, it exhibits excellent rolling resistance on both rugged surfaces and smooth surfaces alike, and provides sufficient grip against paved surfaces to help prevent flutter of the caster assembly when approaching vehicle speeds of around 8 MPH or 12 KmPH, which is about average human running speed. Other wheel arrangements have been used, including: a 75 mm wide, 8-inch diameter pneumatic tire fitted over an aluminum wheel hub; and a 35 mm wide, 6-inch diameter soft-roll solid caster having an aluminum hub and connected to a shock-absorbing suspension caster assembly.

Example III

An early prototype was devised having an integrated 8-inch caster wheel assembly, load-transitioning mechanism, and releasable clamp assembly, which was built and configured for the purpose of lengthening the effective wheelbase of an "everyday" wheelchair and also for decreasing the rolling resistance experienced by the user, especially while traversing over ground substrates such as sand, gravel, woodchips, grass, and snow.

The apparatus was configured to be removably and adjustably affixed to the tubular frame of either an Invacare Top End Terminator Titanium wheelchair or a Ti-Lite TRA rigid-style ultralight titanium wheelchair by way of a hinged clamp adapted to be quickly and securely affixed onto the left forward lateral support of the tubular frame of the wheelchair; the device occupies a space immediately above the left-side primary caster wheel assembly of the wheelchair. The load transitioning mechanism, clamp assembly, and caster wheel assembly may thus be removed from one wheelchair and attached to the other if so desired. An ABS plastic tube clip mounted atop the rear axle beneath the seat of the Ti-Lite TRA wheelchair serves as a useful means for stowing the apparatus beneath the seat of the wheelchair while not in use.

Internally, the mechanism has a single, toothed pawl which incrementally engages with a toothed torque wheel at every 5 degree of rotation in a first direction for load-bearing purposes, whereas the toothed pawl does not load-bearingly engage with the torque wheel in the opposing direction of rotation and permits free rotation thereof in said opposing direction. The toothed pawl is disposed within its own recess which has been bored into the steel casing surrounding the mechanism, the toothed pawl capable of rotating about its own axis of rotation projecting centrally through the bored recess and parallel to the major axis of rotation of the mechanism itself.

A solid elastomeric force sustainment element, composed of cast polyamide (nylon) plastic having a modulus of elasticity of about 2.8 GPa ($0.4 \times 10^6$ psi), was fabricated to have a cylindrical shaft which fits tightly and rotates within a circular hole drilled through a cover plate of the casing. On a first end of the cylindrical shaft, projecting into the casing and contacting a side region of the toothed pawl, is an eccentric oval-shaped cam portion, also composed of nylon plastic. The opposing end of the cylindrical shaft, projecting to the exterior of the casing, is affixed to a manipulable lever. The cam rotates in a direction corresponding to rotation of the lever about an axis passing centrally through the cylindrical shaft of the force sustainment element, selectively applying or removing urging force maintained against the pawl by the nylon cam portion, thus enabling the user to repeatably toggle the mechanism between an engaging state and a disengaging state by manipulably imparting rotation to the cam portion, via the lever, between two opposing positions.

Due to the snug fit of the cylindrical shaft within the circular hole of the cover plate as well as the eccentric placement of the cam relative to the axis of the cylindrical shaft, the manipulable lever holds its engaging and disengaging positions without being forced out of position, thus serving as a reliable "control switch" to control the internal state of the mechanism. The holding power of the control switch, as just described, furthermore overcomes an opposing spring pressure applied against the toothed pawl by a disengaging compression spring disposed internally.

The elasticity of the solid elastomeric force sustainment element is critical to the capacity for the mechanism to successfully transition through the cyclic operation sequence. After clamping the apparatus to the wheelchair and rotating the manipulable lever to toggle the mechanism to the engaging state, that is, with the mechanism is in the pre-deployment stage, the cam portion of the solid elastomeric force sustainment element maintains pressure against the toothed pawl to force the teeth of the pawl to be seated into the grooves between the teeth of the torque wheel. As the user reclines the wheelchair to impart rotation of the movable portion of the apparatus relative to the fixed portion, the cam portion compresses sufficiently to permit a slight amount of rotation of the pawl necessary for the teeth of the torque wheel to advance to the next incremental position of rotation relative to the teeth of the pawl.

With the apparatus clamped to the wheelchair frame, upon the user reclining the wheelchair, relative rotation between the clamp assembly (the fixed portion) and the caster wheel assembly (the movable portion) causes the torque wheel to rotate relative to the toothed pawl as far as the external rotation-limiting detent will allow. Subsequently, upon the user resting his or her weight towards the forward end of the wheelchair, the toothed pawl becomes fully engaged with the torque wheel so that relative rotation in the first direction is inhibited and the forward portion of the wheelchair load is supported as a result of the load being transferred from the torque wheel, through the toothed pawl, to the recess in which the toothed pawl is seated. The user may further secure the joint by actuating a releasable cam-lever tensioner having a steel rod which projects through the casing and which is adapted to draw the toothed pawl tightly against the torque wheel, thereby eliminating any play or wiggle that would otherwise tend to occur during use of the apparatus while the wheelchair user traverses irregular terrain.

To convert the wheelchair from its original configuration to the adapted configuration, the user first clamps the apparatus to a forward region of the frame of the wheelchair. The forward region may be specially adapted for receiving the clamp, such as with a pair of semi-circular adapting shims, to establish a compatible outer diameter of the forward region to which the clamp may be secured.

Next, the user manually actuates the manipulable lever in an engaging direction by pushing the lever rearward, and he subsequently lowers the apparatus until the caster wheel contacts the ground surface. The user effectuates the transition to the adapted configuration by reclining the wheelchair backward so that the primary caster wheels of the wheelchair are elevated and maintained approximately 1½ inches above the ground surface. The user then further secures joint of the mechanism by tightening a cam-action tensioning assembly, which draws the toothed pawl tightly against the torque wheel. The caster wheels of the wheelchair remain elevated above the ground surface during travel in all directions and do not add rolling resistance or otherwise interfere with the performance of the wheelchair in its adapted mode, as the large forward caster wheel now bears the load distributed towards the front of the wheelchair.

To remove the attachable caster wheel implement from the wheelchair—that is, to convert the wheelchair from the adapted configuration back to the original configuration— the user first loosens the cam-action tensioning assembly of the mechanism to release its pulling force upon the toothed pawl. The user then manually actuates the control switch of the mechanism in a disengaging direction by pushing the lever forward to fully release engaging pressure placed upon the toothed pawl; at this time the apparatus will continue to bear the load distributed toward the front of the wheelchair, due to high frictional forces maintained between the toothed pawl and the torque wheel as a result of the forward weight supported by the apparatus. Upon the user reclining the wheelchair backward so that the primary caster wheels of the wheelchair are elevated slightly, the frictional forces between the toothed pawl and the torque wheel are relieved and the internal disengagement spring forces the toothed pawl away from contact with torque wheel so that, as the user subsequently brings the wheelchair into its upright, unreclined position, the primary caster wheels of the wheelchair are instantly lowered down into contact with the ground surface; thus the user effectuates the transition back to the original load-bearing configuration. The user is then able to lift the caster wheel implement upward and unclamp and detach the caster wheel implement from the frame of the wheelchair.

The user, having a complete spinal cord injury at the level of the sixth thoracic vertebra, has no motor or sensory function in his legs and in the lower half of his torso, and has benefited from the smoother riding characteristics and the added forward stability that result from attachment of the apparatus to his wheelchair. With the adaptive caster wheel deployed, the user has avoided being forwardly tumbled or ejected from the seated position and has furthermore been able to allocate more time towards enjoying and viewing the surrounding landscape while propelling the wheelchair forward, such as around his neighborhood and at a nearby state park, with less time directed towards observing and avoiding the small bumps, cracks, tree roots, and other obstacles that would otherwise put him at significant risk of falling out of his wheelchair.

Remarks

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above compositions, products, and methods without departing from the scope of aspects of the invention, it is intended that all matter contained in the above description shall be interpreted as illustrative and not in a limiting sense. Reference to particular illustrative embodiments should not be construed as limitations. The inventive devices, products, and methods can be adapted for other uses or provided in other forms not explicitly listed above, and can be modified in numerous ways within the spirit of the present disclosure. Thus, the present invention is not limited to the disclosed embodiments.

I claim:

1. A method for enabling a user of a wheelchair equipped with a single-jointed load transitioning mechanism to reconfigure the wheelchair, the method including preparing the wheelchair for performance of a cyclic operation sequence, the cyclic operation sequence including:
   a) connecting a wheelchair-adapting implement in a position relative to the wheelchair to operatively interpose the single-jointed load transitioning mechanism between the wheelchair and the wheelchair-adapting implement;
   b) transitioning the single-jointed load transitioning mechanism from an attach/release stage to a pre-deployment stage, including toggling an alternating switch to prepare a movable bearing for moving towards a position of engagement with a bearing surface;
   c) transitioning the single-jointed load transitioning mechanism from the pre-deployment stage to a deployment stage, including reclining the wheelchair rearward, wherein reclining the wheelchair enables the movable bearing to move into the position of engagement with the bearing surface;

d) transitioning the single-jointed load transitioning mechanism from the deployment stage to a pre-release stage, including toggling the alternating switch to prepare the movable bearing for moving away from the position of engagement with the bearing surface;

e) transitioning the single-jointed load transitioning mechanism from the pre-release stage to the attach/release stage, including reclining the wheelchair rearward, wherein reclining the wheelchair enables the movable bearing to move out of the position of engagement with the bearing surface; and f) disconnecting the wheelchair-adapting implement from the position relative to the wheelchair.

2. The method of claim 1, the cyclic operation sequence further including connecting a second wheelchair-adapting implement in a position relative to the wheelchair to operatively interpose a second single-jointed load transitioning mechanism between a second side of the wheelchair and the second wheelchair-adapting implement to enable the user to simultaneously transition a pair of independently load-bearing single-jointed load transitioning mechanisms through the cyclic operation sequence.

* * * * *